(12) United States Patent
Chen et al.

(10) Patent No.: US 10,505,616 B1
(45) Date of Patent: Dec. 10, 2019

(54) METHOD AND APPARATUS FOR MACHINE LEARNING BASED WIDE BEAM OPTIMIZATION IN CELLULAR NETWORK

(71) Applicant: Samsung Electronics Co., Ltd., Suwon-si, Gyeonggi-do (KR)

(72) Inventors: Hao Chen, Allen, TX (US); Young Han Nam, Plano, TX (US); Rubayet Shafin, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/361,061

(22) Filed: Mar. 21, 2019

Related U.S. Application Data

(60) Provisional application No. 62/743,919, filed on Oct. 10, 2018, provisional application No. 62/741,982, (Continued)

(51) Int. Cl.
*H04L 23/02* (2006.01)
*H04B 7/06* (2006.01)
(Continued)

(52) U.S. Cl.
CPC ............ *H04B 7/0639* (2013.01); *G06N 3/02* (2013.01); *H04B 7/0695* (2013.01); (Continued)

(58) Field of Classification Search
CPC . H04W 72/042; H04W 72/10; H04W 72/005; H04W 64/003; H04W 72/085; H04W 72/0446; H04B 17/318
(Continued)

(56) References Cited

U.S. PATENT DOCUMENTS

2003/0224828 A1 12/2003 Ylitalo
2014/0073337 A1 3/2014 Hong et al.
(Continued)

OTHER PUBLICATIONS

P. V. Klaine, et al. "A Survey of Machine Learning Techniques Applied to Self-Organizing Cellular Networks", IEEE Dommunications Surveys & Tutorials, vol. 19, No. 4, Jul. 17, 2017, pp. 2392-2431.

(Continued)

*Primary Examiner* — Khai Tran

(57) ABSTRACT

An apparatus and method for controlling and optimizing the broadcast beam for base stations (BS) using user equipment (UE) measurements with machine learning is provided. The apparatus and method is configured to select a first beam for each BS, send selected beams for each BS, receive measurement information of a first beam from UEs via BSs, preprocess the measurement results, use a neural network or a table for each BS to give a score for each broadcast beam in the beam pool, select a second beam with the highest score for each BS either from a neural network or a table, train the neural network for broadcast beam optimization offline based on a UE distribution pattern and ray-tracing data, identify typical UE distribution patterns based on AI classification algorithms and UE history measurement and location information, and create scenario-specific ray-tracing data based on typical UE distribution patterns.

20 Claims, 49 Drawing Sheets

Related U.S. Application Data filed on Oct. 5, 2018, provisional application No. 62/719,964, filed on Aug. 20, 2018, provisional application No. 62/679,409, filed on Jun. 1, 2018.

(51) Int. Cl.
  *H04W 88/12* (2009.01)
  *G06N 3/02* (2006.01)
  *H04W 88/02* (2009.01)
  *H04B 17/309* (2015.01)

(52) U.S. Cl.
  CPC .......... *H04B 17/309* (2015.01); *H04W 88/02* (2013.01); *H04W 88/12* (2013.01)

(58) Field of Classification Search
  USPC .................. 375/262, 260, 267; 370/324, 316
  See application file for complete search history.

(56) References Cited

U.S. PATENT DOCUMENTS

| | | |
|---|---|---|
| 2015/0257073 A1 | 9/2015 | Park et al. |
| 2016/0065284 A1 | 3/2016 | Yu et al. |
| 2016/0323075 A1 | 11/2016 | Jeong et al. |
| 2016/0330643 A1* | 11/2016 | Sahin .................... H04W 16/14 |
| 2017/0208496 A1 | 7/2017 | Chow |
| 2017/0265111 A1 | 9/2017 | Fan et al. |
| 2019/0116605 A1* | 4/2019 | Luo .................... H04B 7/15542 |
| 2019/0230544 A1* | 7/2019 | Zhu ...................... H04B 7/0617 |
| 2019/0280836 A1* | 9/2019 | Bhattad ................ H04L 5/0048 |
| 2019/0281511 A1* | 9/2019 | Susitaival ............. H04W 36/36 |
| 2019/0281587 A1* | 9/2019 | Zhang .................. H04W 72/10 |

OTHER PUBLICATIONS

R.S. Sutton, et al. 'Reinforcement Learning: An Introduction', MIT press, 2017, 445 pages.

V. Mnih, et al. "Playing Atari with Deep Reinforcement Learning", NIPS Deep Learning Workshop, Dec. 19, 2013, pp. 1-9.

V. Mnih, et.al., "Human-level control through deep reinforcement learning", Nature, vol. 518, Feb. 26, 2015, 13 pages.

R. Razavi, et al. "A fuzzy reinforcement learning approach for self-optimization of coverage in LTE networks," Bell Labs Tech. J., vol. 15, No. 3, Dec. 2010, pp. 153-175.

G. M. Kautz, "Phase-only shaped beam synthesis via technique of approximated beam addition," IEEE Transactions on Antennas and Propagation, vol. 47, No. 5, May 1999, pp. 887-894.

International Search Report and Written Opinion regarding Application No. PCT/KR2019/006604, dated Sep. 16, 2019, 10 pages.

* cited by examiner

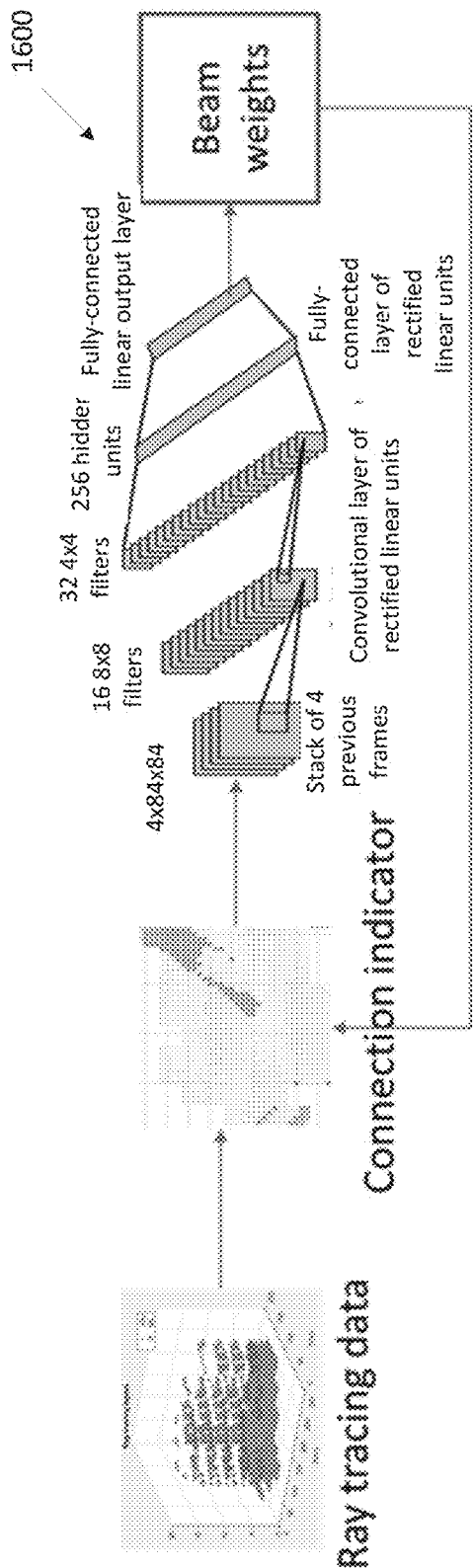
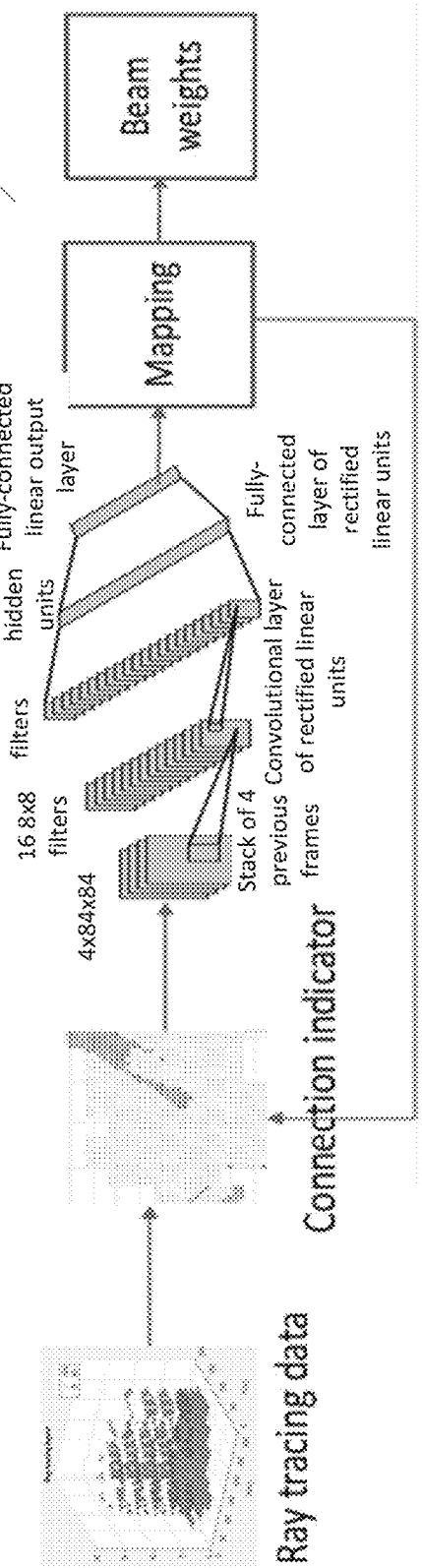
FIG. 16A
FIG. 16B

METHOD AND APPARATUS FOR MACHINE LEARNING BASED WIDE BEAM OPTIMIZATION IN CELLULAR NETWORK

CROSS-REFERENCE TO RELATED APPLICATION(S) AND CLAIM OF PRIORITY

The present application claims priority to:
U.S. Provisional Patent Application Ser. No. 62/679,409, filed on Jun. 1, 2018;
U.S. Provisional Patent Application Ser. No. 62/741,982, filed on Oct. 5, 2018;
U.S. Provisional Patent Application Ser. No. 62/719,964, filed on Aug. 20, 2018; and
U.S. Provisional Patent Application Ser. No. 62/743,919, filed on Oct. 10, 2018.
The content of the above-identified patent documents are incorporated herein by reference.

TECHNICAL FIELD

The present application relates generally to signal reporting. More specifically, this disclosure relates to machine learning based wide beam optimization in cellular networks.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra-reliable low latency (URLLC), massive machine type communication (mMTC), each corresponding to a different coverage requirement and frequency bands with different propagation losses is desirable.

SUMMARY

Embodiments of the present disclosure provide machine learning based wide beam optimization in cellular networks.

In one embodiment, a user equipment (UE), a user equipment (UE) in a wireless communication system is provided. The UE comprises a transceiver configured to: receive, from a central controller (CC) via a base station (BS), information of a first beam that is used in a measurement report; and transmit, to the CC via the BS, the measurement report including a measurement result of the first beam. The first beam for the BS is selected, by the CC, from a set of beams in a candidate beam pool including predetermined candidate beams, the set of beams being allocated to the BS; consecutive measurement results corresponding to the set of beams in the candidate beam pool along with the measurement result of the first beam are preprocessed by the CC; beam scores for the first beam based on the measurement result of the first beam are calculated by the CC; and a second beam based on the beam scores is selected by the CC, the second beam being determined as a beam including a highest score among the set of beams in the candidate beam pool.

In another embodiment, a central controller (CC) in a wireless communication system is provided. The CC comprises a processor configured to: select, from a set of beams in a candidate beam pool including predetermined candidate beams, a first beam for each of base stations (BSs), wherein the set of beams is allocated to the BSs; and instruct each of the BSs to transmit, to user equipments (UEs) belonging to each of the BSs, signals with the first beam that is used in a measurement report by the UEs. The CC further comprises a transceiver operably connected to the processor, the transceiver configured to: transmit, to each of the BSs, information of the first beam; receive, from the UEs via the BSs, the measurement report including a measurement result of the first beam, wherein the processor is further configured to: preprocess, for each of the BSs, consecutive measurement results that correspond to the set of beams in the candidate beam pool along with the measurement result of the first beam; calculate, for each of the BSs, beam scores for the first beam based on the consecutive measurement results of the first beam; and select, for each of the BSs, a second beam based on the beam scores, wherein, for each of the BSs, the second beam is determined as a beam including a highest score among the set of beams in the candidate beam pool.

In yet another embodiment, a method of a central controller (CC) in a wireless communication system is provided. The method comprises selecting, from a set of beams in a candidate beam pool including predetermined candidate beams, a first beam for each of base stations (BSs), wherein the set of beams is allocated to the BSs; instructing each of the BSs to transmit, to user equipments (UEs) belonging to each of the BSs, signals with the first beam that is used in a measurement report by the UEs; transmitting, to each of the BSs, information of the first beam; receiving, from the UEs via the BSs, the measurement report including a measurement result of the first beam; preprocessing, for each of the BSs, consecutive measurement results that correspond to the set of beams in the candidate beam pool along with the measurement result of the first beam; calculating, for each of the BSs, beam scores for the first beam based on the consecutive measurement results of the first beam; and selecting, for each of the BSs, a second beam based on the beam scores. For each of the BSs, the second beam is determined as a beam including a highest score among the set of beams in the candidate beam pool.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16A illustrates an example neural network according to embodiments of the present disclosure;

FIG. 16B illustrates an example neural network with mapping according to embodiments of the present disclosure;

DETAILED DESCRIPTION

FIG. 1 through FIG. 41E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
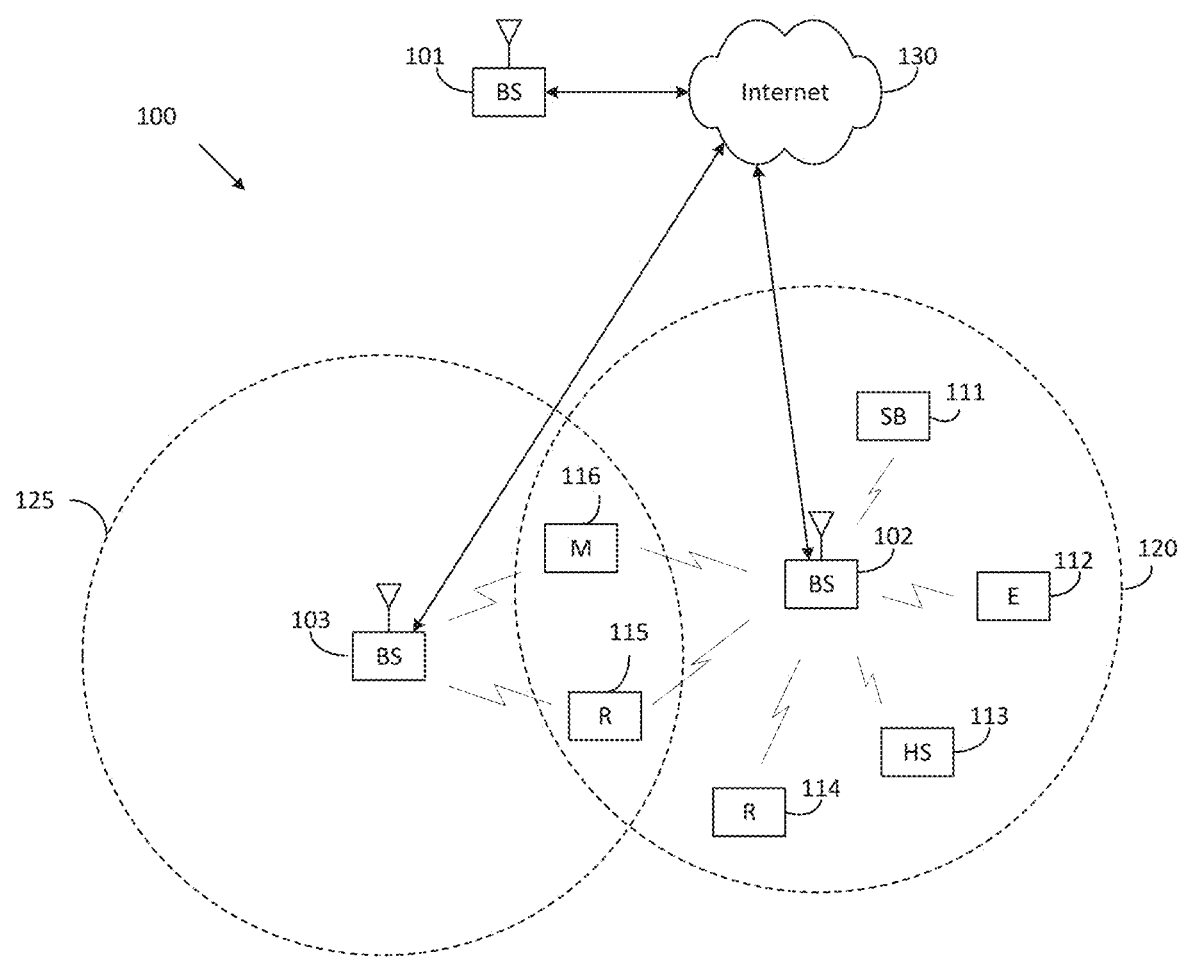
FIG. 1 illustrates an example wireless network according to embodiments of the present disclosure.
Figure 2A:
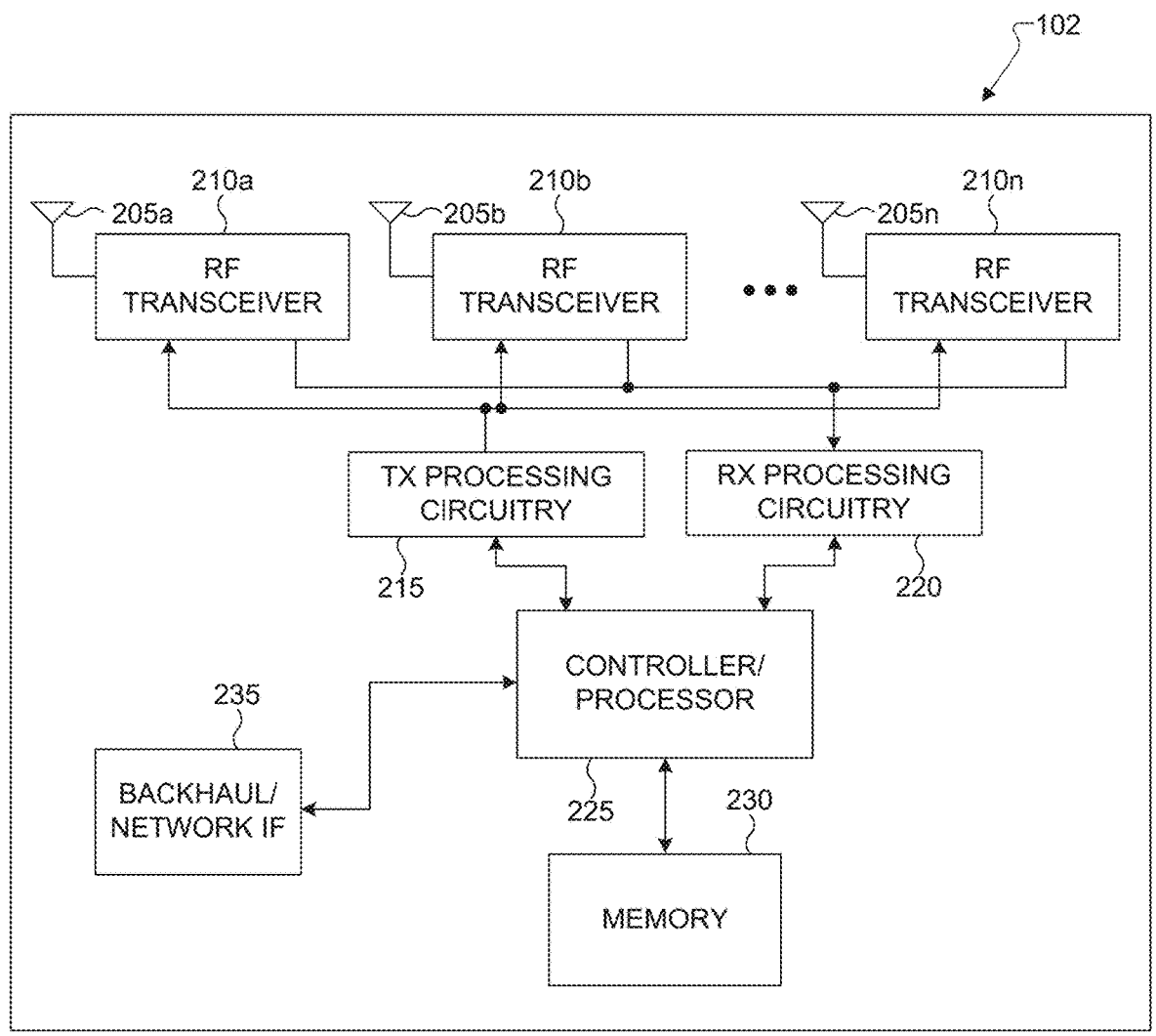
FIG. 2A illustrates an example eNB according to embodiments of the present disclosure.
Figure 2B:
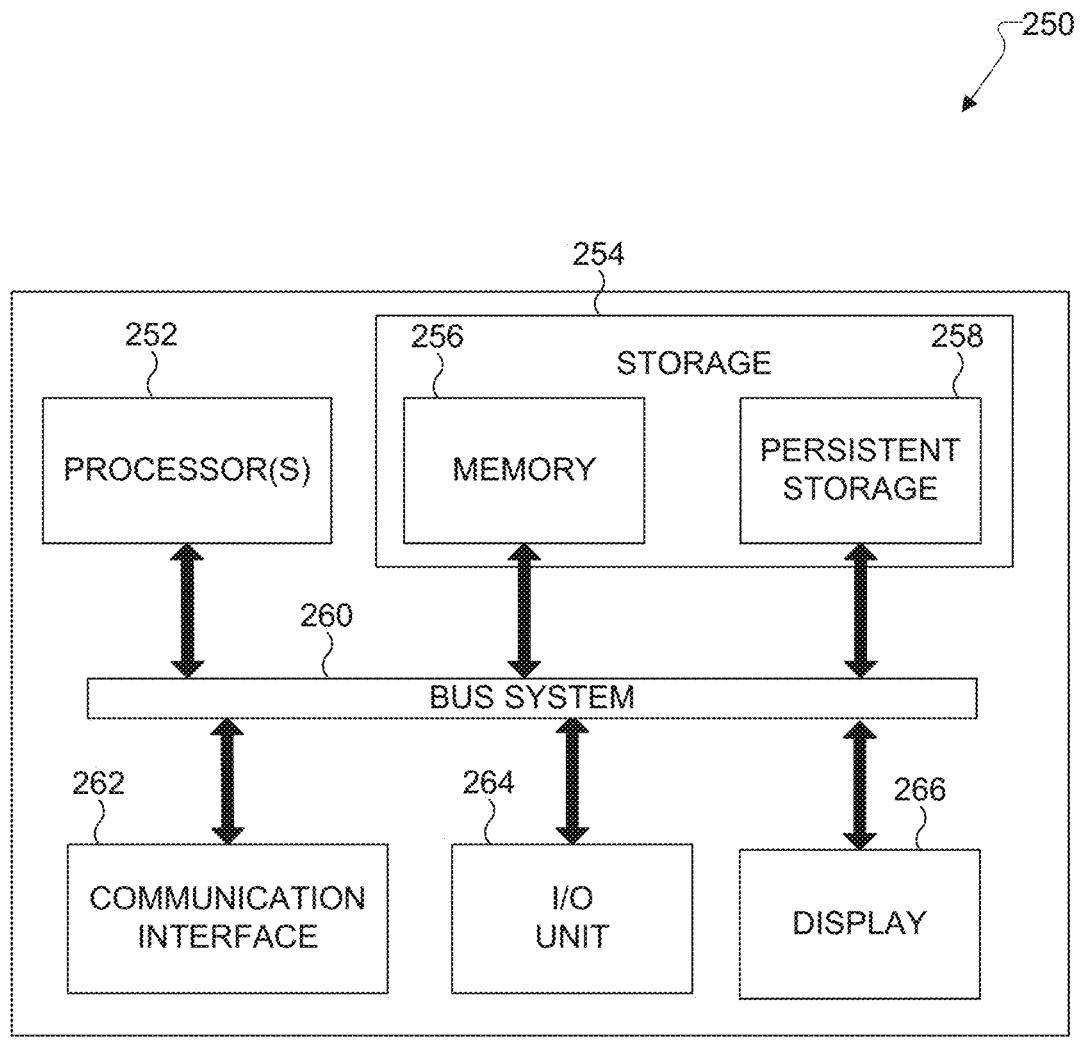
FIG. 2B illustrates an example server in a computing system according to embodiments of the present disclosure.
Figure 3:
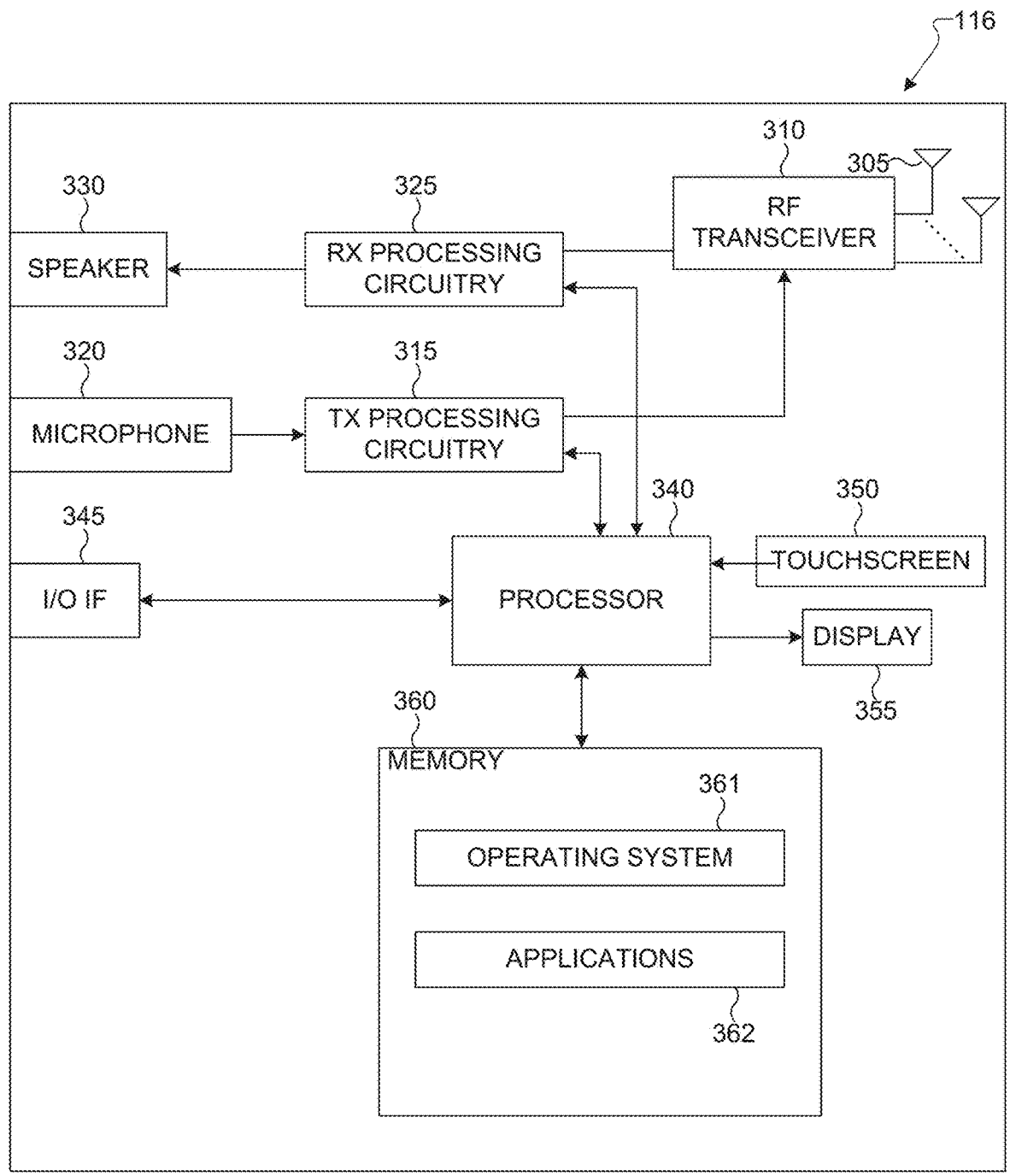
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient machine learning based wide beam optimization in an advanced wireless communication system. In certain embodiments, and one or more of the eNBs 101-103 includes circuitry, programming, or a combination thereof, for receiving efficient machine learning based wide beam optimization in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2A illustrates an example eNB 102 according to embodiments of the present disclosure. The embodiment of the eNB 102 illustrated in FIG. 2A is for illustration only, and the eNBs 101 and 103 of FIG. 1 could have the same or similar configuration. However, eNBs come in a wide variety of configurations, and FIG. 2A does not limit the scope of this disclosure to any particular implementation of an eNB.

As shown in FIG. 2A, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2A illustrates one example of eNB 102, various changes may be made to FIG. 2A. For example, the eNB 102 could include any number of each component shown in FIG. 2A. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2A could be combined, further subdivided, or omitted and additional components could be added according to particular needs.

FIG. 2B illustrates an example server 250 in a computing system according to embodiments of the present disclosure. As illustrated in FIG. 2B, the server 250 could represent the eNBs 101, 102, 103 in FIG. 1 or a network entity (such as mobility management entity (MME), serving-gateway (S-GW), mobility switching center (MSC), a network agent, or data unit/multi-input-multi-output (DU/MM)), etc.).

In one embodiment, the server 250 could be deployed as an internal that is installed in the eNBs 101, 102, 103. In another embodiment, the server 250 could be deployed as an external device for the eNBs 101, 102, 103, for example, the network entities (such as mobility management entity (MME), serving-gateway (S-GW), and/or mobility switching center (MSC) or data unit/multi-input-multi-output (DU/MM)), etc.).

As shown in FIG. 2B, the server 250 includes a bus system 260, which supports communication between at least one processor 252, at least one storage 254, at least one communication interface 262, at least one input/output (I/O) unit 264, and at least one display 260.

The processor 252 executes instructions that may be loaded into a memory 256. The processor 252 may include any suitable number(s) and type(s) of processors or other devices in any suitable arrangement. Example types of the processor 252 include microprocessors, microcontrollers, digital signal processors, field programmable gate arrays, application specific integrated circuits, discreet circuitry, and video stream processors. In one embodiment, the process 252 may include a neural network or be connected to a neural network to compute data received from outside of the server 250, for example, from a UE and/or a BS (e.g., eNB, or gNB) as illustrated in FIG. 1.

The memory 256 and a persistent storage 258 are examples of storage devices 254, which represent any structure(s) capable of storing and facilitating retrieval of information (such as data, program code, and/or other suitable information on a temporary or permanent basis). The memory 256 may represent a random access memory or any other suitable volatile or non-volatile storage device(s). The persistent storage 258 may contain one or more components or devices supporting longer-term storage of data, such as a ready only memory, hard drive, flash memory, or optical disc. The display 266 may include a panel, a hologram device, or a projector to display any object (such as a text, a video, an image, graphic and/or other suitable information).

The communication interface 262 supports communications with other systems or devices. For example, the communication interface 262 could include a network interface card or a wireless transceiver facilitating communications over the network 100. The communication interface 262 may support communications through any suitable physical or wireless communication link(s).

The I/O unit 264 allows for input and output of data. For example, the I/O unit 264 may provide a connection for user input through a keyboard, mouse, keypad, touchscreen, or other suitable input device. The I/O unit 264 may also send output to a display, printer, or other suitable output device.

Note that while FIG. 2B is described as representing the server 250 of FIG. 2B, the same or similar structure could be used in one or more of the client devices 111-116 as illustrated in FIG. 1. For example, a laptop or desktop computer could have the same or similar structure as that shown in FIG. 2B. Any of these types of devices may implement the above discussed features of the server 250.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
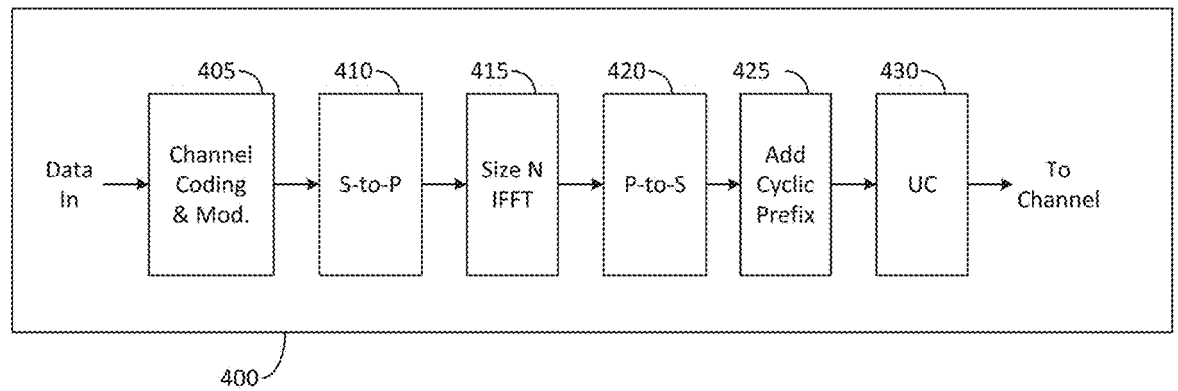
FIG. 4A illustrates a high-level diagram of an orthogonal frequency division multiple access transmit path according to embodiments of the present disclosure.
Figure 4B:
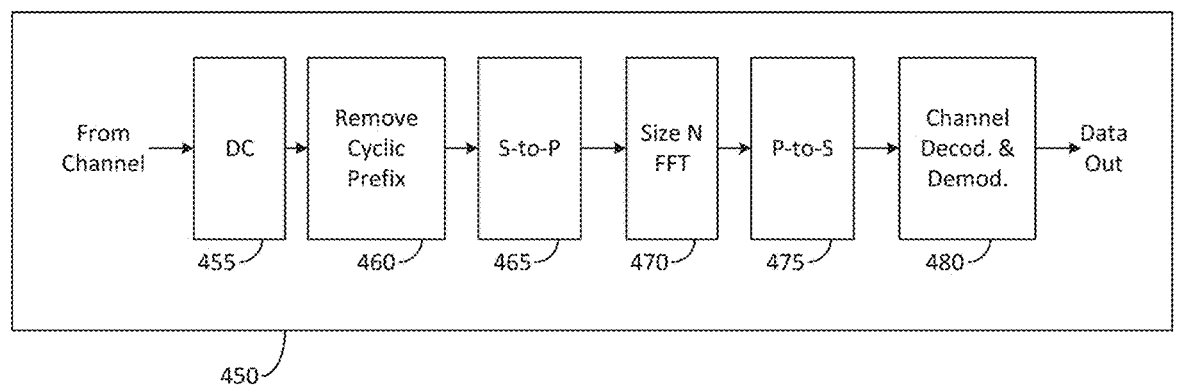
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 5:
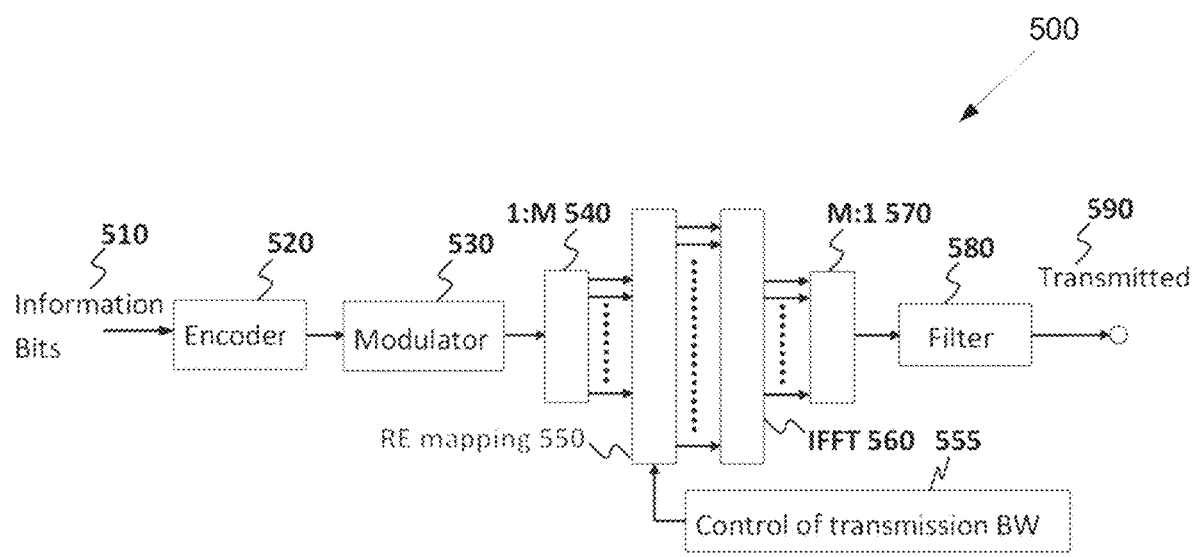
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
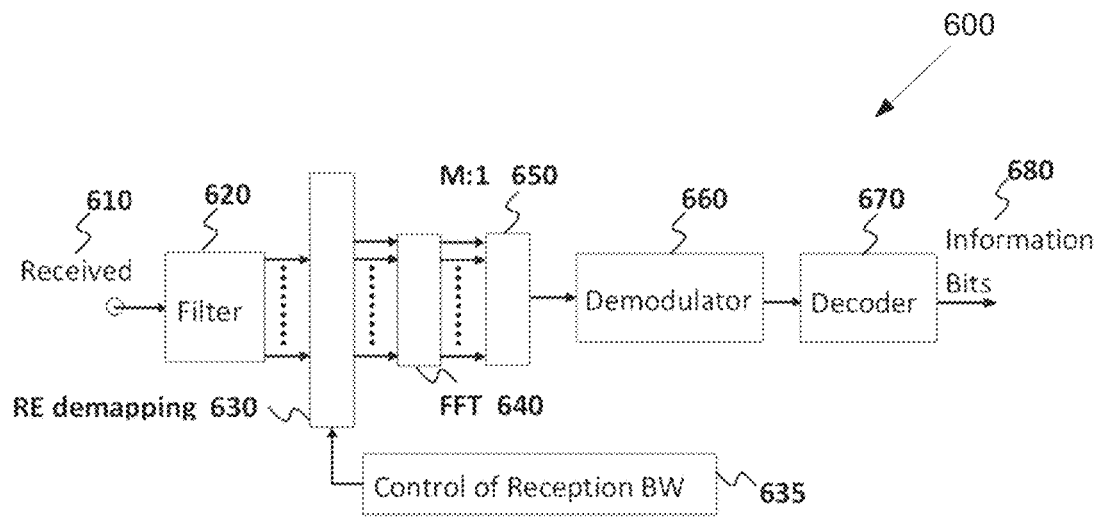
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
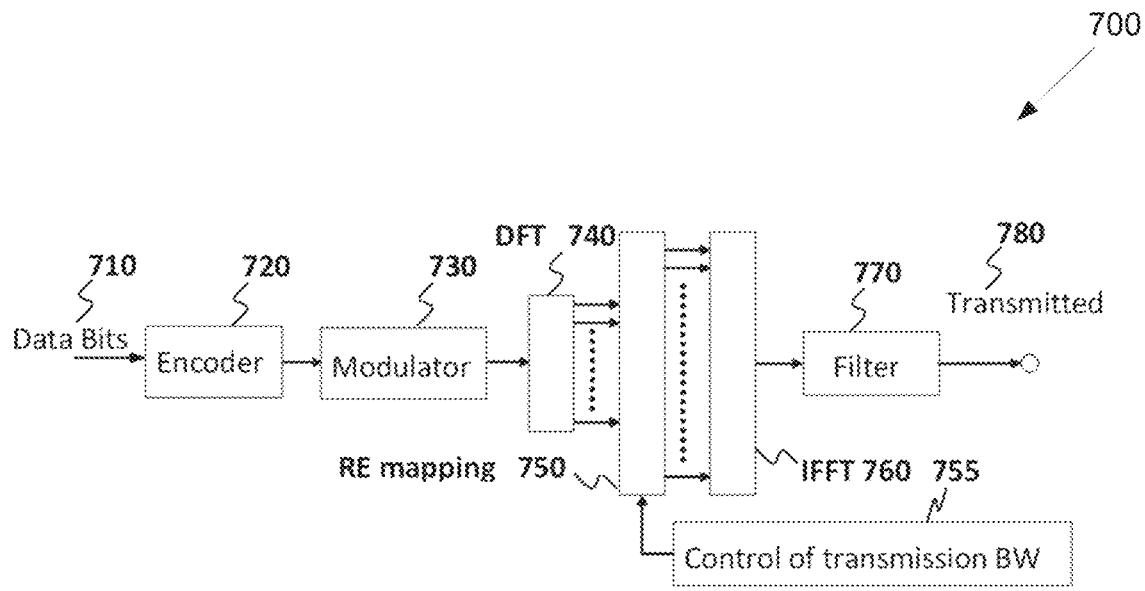
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
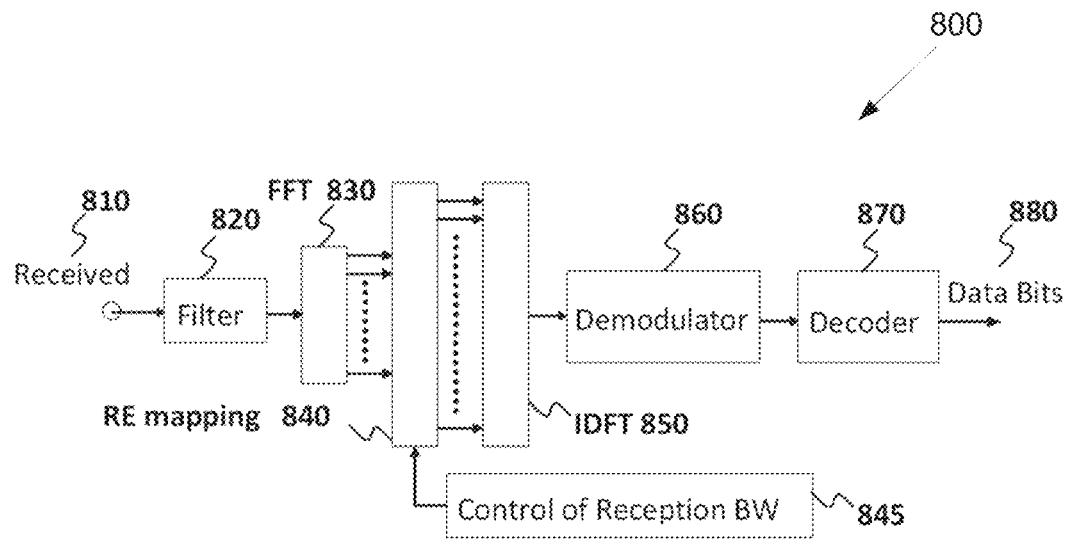
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband" (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

In order for the 5G network to support such diverse services with different quality of services (QoS), one scheme has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
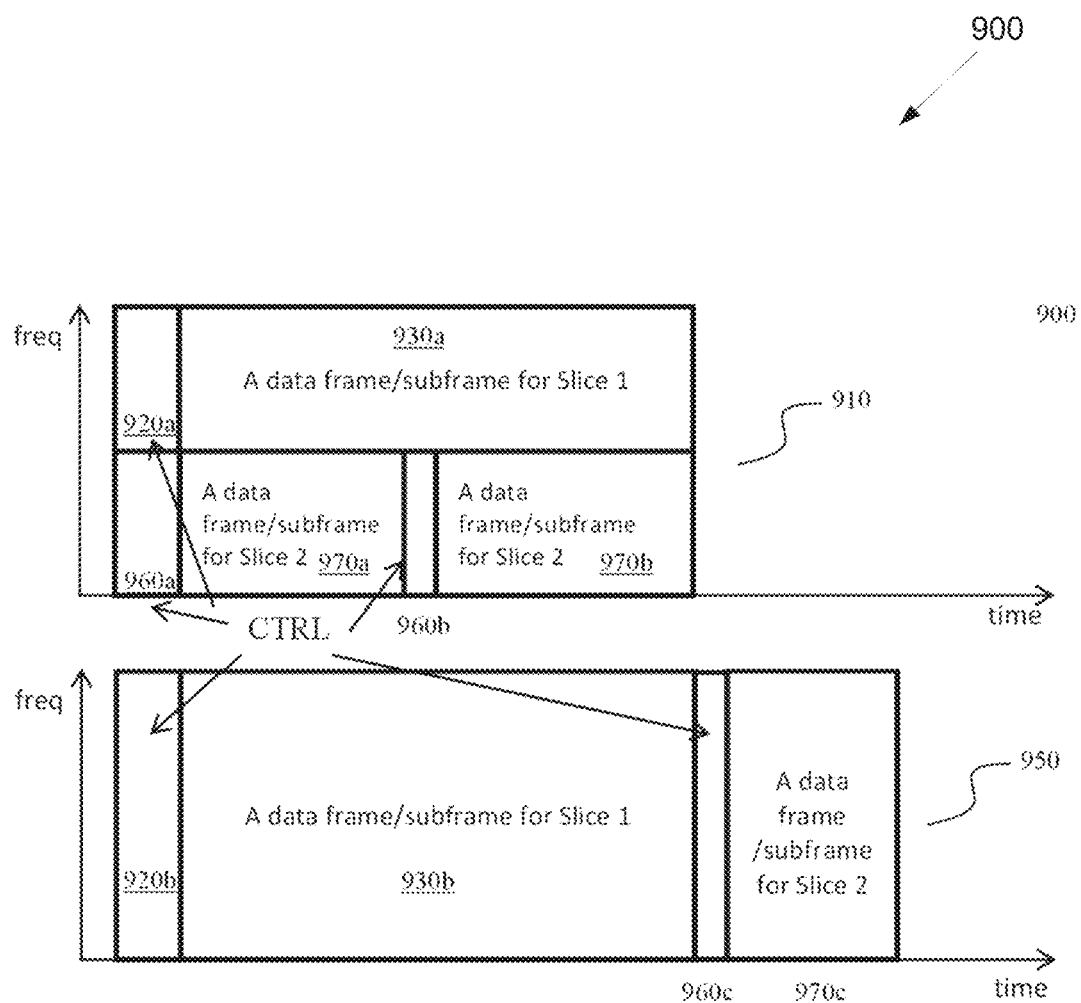
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
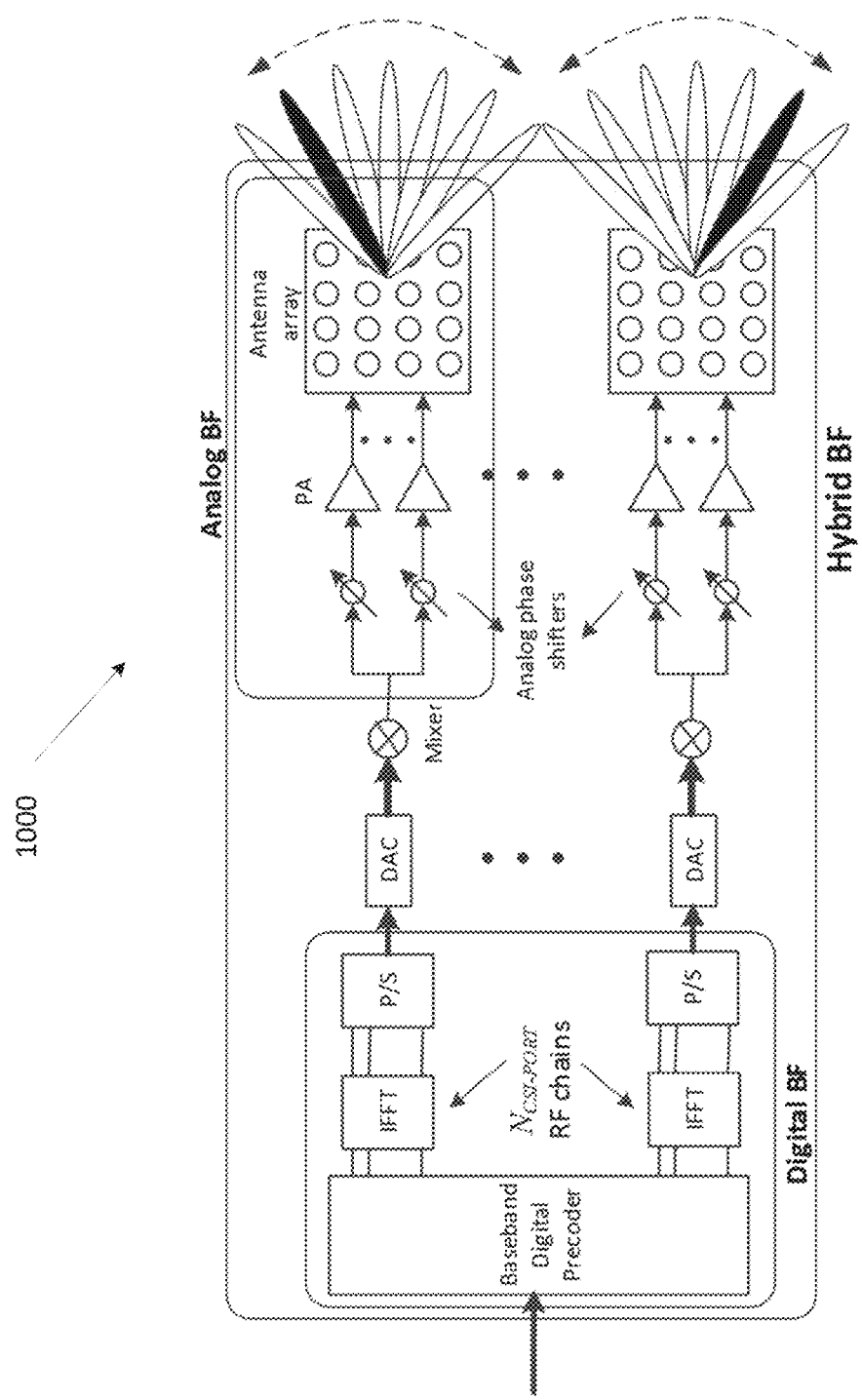
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports —which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

The increased density of mobile networks and the need of higher data rate make the system operation and maintenance more challenging in terms of workload and cost, especially in small cells and heterogeneous networks. In light of this, self-organizing networks (SON) constitute a novel approach that empowers operators to reduce the amount of manual intervention involved in network planning. In SON, tuning the antenna beam width and e-tilt angle to create a wide common beam is one of the main features. The wide common beam may be able to provide a wide coverage of the connected cell meanwhile reduce the interference to neighbor cells. In other words, the wide beam may be able to be adaptive to the cell environment and UE distribution.

Conventionally, the wide common beam synthesis is done indirectly with the cell optimization, which is trying to solve the following problem: to synthesis a wide beam according to a given radiation pattern. However, this approach may not directly improve the cell coverage performance considering the real mobile environment such as building blockage, etc. Recently, machine learning tools have been applied to improve the performance of SONs.

Fuzzy Q-learning is applied to tune the e-tilt angles in cellular networks. A multi-armed bandit method is applied to tune the e-tilt angle and transmit power in small cells. However, these solutions do not directly synthesis a wide beam, nut these solutions focus on tuning the e-tilt and power only.

In the present disclosure, a new algorithm is applied to synthesis a wide common beam which can directly optimize the cell coverage in static mobile environment. Furthermore, in one embodiment, multi-armed bandit algorithm which can jointly tune the antenna beam width and e-tilt angle to improve the cell coverage is provided in dynamic cell environment. The designed algorithms are based on UE measurements and do not need human intervention. In the present disclosure, the initial simulation results demonstrate that our designed algorithm can improve the cell coverage by 79%~116% in static environment. To the best of our knowledge, this is the first work which tries to use machine learning to synthesis a wide common beam in cellular networks.

Figure 11:
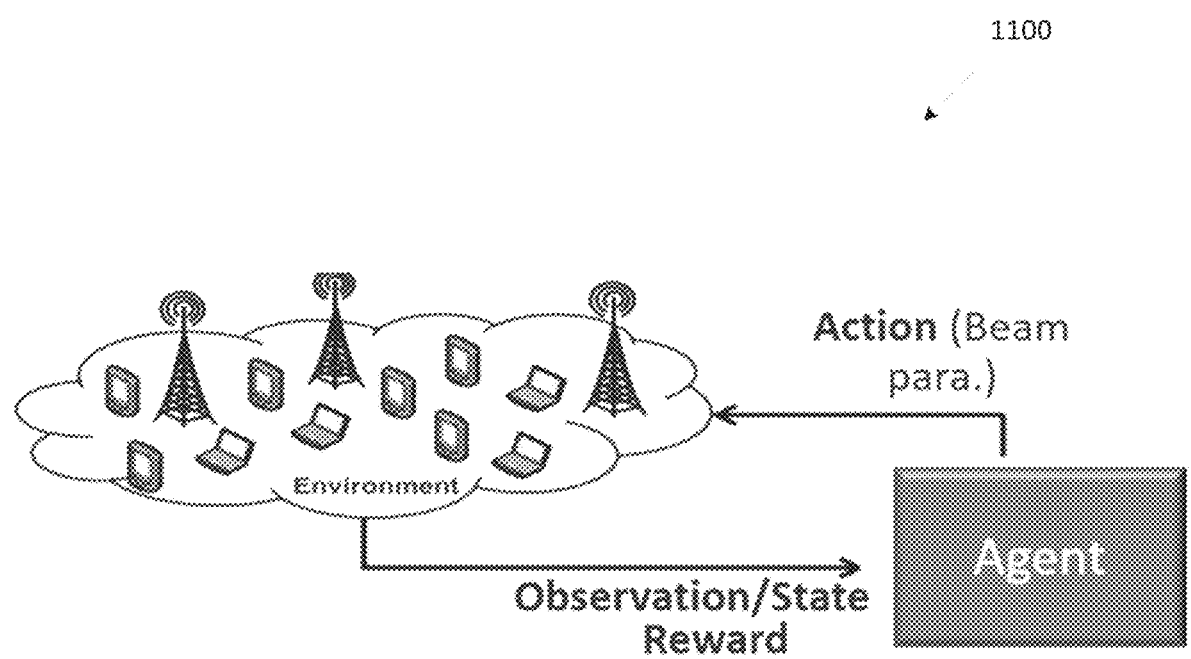
FIG. 11 illustrates an example system model according to embodiments of the present disclosure.

FIG. 11 illustrates an example system model 1100 according to embodiments of the present disclosure. The embodiment of the system model 1100 illustrated in FIG. 11 is for illustration only. FIG. 11 does not limit the scope of this disclosure to any particular implementation.

A typical cellular network consisting of M BSs and N UEs is illustrated in FIG. 11. It is assumed that the BSs are configured with one antenna arrays whose phase can be configured so that different array beam width and e-tilt angle can be synthesized. In the present disclosure, it is focused on tuning the array phase and extension on tuning both phase and amplitude remains as our future work. An agent responsible for antenna configurations may select the proper antenna beam weights for the cells.

This selection behavior is named actions in reinforcement learning. The cells may transmit cell-specific signals using the wide common beam decided by the agent. UEs may collect measurements results (e.g., reference signal received power (RSRP) or reference signal received quality (RSRQ)) etc., and report them to the agent as the observation of the mobile environment. The agent can derive the rewards (for example, number of connected UEs) of the previous actions.

The rewards reflect how the agent action affects the performance of networks and help the agent learn the mobile environment. Based on accumulated rewards, the agent then selects new actions, i.e., new antenna weights, to potentially improve the cell coverage.

It is considered that two application scenarios are applied, for example, static scenario where the UEs are assumed to be static and dynamic scenario where UEs are assumed to be moving according to some mobility pattern. Each UE is assumed to connect to the BS with the highest received power. A UE is assumed to be connected if the received signal-to-interference-plus-noise ratio (SINR) is above a threshold T.

In one embodiment, a scheme is provided to solve the wide beam synthesis in static environment. In static scenarios, consecutive measurements from UEs may have similar value. In this case, fine tuning on antenna beam weights is possible using genetic algorithms. To be specific, for each iteration, the agent may generate a generation of the antenna beam weights sets. A beam weights set includes beam weights for the cells. After receiving the weights, each BS may transmit the cell-specific signals using the new wide common beam and receive the measurements from UEs. The agent then may select the antenna weights with better performance to generate new antenna weights by mutation and crossover operations in genetic algorithm. The detailed algorithm is summarized in the following algorithm 1 in TABLE 1.

TABLE 1

Antenna selection algorithm

Algorithm 1: Wide beam synthesis for static scenario
Step 1: Initialize a generation of antenna weights sets for the cells.
Step 2: Optimize the beam weights for the cells.
Step 2.1: For each beam weights set in a generation:
Step 2.1.1: The agent sends out the beam weights to each cell. the BSs transmit cell-specific signals using the new antenna beam weights.
Step 2.1.2: BSs receive UE measurements and report the measurements to the agent. The agent calculates the number of connected UEs for the antenna beam weight set.
Step 2.2: The agent selects the best K antenna weights, according to the number of connected UEs, out of the current generation to breed a new generation by crossover and mutation operation.
Step 2.3: Check stop condition. If the stop condition is met, output the best antenna weights from the current generation; otherwise, go back to Step 2.1.

In the algorithm 1 above, it is assumed that the cells may adjust their beam weights simultaneously. This can reduce the convergence time of the algorithm meanwhile this joint optimization can further improve the network coverage by taking the interference from other cells into account. It is an easy extension to implement the algorithm 1 in a way that the optimization is in a cell-by-cell manner. Details on the algorithm 1 are also captured in FIG. 12A.

Figure 12A:
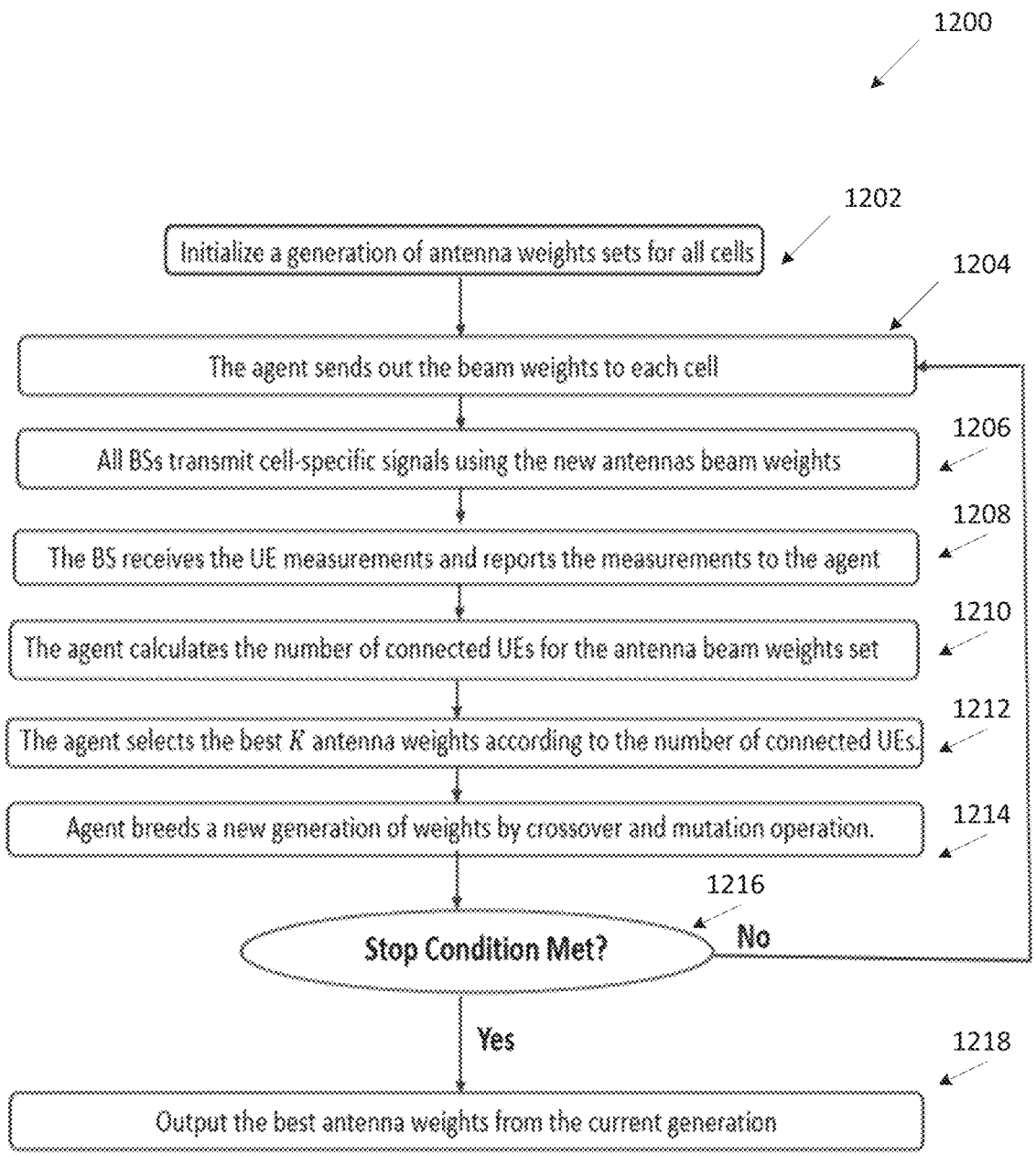
FIG. 12A illustrates a flow chart of a method for optimization according to embodiments of the present disclosure.

FIG. 12A illustrates a flow chart of a method 1200 for optimization according to embodiments of the present disclosure. The embodiment of the method 1200 illustrated in FIG. 12A is for illustration only. FIG. 12A does not limit the scope of this disclosure to any particular implementation. The advantage of this embodiment is that ray-tracing is not a necessary of this system. The whole system could work after the antenna is deployed.

As illustrated in FIG. 12A, the method 1200 begins at step 1202. In step 1202, the method 1200 initialize a generation of antenna weights sets for the cells. In step 1204, an agent sends out the beam weights to each cell. All BSs transmit cell-specific signaling using the new antenna beam weights in step 1206. The BS receives in step 1208 the UE measurement and reports the measurements to the agent. In step 1210, the agent calculates the number of connected UEs for the antenna beam weights set. The agents 1212 select the best K antenna weights according to the number of connected UEs. The agent breeds a new generation of weights by crossover and mutation operation in step 1214. The method 1200 determine whether a stop condition is met in step 1206. If the stop condition is met, the best antenna weights from the current generation are determined in step 1218. In step 1216, if the stop condition is not met, the method 1200 begins step 1206.

In one embodiment, the wide beam synthesis method is described for initial cell planning. The input of this system is the ray-tracing data where the received power from the UE to the base station of each path as well as the AoA, AoD, ZoA and ZoD etc., are known. In one embodiment, there is no need for UEs to report their measurement to control centers. The performance of the UEs could be estimated out by the ray-tracing data. This embodiment could provide wide beam results for both single cell case and multiple cell case. The output of the system may be the best wide beam weights for each cell.

The system diagram could look like in the following FIGS. 12B and 12C. The input to the diagram could be the ray-tracing results including (AoA, AoD, ZoA, ZoD, power per path) etc. Then these data may be used to calculate the path loss. Based on the pathloss and ray-tracing data the algorithm embodiment may generate the wide beams. These wide beams could be beam width, including azimuth beam width, elevation beam width, tilt, and angle. In another embodiment, the output may be the beam weights.

Figure 12B:
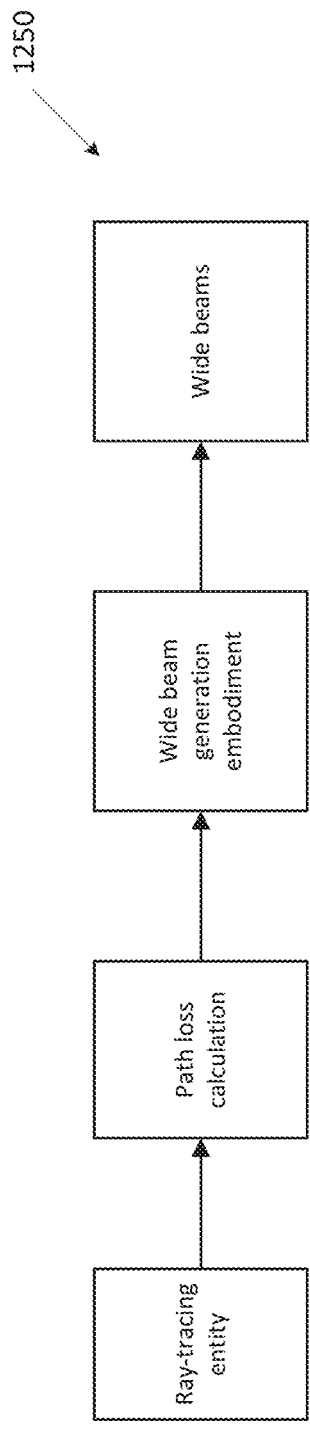
FIG. 12B illustrates an example block diagram for wide beam according to embodiments of the present disclosure.

FIG. 12B illustrates an example block diagram 1250 for wide beam according to embodiments of the present disclosure. The embodiment of the block diagram 1250 illustrated in FIG. 12B is for illustration only. FIG. 12B does not limit the scope of this disclosure to any particular implementation.

Figure 12C:
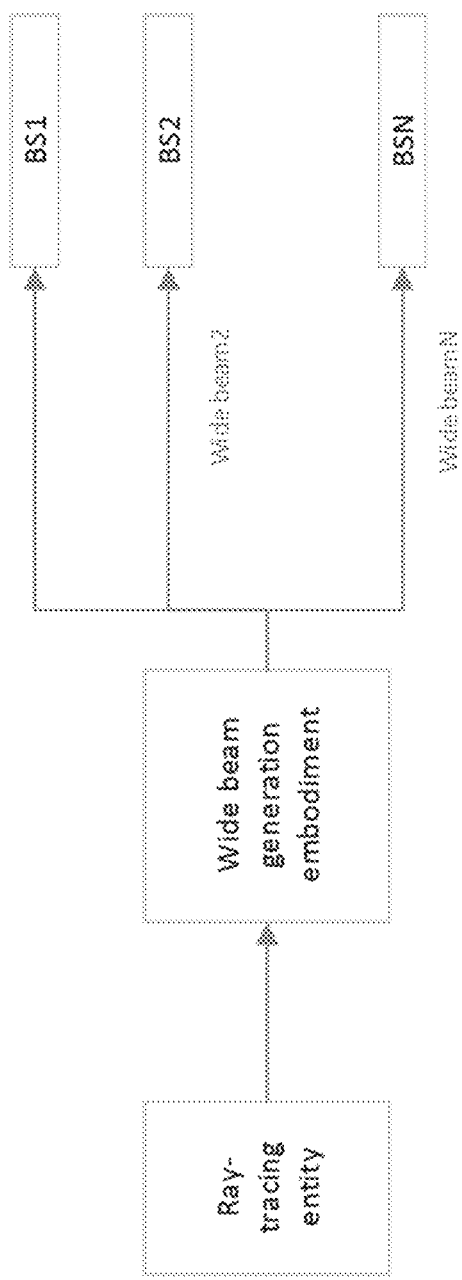
FIG. 12C illustrates an example system diagram according to embodiments of the present disclosure.

FIG. 12C illustrates an example system diagram 1270 according to embodiments of the present disclosure. The embodiment of the system diagram 1270 illustrated in FIG. 12C is for illustration only. FIG. 12C does not limit the scope of this disclosure to any particular implementation.

FIG. 12C shows the information flow. The raytracing entity may provide ray-tracing data or path loss to the wide beam generation embodiment. Then based on this ray-tracing data, the wide beam generation modular may generate cell specific wide beams for each base station.

In one embodiment, the ray-tracing data is considered to calculate the performance metric of the cell. The performance metric could be X-percentile SINR, here X can be any real number from 0 to 100. For example, X could be 5, 50 or 90. In another example, the performance metric could be the number of users whose SINR or received power or RSRP is larger than a threshold. Then the scheme may take the calculated performance metric to see whether the scheme meets the converge condition. The convergence condition could be the difference between previous Y consecutive performance metric remain unchanged or within a certain threshold Z. In another example, the condition could be the maximum iteration number is reached. If the convergence condition is not met, this embodiment may select the top K weights, crossover and mutate them to breed a new generation of weights. One example of the flow chart is shown in FIG. 13A.

Figure 13A:
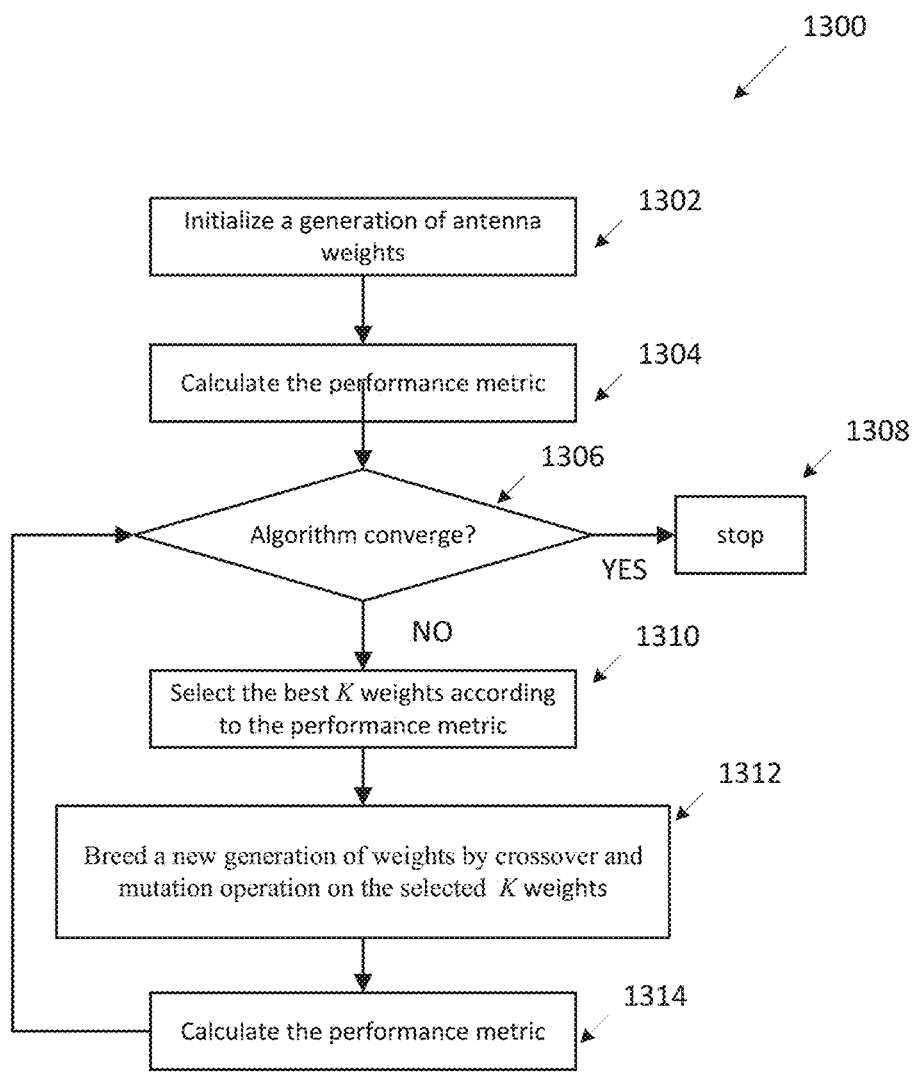
FIG. 13A illustrates a flowchart of a method for wide beam synthesis in single cell according to embodiments of the present disclosure.

FIG. 13A illustrates a flowchart of a method 1300 for wide beam synthesis in single cell according to embodiments of the present disclosure. The embodiment of the method 1300 illustrated in FIG. 13A is for illustration only. FIG. 13A does not limit the scope of this disclosure to any particular implementation.

As illustrated in FIG. 13A, the method 1300 begins at step 1302. In step 1302, the method 1300 initializes a generation of antenna weights. In step 1304, the method 1300 calculates the performance metric. In step 1306, the method 1300 determines whether an algorithm converges to the result of calculation. If converged, the method 1300 stops in step 1308. If not converged in step 1306, the method 1300 selects the best K weights according to the performance metric in step 1310. In step 1312, the method 1300 breeds a new generation of weights by crossover and mutation operation on the selected K weights. The method 1300 in step 1314 calculates the performance metric and then the method 1300 repeats step 1306.

Figure 13B:
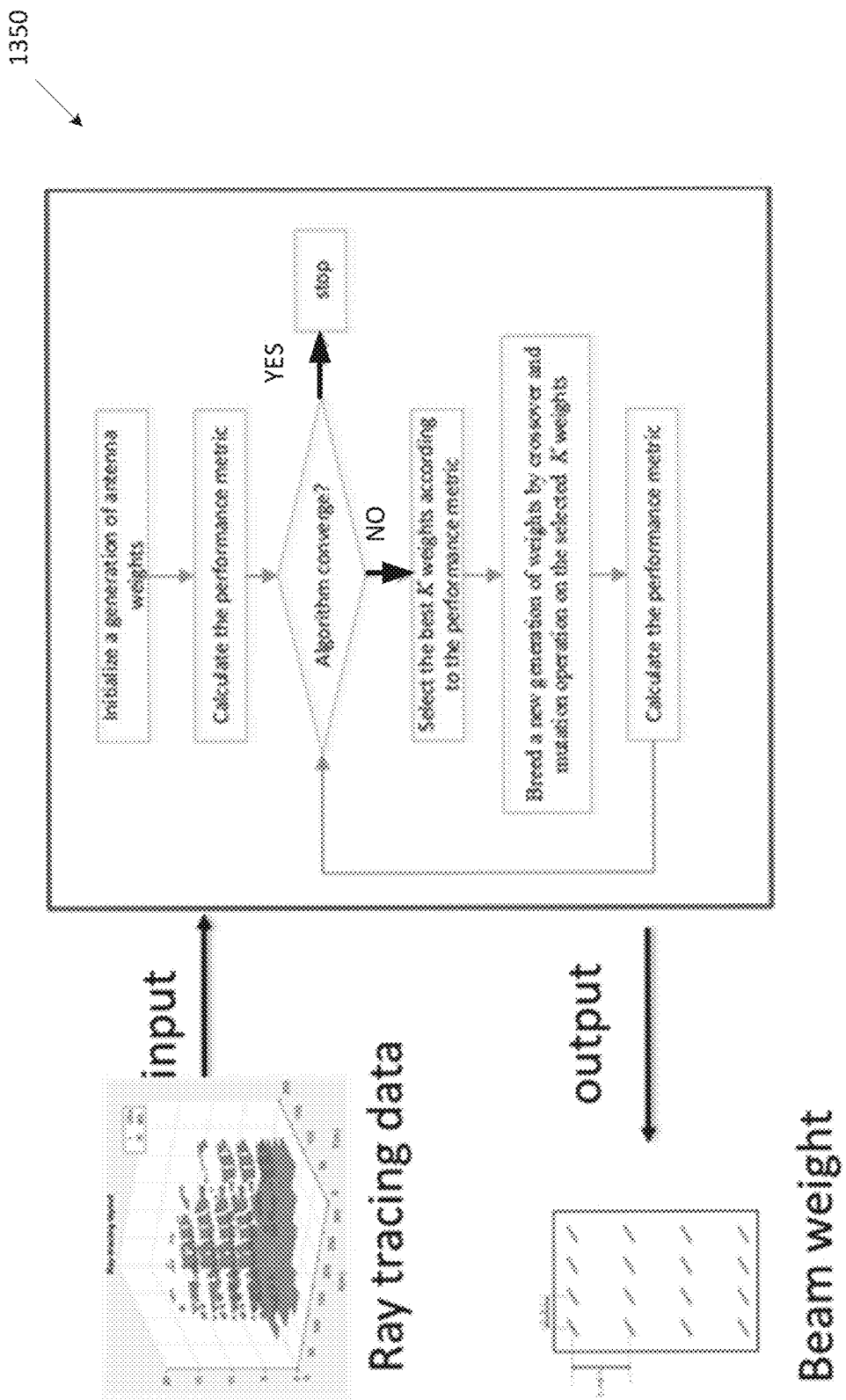
FIG. 13B illustrates an example input/output flow according to embodiments of the present disclosure.

FIG. 13B illustrates an example input/output flow 1350 according to embodiments of the present disclosure. The embodiment of the input/output flow 1350 illustrated in FIG. 13B is for illustration only. FIG. 13B does not limit the scope of this disclosure to any particular implementation.

FIG. 13B shows the input and output relationship for single cell beam synthesis. The input to the diagram is the raytracing data or any data that could calculate the path loss from the base station to each UE. The output of the diagram is the antenna beam weights.

In one embodiment, wide beams for multiple cells are optimized. The processor or server may take the ray-tracing data as input and output the beam weights for each cell. The beam weighs could be phase tuning only beam weights, i.e., the weights have the same amplitude, or the beam weights could be amplitude tuning only beam weights, or the beam weights have difference both on amplitude and phase.

Figure 14A:
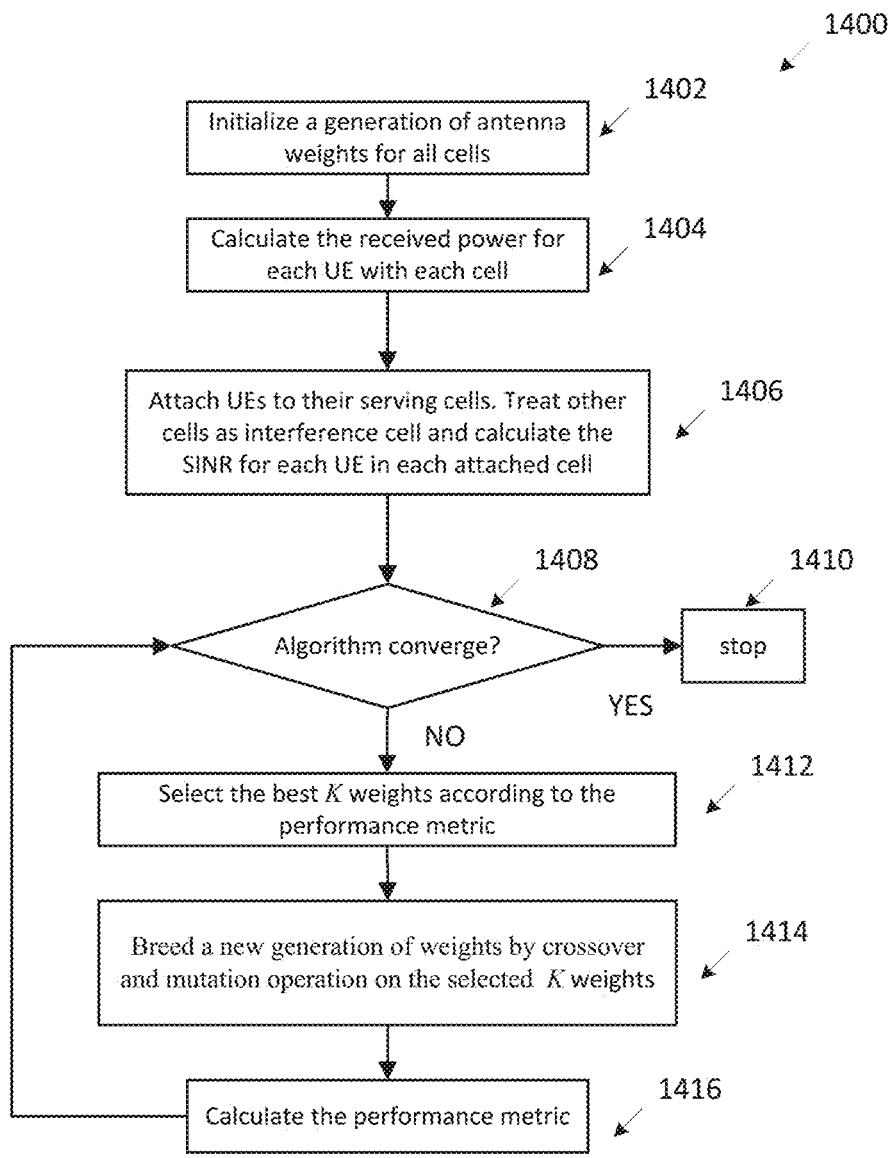
FIG. 14A illustrates a flowchart of a method for beam synthesis for multiple-cell according to embodiments of the present disclosure.

FIG. 14A illustrates a flowchart of a method 1400 for beam synthesis for multiple-cell according to embodiments of the present disclosure. The embodiment of the method 1400 illustrated in FIG. 14A is for illustration only. FIG. 14A does not limit the scope of this disclosure to any particular implementation.

As illustrated in FIG. 14A, the method 1400 begins at step 1402. In step 1402, the method 1400 initializes generation of antenna weights for the cells. In step 1404, the method 1400 calculates the received power for each UE with each cell. The method 1400 in step 1406 attaches UEs to their serving cell and treats other cells as interference cell and calculates the SINR for each UE in each attached cell. In step 1408, the method 1400 determines whether an algorithm converges the result of step 1406. In step 1408, if it converges, the method stops in step 1410. In step 1412, the method 1400 selects the beat K weights according to the performance metric. In step 1414, the method 1400 breeds a new generation of weights by crossover and mutation operation on the selected K weights. In step 1416, the method 1400 calculates the performance metric and then performs step 1408.

Figure 14B:
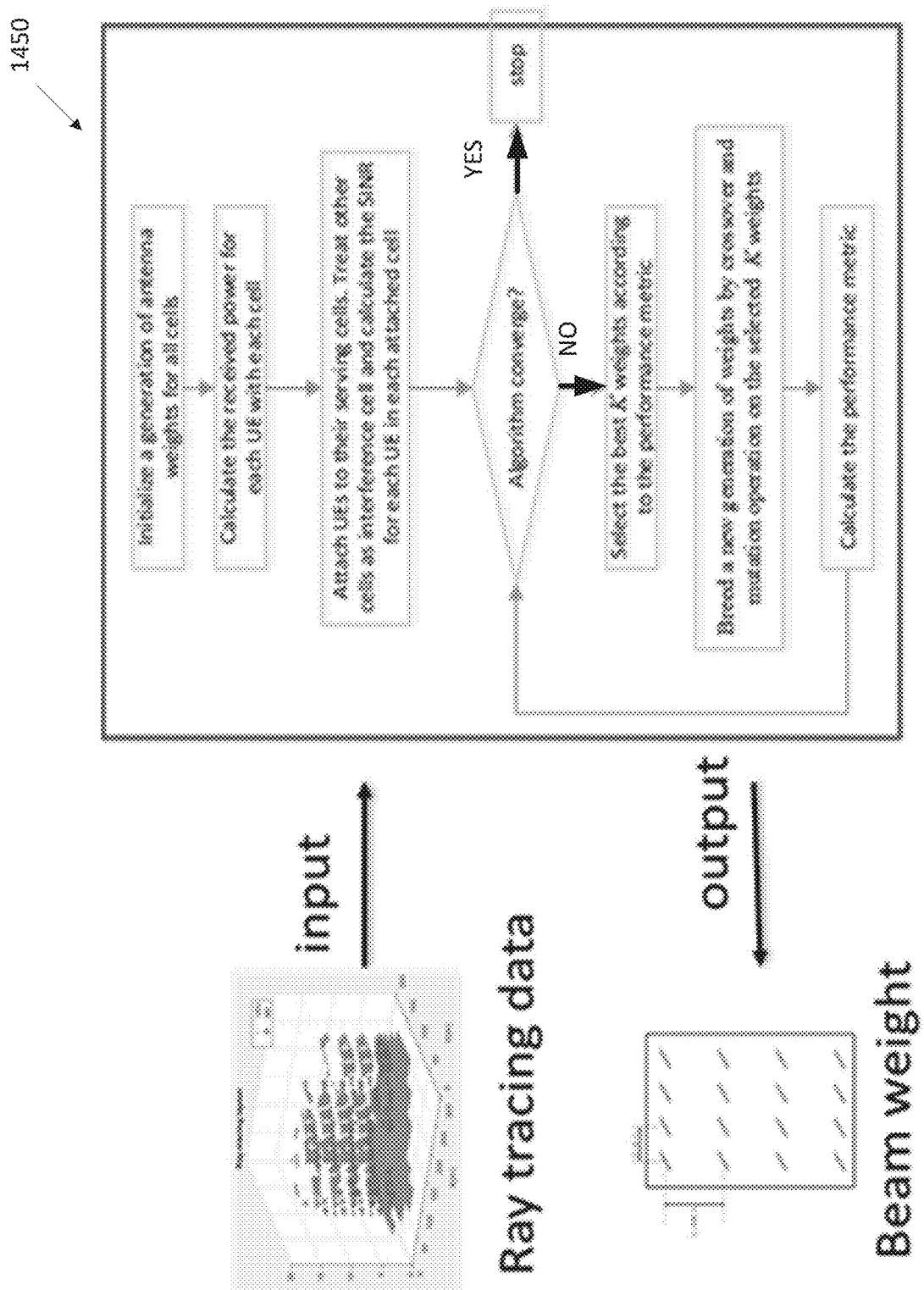
FIG. 14B illustrates an example system diagram for multiple cell according to embodiments of the present disclosure.

FIG. 14B illustrates an example system diagram 1450 for multiple cells according to embodiments of the present disclosure. The embodiment of the system diagram 1450 illustrated in FIG. 14B is for illustration only. FIG. 14B does not limit the scope of this disclosure to any particular implementation.

Figure 14C:
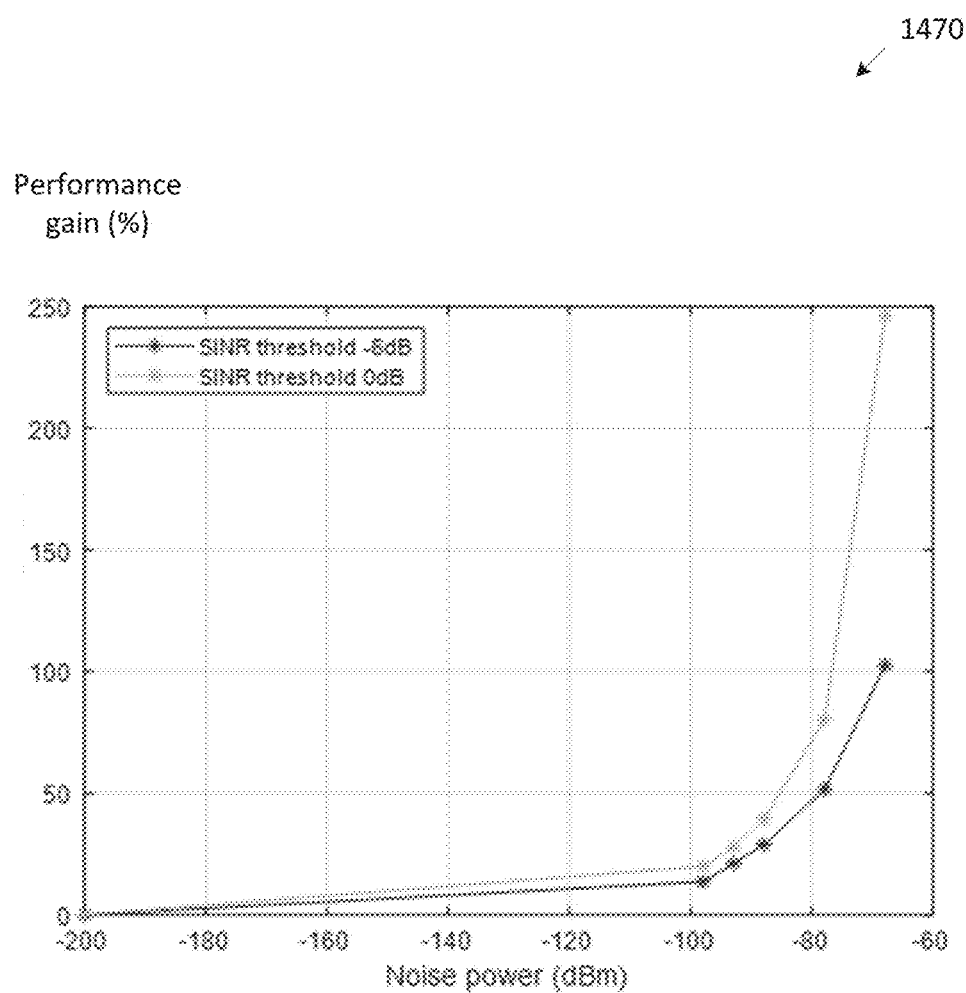
FIG. 14C illustrates an example performance of gain according to embodiments of the present disclosure.

FIG. 14C illustrates an example of performance gain 1470 according to embodiments of the present disclosure. The performance gain 1470 illustrated in FIG. 14C is for illustration only. FIG. 14C does not limit the scope of this disclosure to any particular implementation.

In FIG. 14C, performance gain is shown to demonstrate the effectiveness of the provided embodiment. As illustrated in FIG. 14C, more than 50% performance gain is achieved in term of number of connected UEs.

In one embodiment, beam and tilt angles are designed and optimized for the base stations from a pool of beams. The input to this embodiment is the ray-tracing data including the AoA, AoD, ZoA and ZoD, power per path etc. The output of this embodiment is the antenna beam width and tilt angles.

After getting the ray-tracing data or equivalently the path loss for each user, this embodiment may select a beam from the beam pool. Then this embodiment may calculate the key performance indicator (KPI) of base stations to see whether this selected beam could pass the KPI requirement. This embodiment may select the beams which could pass the KPI requirement and has the largest performance metric. One example of the performance metric could be number of connected UEs, or X percentile SINR, where X could be any value from 0 to 100.

Figure 15A:
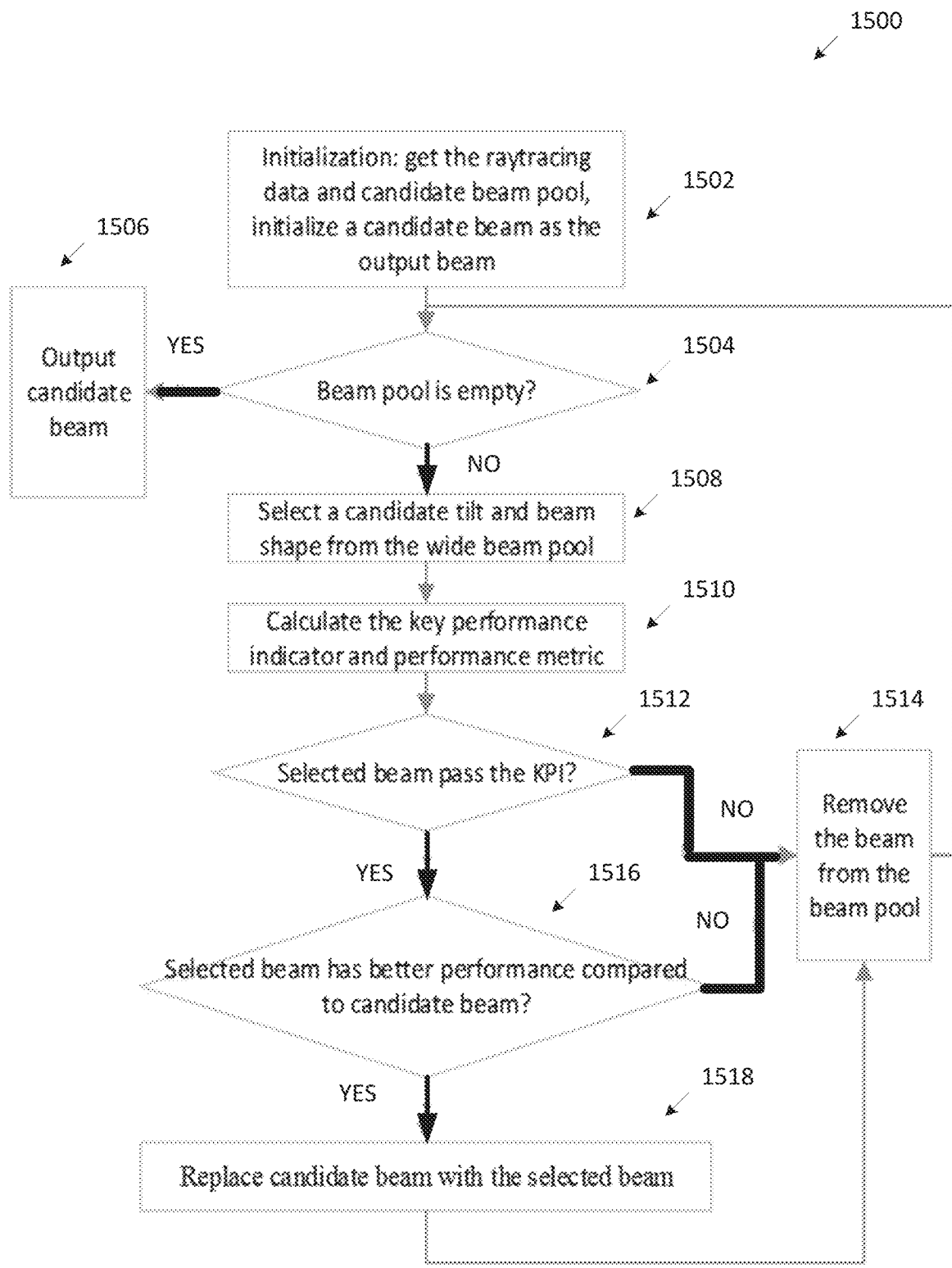
FIG. 15A illustrates a flowchart of a method for beam and tilt optimization according to embodiments of the present disclosure.

FIG. 15A illustrates a flowchart of a method 1500 for beam and tilt optimization according to embodiments of the present disclosure. The embodiment of the method 1500 illustrated in FIG. 15A is for illustration only. FIG. 15A does not limit the scope of this disclosure to any particular implementation.

As illustrated in FIG. 15A, the method 1500 begins at step 1502. In step 1502, the method 1500 initializes to get the raytracing data and candidate beam pool, and initializes a candidate beam as the output beam. In step 1504, the method 1500 determines whether the beam pool is empty. In step 1506, the method 1500 outputs candidate beam. In step 1508, the method 1500 selects a candidate tilt and beam shape from the wide beam pool. In step 1510, the method 1500 calculates the key performance indicator and performancemetric. In step 1512, the method 1500 determines whether the selected beam passes the KPI. In step 1512, if the selected beam does not pass the KPI, the method 1500 removes the beam from the beam pool in step 1514. In step 1512, if the selected beampasses the KPI, the method 1500 determines whether the selected beam had better performance compared to the candidate beam in step 1516. In step 1516, if the selected beam has better performance than the candidate beam, the method 1500 replaces the candidate beam with the selected beam in step 1518 and then performs step 1514. In step 1516, if the selected beam does not have better performance than the candidate beam, the method 1500 performs step 1514.

Figure 15B:
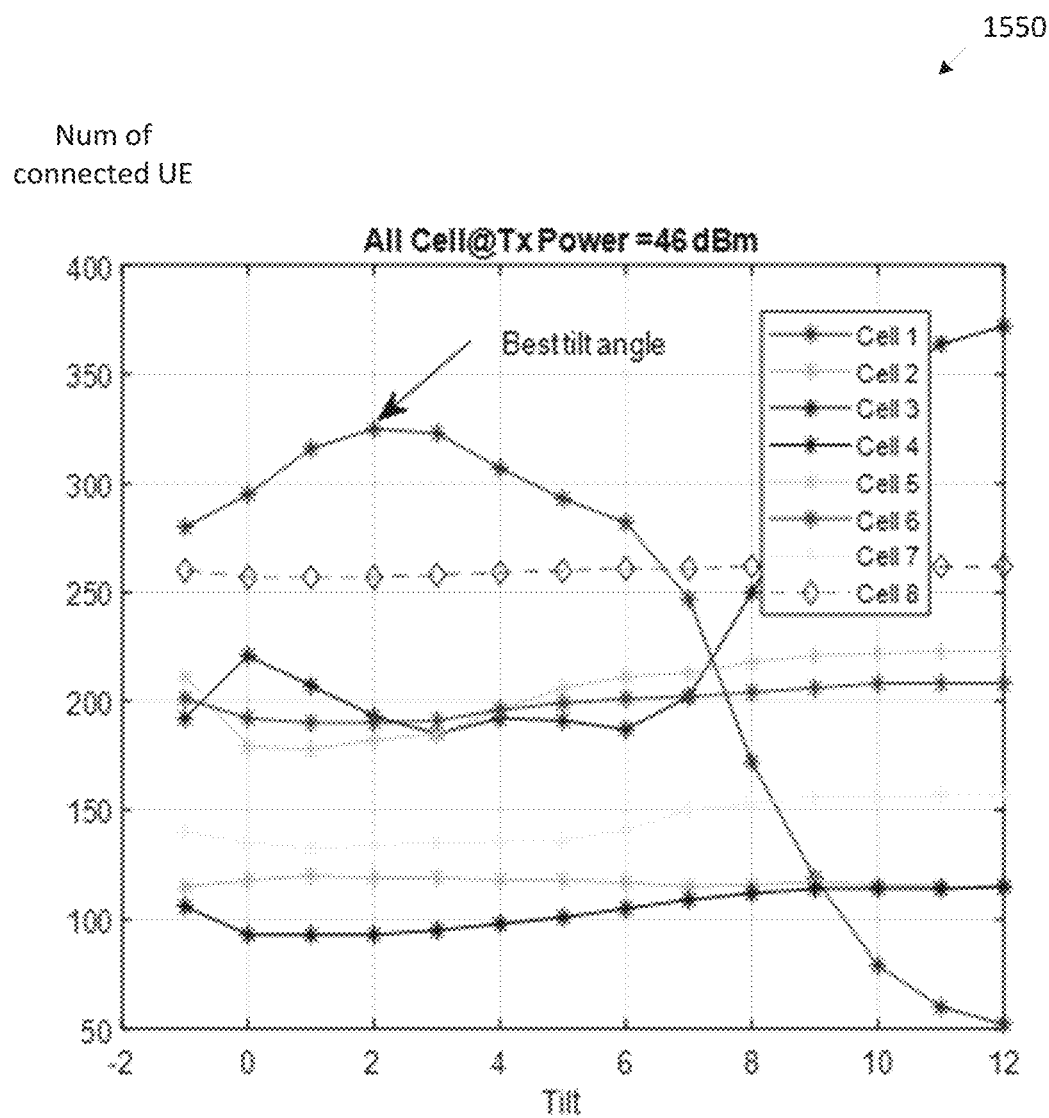
FIG. 15B illustrates an example number of connected UEs after optimization according to embodiments of the present disclosure.

FIG. 15B illustrates an example number of connected UEs after optimization 1550 according to embodiments of the present disclosure. The embodiment of the number of connected UEs after optimization 1550 illustrated in FIG. 15B is for illustration only. FIG. 15B does not limit the scope of this disclosure to any particular implementation.

FIG. 15B shows one example of optimizing the number of connected UE by tuning the tilt angle. As observed from the plot, e-tilt with 2 degree may give the best number of connected UEs.

In one embodiment, a neural network is used to calculate the optimal beams. The input of this embodiment is the ray-tracing data and the output of this embodiment could be the beam weights. The reason to use neural network is to reduce the complexity while maintain the performance. The output of the neural network may be a vector and each element of the vector may be from zeros to ones. Policy gradient algorithms are employed to update the beam weights.

In such embodiment, once the embodiment gets the ray-tracing data, the path loss is calculated. This embodiment then may get the output from the neural network and treat the output as the beam weights. Then this embodiment may calculate the connection indicator of the network. The connection indictor could be based on the received power or received SINR. Or the connection indicator could be binary based on the compare of the received power and SINR to a threshold. Details on the structure of the neural network is shown in FIG. 16A.

FIG. 16A illustrates an example neural network 1600 according to embodiments of the present disclosure. The embodiment of the neural network 1600 illustrated in FIG. 16A is for illustration only. FIG. 16A does not limit the scope of this disclosure to any particular implementation.

In another method, there is a mapping between the outputs of the neural network to the beam weights. The mapping function could be mapping the value from [0, 1] to a complex number. One example of the mapping could be $f(x)=e^{(2*pi*x)}$.

FIG. 16B illustrates an example neural network with mapping 1620 according to embodiments of the present disclosure. The embodiment of the neural network with mapping 1620 illustrated in FIG. 16B is for illustration only. FIG. 16B does not limit the scope of this disclosure to any particular implementation.

In another embodiment, the output layer of the neural network is revised and tailed to our phase-only tuning problem. The second last layer is composed of neural with function of $f(x)=e^{j2\pi xw}$, in this case, the output of the neural network may be directly the beam weights.

Figure 16C:
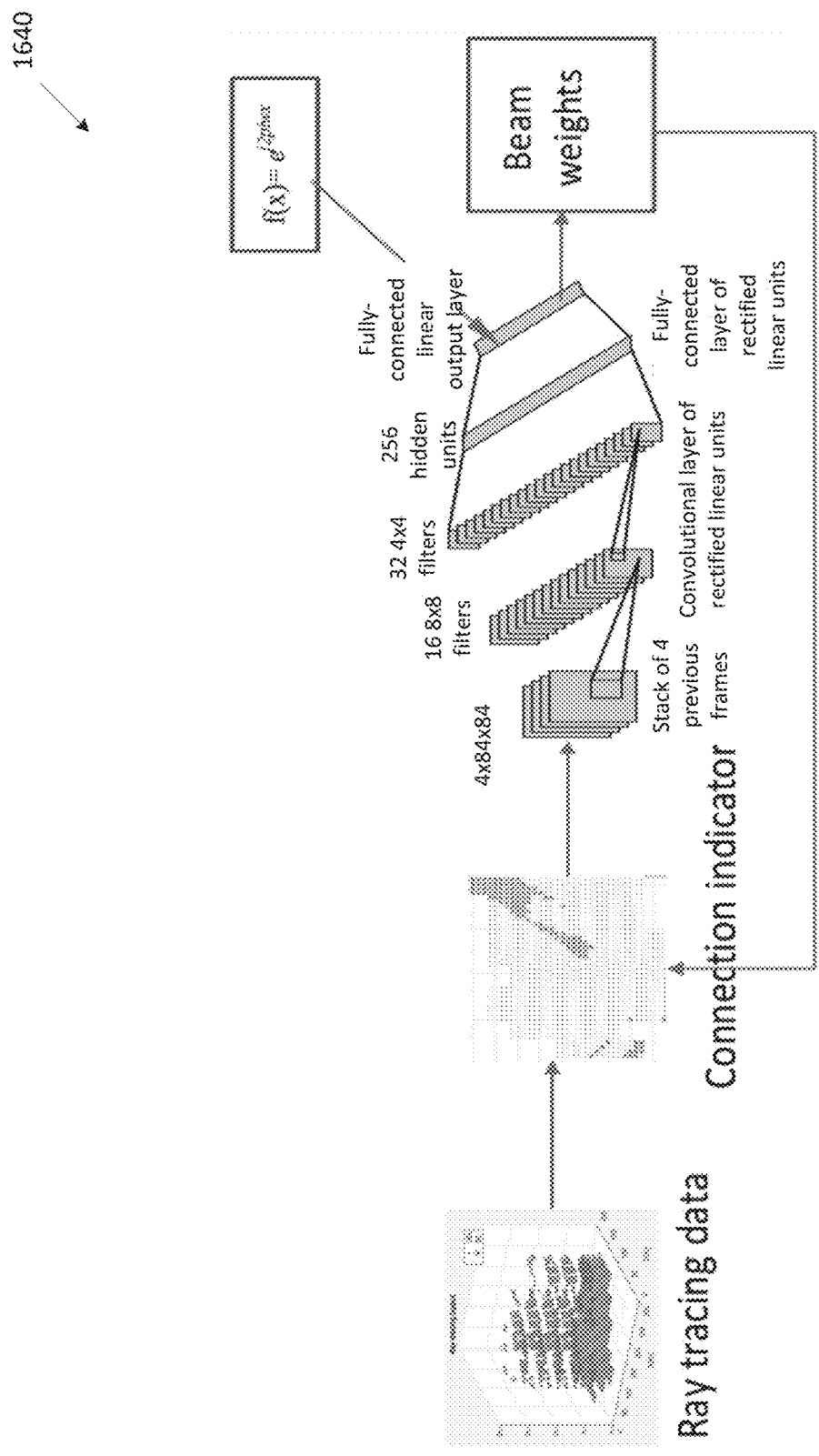
FIG. 16C illustrates an example revised neural network according to embodiments of the present disclosure.

FIG. 16C illustrates an example revised neural network 1640 according to embodiments of the present disclosure. The embodiment of the revised neural network 1640 illustrated in FIG. 16C is for illustration only. FIG. 16C does not limit the scope of this disclosure to any particular implementation.

Figure 16D:
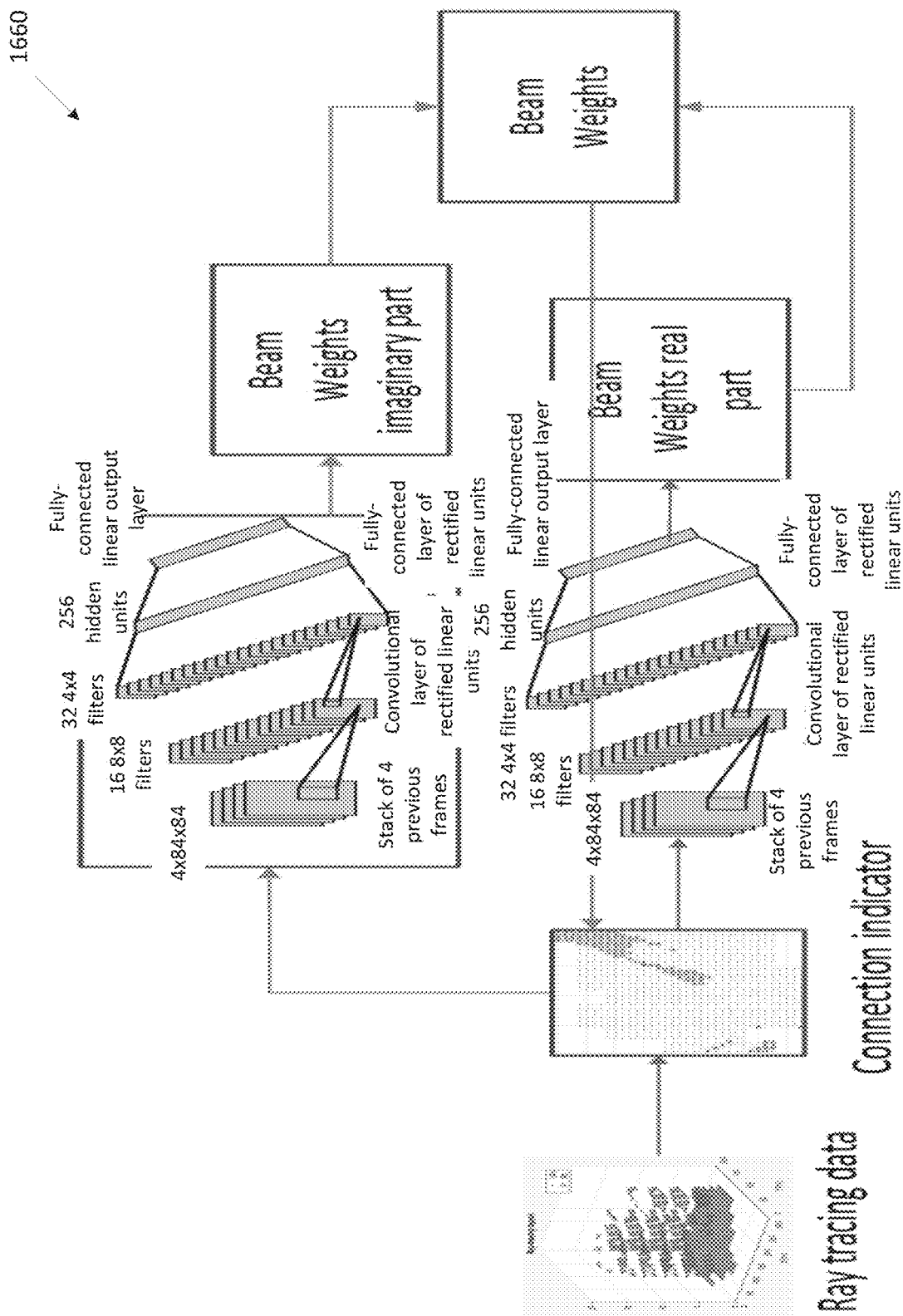
FIG. 16D illustrates an example real and imaginary neural network according to embodiments of the present disclosure.

In another embodiment, there are two neural networks where one neural network output the real part of the weight and the other neural network output the imaginary part of the neural network as shown in FIG. 16D.

FIG. 16D illustrates an example real and imaginary neural network 1660 according to embodiments of the present disclosure. The embodiment of the real and imaginary neural network 1660 illustrated in FIG. 16D is for illustration only. FIG. 16D does not limit the scope of this disclosure to any particular implementation.

The initial results show that 98.9% percent of performance may be achieved using neural networks compared to genetic algorithm. Reduce 3× complexity compared to genetic algorithm.

In one embodiment, a scheme of synthesis for a wide beam is considered in dynamic scenarios. In dynamic scenarios, the UE distribution may change according to some mobility pattern. In this case, the optimal beam weights may change from time to time. Therefore, in one hand, the agent need to exploit the best antenna weights based on the current and history measurements. On the other hand, the agent still needs to explore a better beam weights due to the UE mobility. To address this issue, a new algorithm is developed based on upper confidence bound (UCB) algorithm in multi-armed bandit (MAB) is developed.

TABLE 2 shows the initial results on a three-cell cellular network. Each cell is equipped with a 4×4 antenna array. The horizontal distance between antenna elements is 0.5 wave length and the vertical distance between antenna elements is 1.48 wave length. The received power of each UE is calculated based on ray-tracing results. Conventional method serves as the benchmark where a 90-degree Azimuth beams is synthesized and the beam weights are applied for the cells. As shown in the results, the number of connected UEs improves by 79% if the beam weights are optimized for the cells together when the SINR threshold is −6 dB. When the SINR threshold is 0 dB our algorithm 1 can achieve a higher gain of 116% in terms of connected UEs.

TABLE 2

The initial results

|  | Conventional method | Algorithm 1 (cell-by-cell) | Algorithm 1 (all cells jointly) |
| --- | --- | --- | --- |
| # of connected UEs @ T = −6 dB | 5363(base) | 9079(+69%) | 9597(+79%) |
| # of connected UEs @ T = 0 dB | 2740(base) | 5534(+102%) | 5914(+116%) |

In the present disclosure, new scheme and system are designed to select wide common beams which can directly optimize the cell coverage in dynamic mobile environments. A system with deep reinforcement learning-based wide beam selection algorithm for single sector dynamic environment is developed. The system can jointly tune the antenna beam width and e-tilt angle to improve the cell coverage in dynamic cell environment. Additionally, a scheme for collecting UE distribution information is developed. This UE distribution information is further used to train the neural network. Moreover, a system for wide beam selection in multiple sector case is developed where the size of action space grows only linearly instead of exponentially with the number of sectors.

It is to be noted here that the designed algorithms are based on UE measurements and do not need human intervention. The initial simulation results demonstrate that for the single sector dynamic environment, the provided algorithm can converge completely with the oracle performance. Furthermore, for multiple sector dynamic environment, the provided algorithm can successfully track the optimal wide beam in multi-cell dynamic scenarios.

Figure 17:
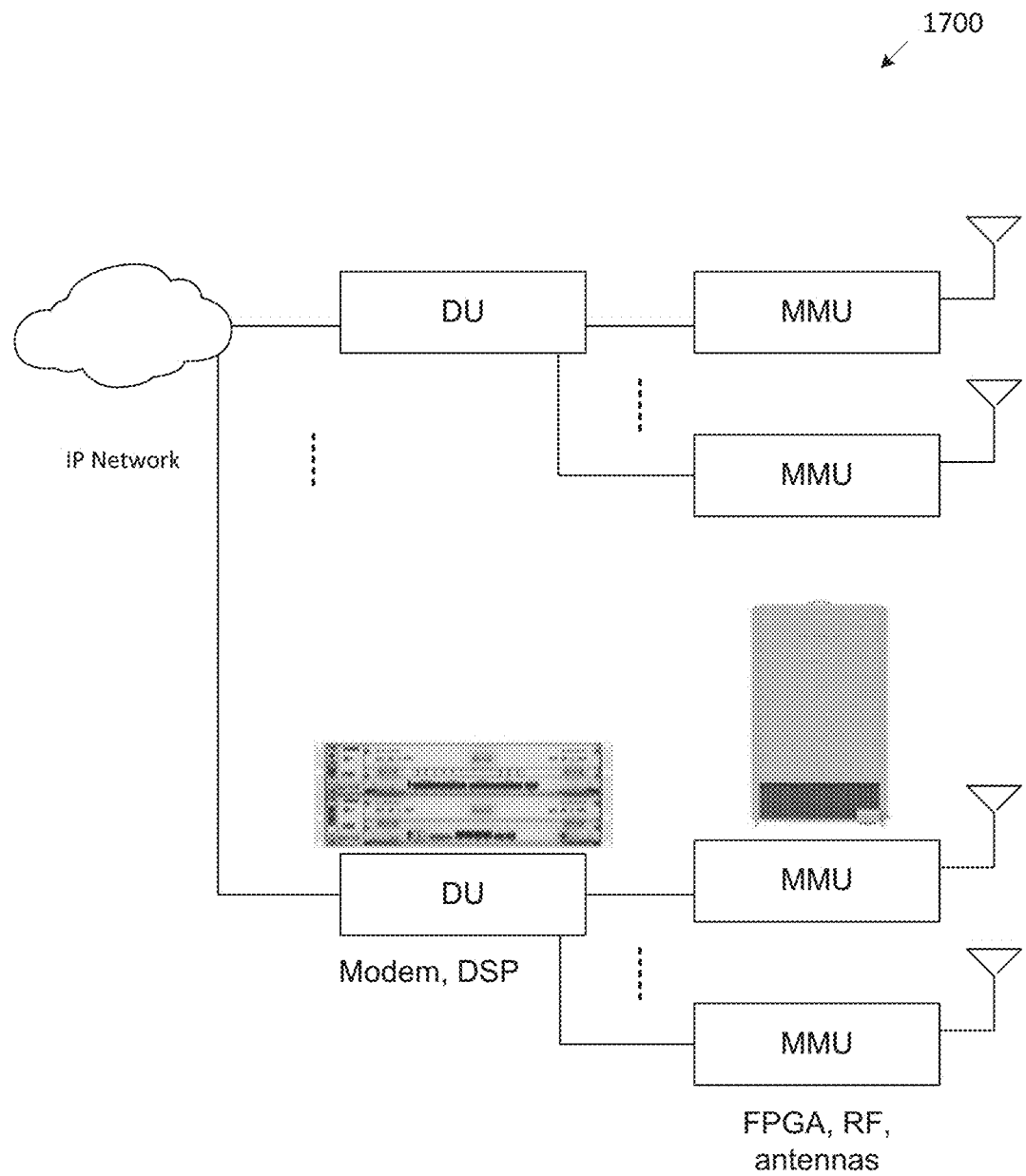
FIG. 17 illustrates an example network architecture for massive MIMO according to embodiments of the present disclosure.

FIG. 17 illustrates an example network architecture 1700 for massive MIMO according to embodiments of the present disclosure. The embodiment of the network architecture 1700 illustrated in FIG. 17 is for illustration only. FIG. 17 does not limit the scope of this disclosure to any particular implementation.

FIG. 17 illustrates a network architecture supporting massive MIMO transmissions & receptions, according to some embodiments of the present disclosure. A data unit (DU) interfaces backhaul to IP network, and supportable multiple massive MIMO (multi-input-multi-output) units (MMUs). DU is equipped with at least one of modems, digital signal processors (DSPs) FPGA (field programmable gate array), and memory units, and processes information bits to generate intermediate signals and pass them over to MMU, so that the intermediate signals are converted to radio signals in MMU. The radio signals are transmitted via massive MIMO antennas comprising the MMU. MMU may also have processing power, in which case, MMU may also comprise modems, digital signal processors (DSPs) FPGA (field programmable gate array), and memory units, in addition to RF (radio frequency) hardware and massive MIMO antennas.

In one embodiment, the wide beam selection problem using reinforcement learning framework is considered. This embodiment includes two parts such as offline training and online deployment. The offline training part is to learn the UE distribution pattern from history data and to teach the neural network on the UE distribution pattern. After obtaining typical UE distribution patterns, these patterns together with ray-tracing data may be used to train the deep reinforcement learning network. After the neural network is trained, it may be deployed to provide beam guidance for the network online.

Figure 18:
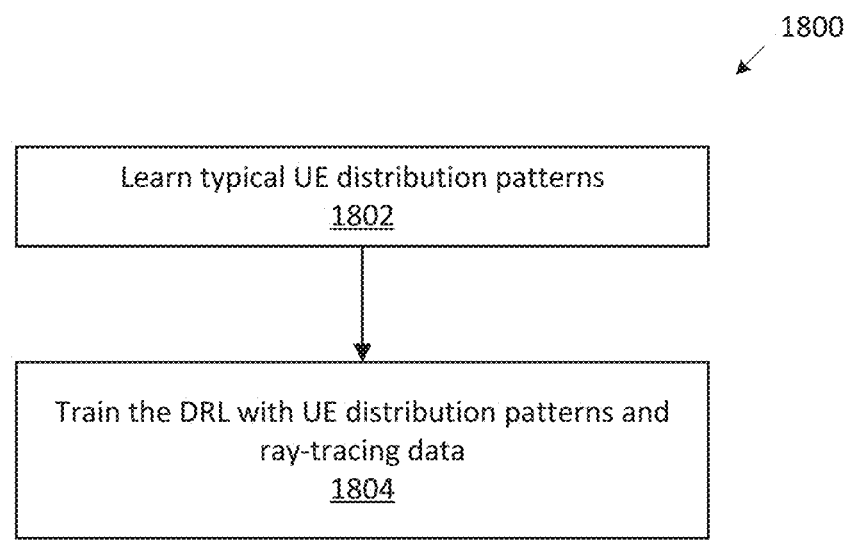
FIG. 18 illustrates a flowchart of a method for offline learning according to embodiments of the present disclosure.

FIG. 18 illustrates a flowchart of a method 1800 for offline learning according to embodiments of the present disclosure. The embodiment of the method 1800 illustrated in FIG. 18 is for illustration only. FIG. 18 does not limit the scope of this disclosure to any particular implementation.

As illustrated in FIG. 18, the method 1800 begins at step 1802. The method 1800 in step 1802 learns typical UE distribution patterns. In step 1804, the method 1800 trains the DRL with UE distribution patterns and ray-tracing data.

In one embodiment, the typical UE distribution patterns are learned from the history data. In such embodiment, UEs report the UE's measured RSRP, RSRQ, SINR, time stamp and location information to the cloud or base station. For a specific time snapshot, the cloud or the base station may have a measured heat map indicating the UE distribution at that time snapshot. Accumulating over time, the cloud or base station may have a history of this heat map. In the first method, each heat map may represent a typical scenario. Alternatively, a classification or clustering method could be used here to get N typical scenarios out of the heat maps. For example, K-means or other clustering method could be used here to classify the whole dataset into N typical heat maps. The selected heat map is called as typical heat map and the corresponding scenario as the typical scenario.

Figure 19:
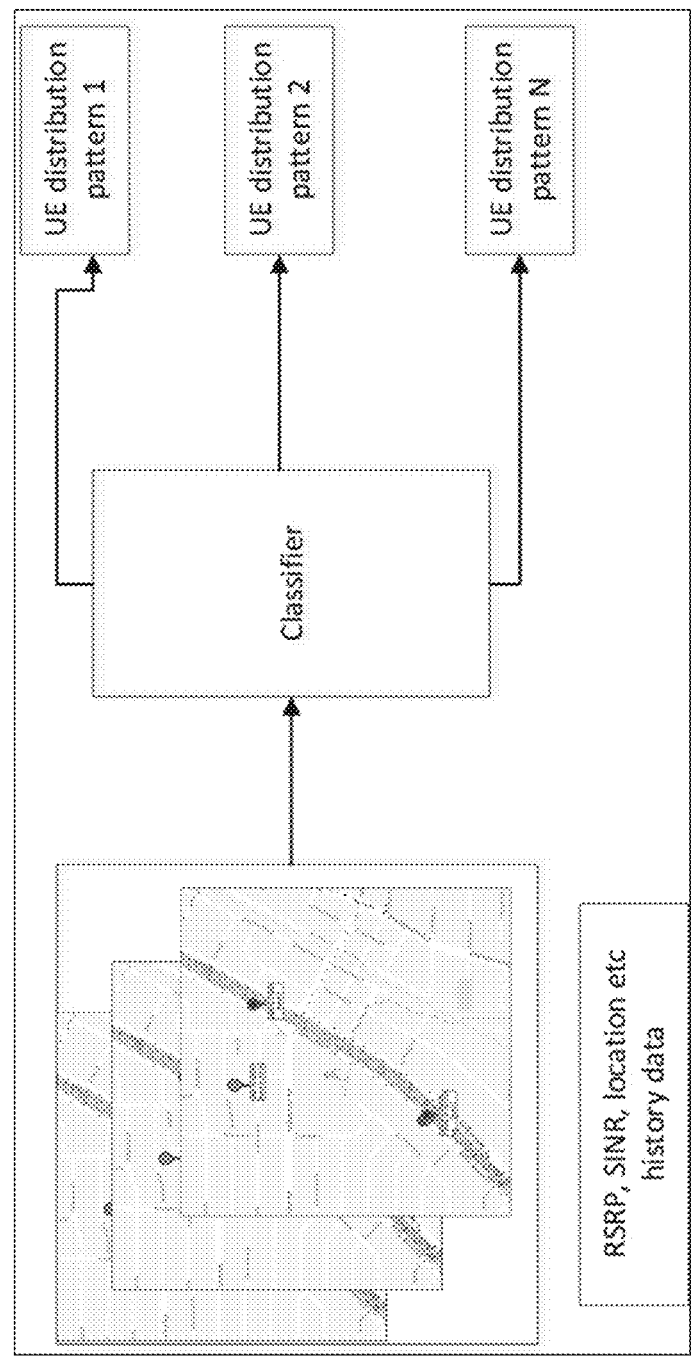
FIG. 19 illustrates an example UE distribution pattern learning according to embodiments of the present disclosure.

FIG. 19 illustrates an example UE distribution pattern learning 1900 according to embodiments of the present disclosure. The embodiment of the UE distribution pattern learning 1900 illustrated in FIG. 19 is for illustration only. FIG. 19 does not limit the scope of this disclosure to any particular implementation.

After getting the typical scenario, i.e., the typical locations of UE distribution, the training datasets may be created. One method to create the training dataset is to use the ray-tracing data. Ray-tracing data may include the full information of the environment, for example, the angle information, location information and channel information. A full ray-tracing data may include every sampling point in the selected area. However, the full data may not necessary reflect the real UE distribution information. After getting the typical scenario, the full ray-tracing data may be thin by creating a scenario-specific ray-tracing data.

Figure 20:
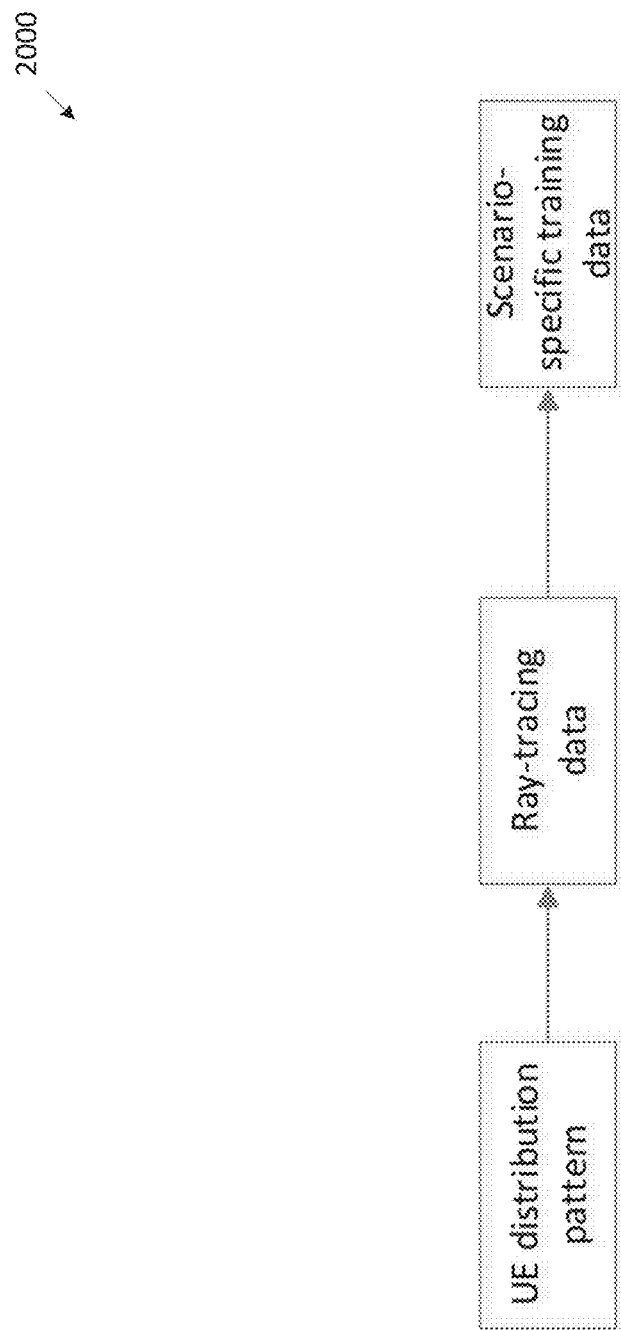
FIG. 20 illustrates an example scenario-specific training data generation according to embodiments of the present disclosure.
Figure 21:
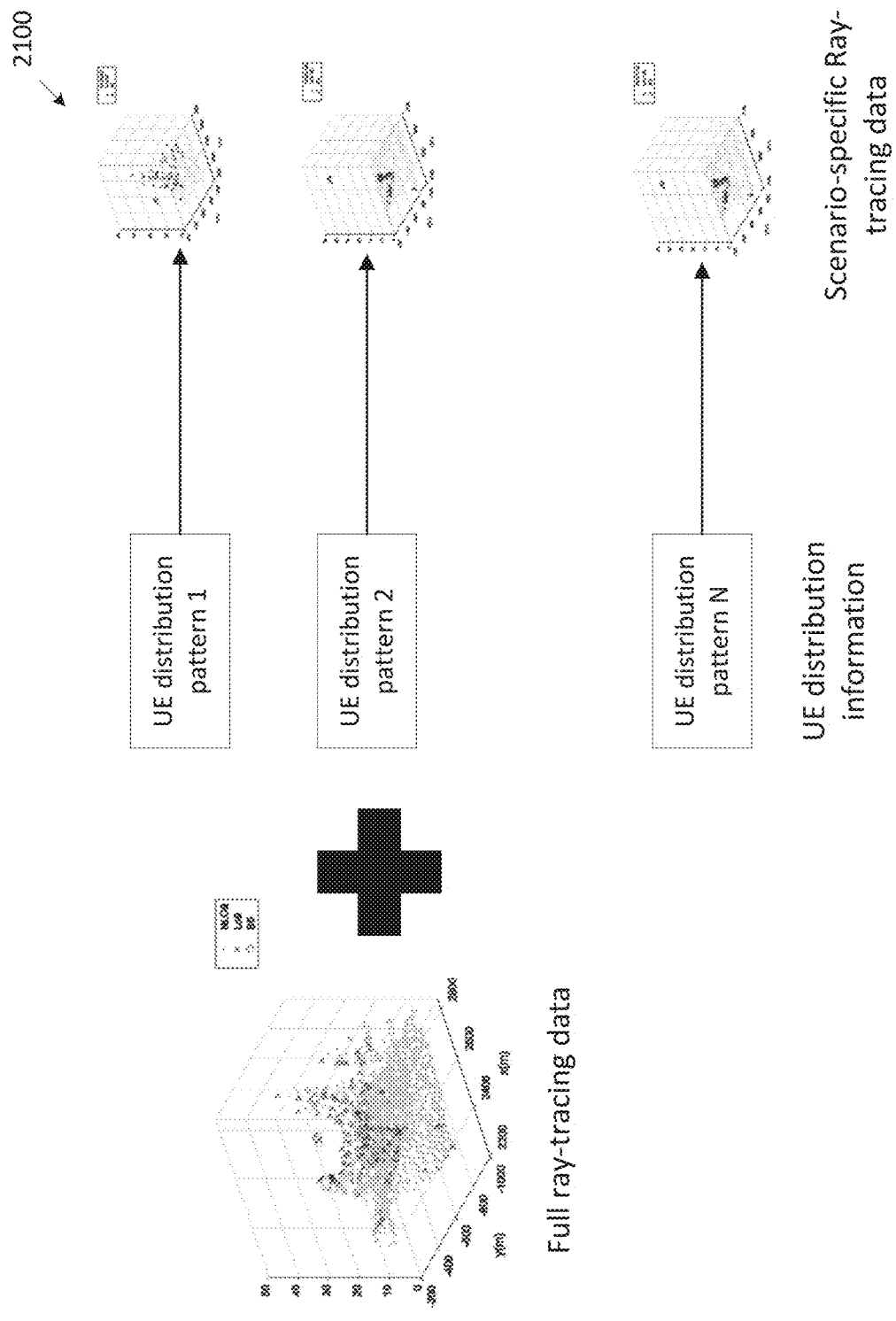
FIG. 21 illustrates an example scenario-specific ray-tracing data according to embodiments of the present disclosure.

In the scenario-specific ray-tracing data, only points/locations in the UE distribution pattern are selected. FIG. 20 show the process to generate the scenario-specific training data. FIG. 21 shows one implementation example to generate the scenario-specific ray-tracing data. The full process to generate the scenario-specific ray-tracing data is shown in FIG. 22.

FIG. 20 illustrates an example scenario-specific training data generation 2000 according to embodiments of the present disclosure. The embodiment of the scenario-specific training data generation 2000 illustrated in FIG. 20 is for illustration only. FIG. 20 does not limit the scope of this disclosure to any particular implementation.

FIG. 21 illustrates an example scenario-specific ray-tracing data 2100 according to embodiments of the present disclosure. The embodiment of the scenario-specific ray-tracing data 2100 illustrated in FIG. 21 is for illustration only. FIG. 21 does not limit the scope of this disclosure to any particular implementation.

Figure 22:
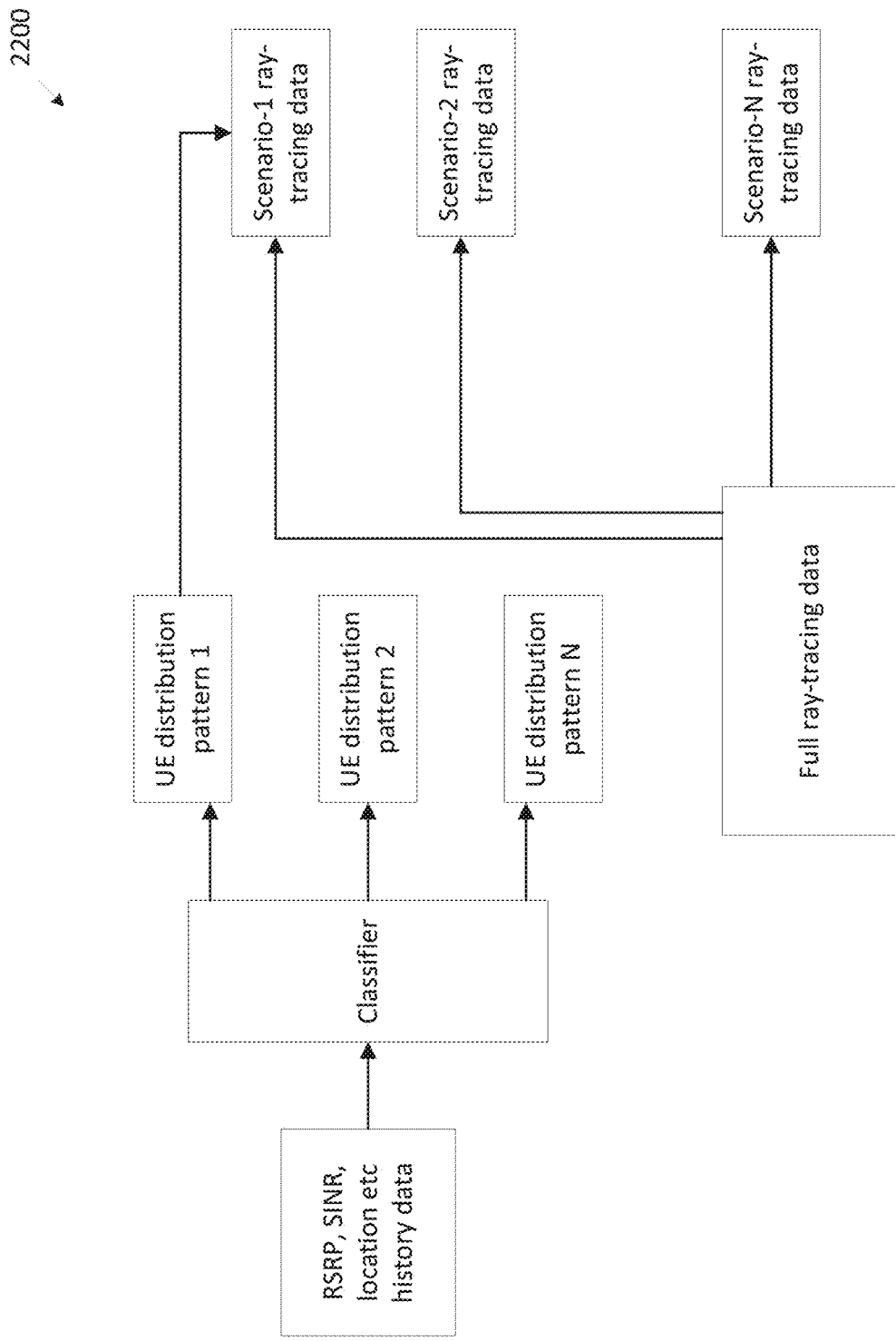
FIG. 22 illustrates an example generation of scenario-specific ray-tracing data according to embodiments of the present disclosure.

FIG. 22 illustrates an example generation of scenario-specific ray-tracing data 2200 according to embodiments of the present disclosure. The embodiment of the generation of scenario-specific ray-tracing data 2200 illustrated in FIG. 22 is for illustration only. FIG. 22 does not limit the scope of this disclosure to any particular implementation.

With this scenario-specific ray-tracing data, the deep reinforcement learning network is trained. One example procedure to train the DRL is like follows: the cloud selects a wide beam for the sector; each UE in the sector may calculate the received power or SINR under this wide beam and feedback the reward as a function of the measurement data. For offline training, the measurement is conducted on the scenario-specific ray-tracing data. For example, the received power or SINR is calculated based on the channel information contained in the scenario-specific ray-tracing data. During offline training, the reward could be calculated as a function of the received power or SINR of the UEs in the scenario.

Figure 23:
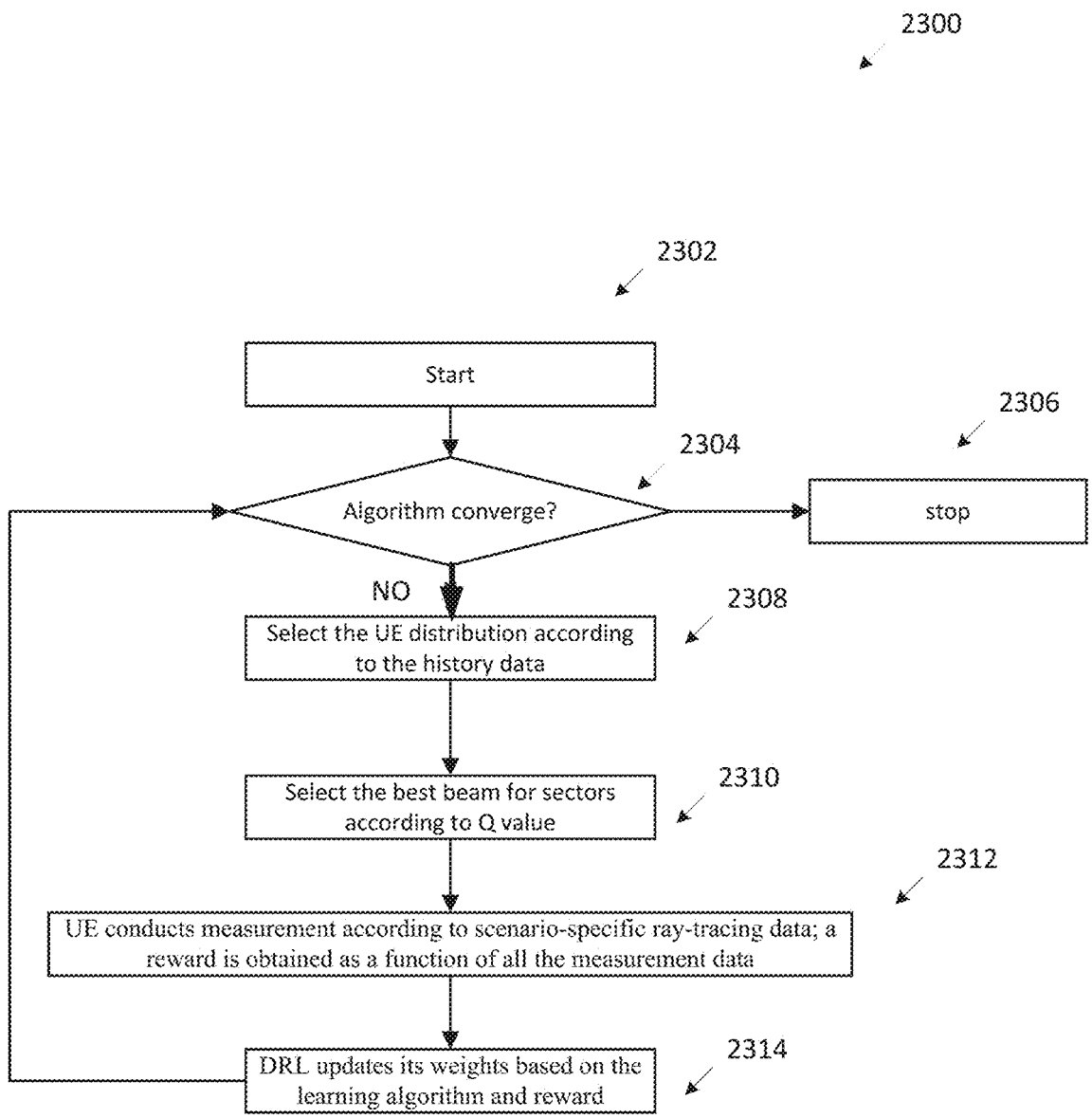
FIG. 23 illustrates a flowchart of a method for offline learning/training according to embodiments of the present disclosure.

After getting the reward, the DRL network may adjust neural weights and select the beam for the scenario so on and so forth. The offline training process can be found in the following flow as shown in FIG. 23. The information flow of the training process between server and the scenario-specific ray-tracing data could be found in FIG. 24.

FIG. 23 illustrates a flowchart of a method for offline learning/training 2300 according to embodiments of the present disclosure. The embodiment of the method for offline learning/training 2300 illustrated in FIG. 23 is for illustration only. FIG. 23 does not limit the scope of this disclosure to any particular implementation.

As illustrated in FIG. 23, the method 2300 begins at step 2302. In step 2304, the method 2300 determines converge of an algorithm. In step 2304, if the algorithm converges, the method 2300 stops in step 2306. In step 2304, if the method 2300 does not converge, the method 2300 selects the UE distribution according to the history data in step 2308. In step 2310, the method 2300 selects the best beam for sectors according to Q value. In step 2312, the UE conducts measurement according to scenario-specific ray-tracing data and a reward is obtained as a function of the measurement data. In step 2314, DRL updates its weights based on the learning algorithm and reward.

Figure 24:
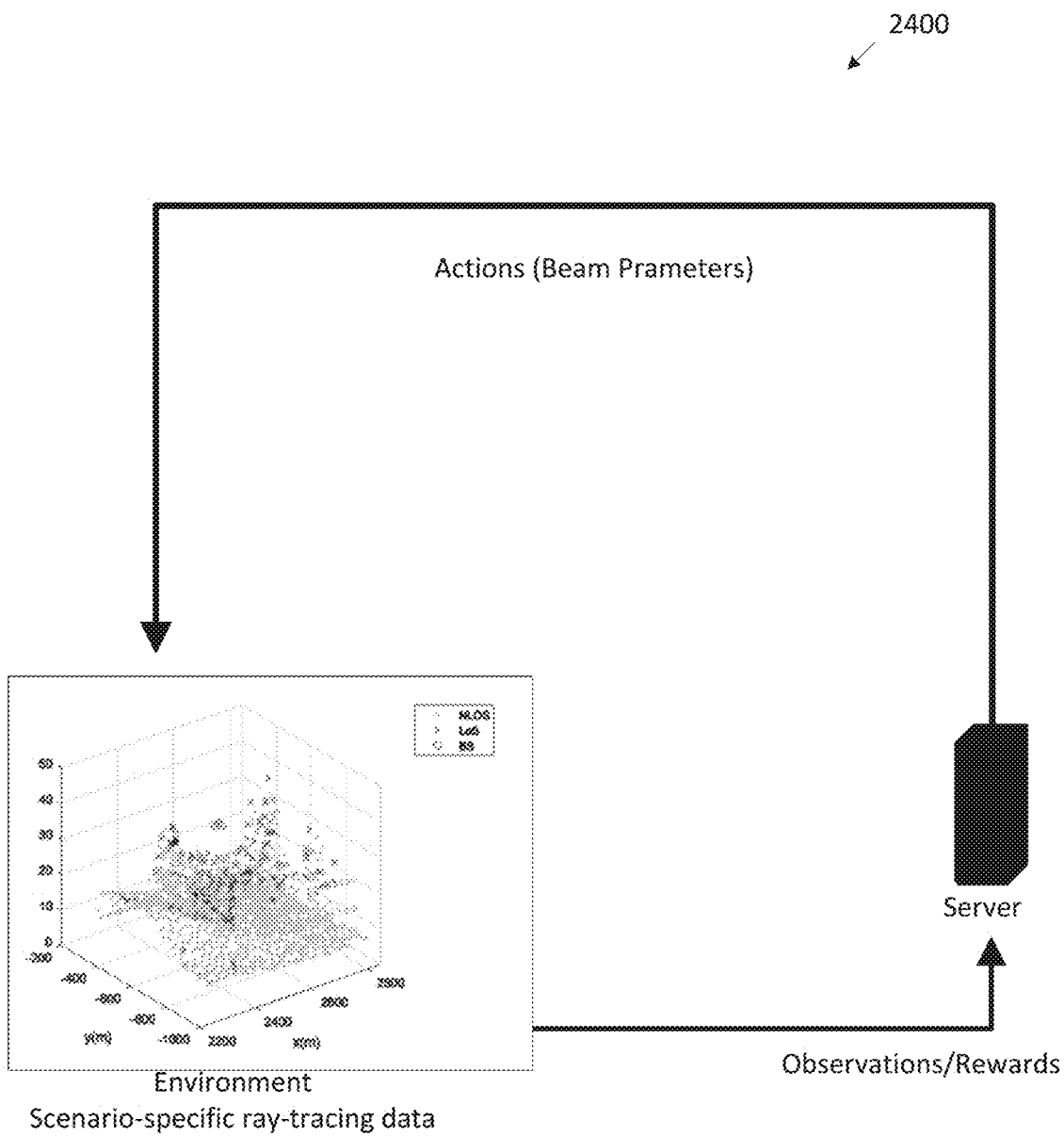
FIG. 24 illustrates an example training information flow between scenario-specific ray-tracing data and network optimization server according to embodiments of the present disclosure.

FIG. 24 illustrates an example training information flow 2400 between scenario-specific ray-tracing data and network optimization server according to embodiments of the present disclosure. The embodiment of the training information flow 2400 illustrated in FIG. 24 is for illustration only. FIG. 24 does not limit the scope of this disclosure to any particular implementation.

In one embodiment, a design of the deep reinforcement learning application methods is provided. A deep reinforcement learning network is used to track the optimal beams during online application. In this disclosure, the deep reinforcement learning could refer to at least one of a deep Q network, a policy gradient, or an actor-critic network. For example, a deep Q-network (DQN)-based architecture could be used to track the optimal wide beams for dynamic environment.

Figure 25A:
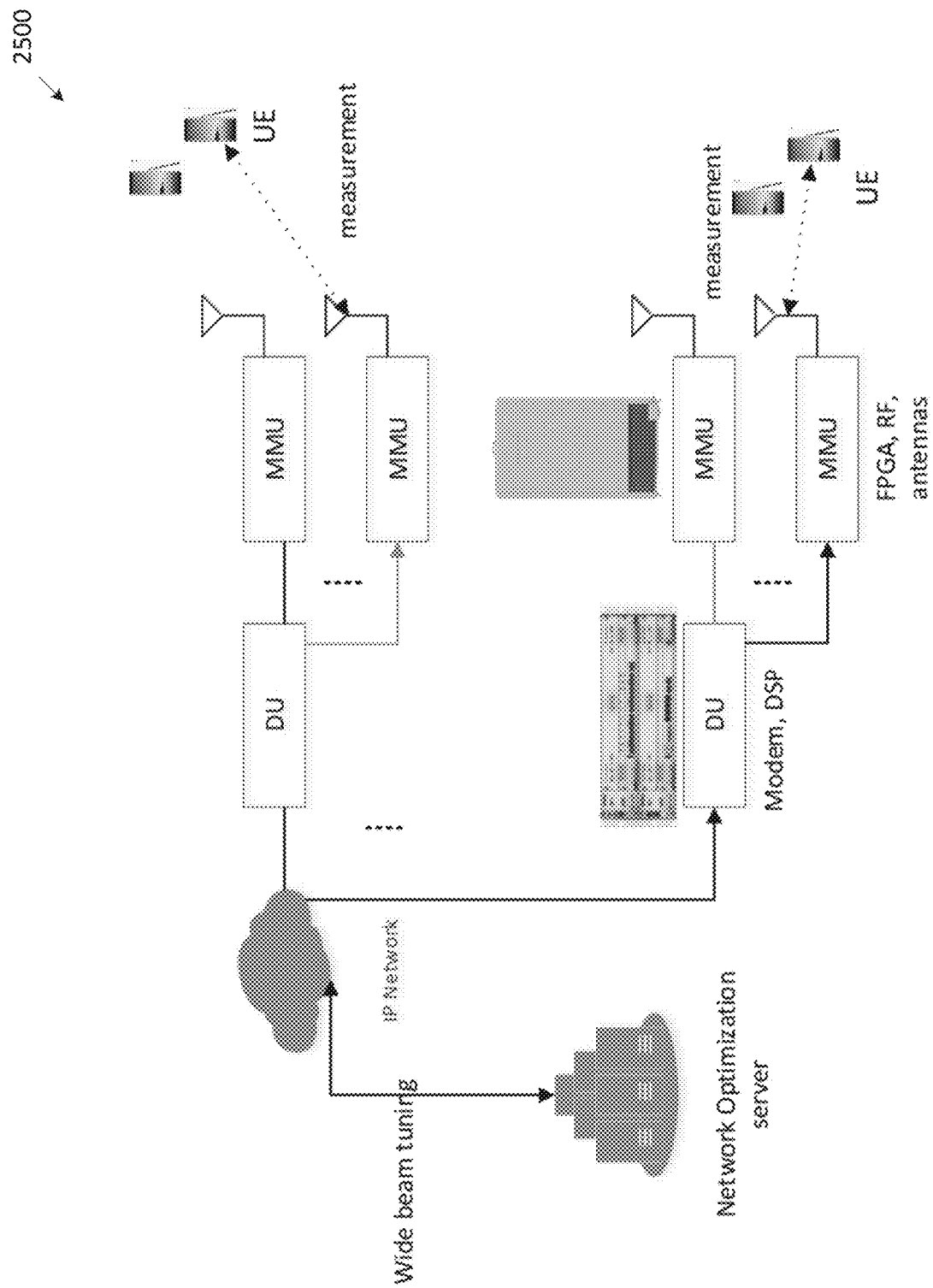
FIG. 25A illustrates an example massive MIMO network with network optimization server according to embodiments of the present disclosure.

FIG. 25A illustrates an example massive MIMO network with network optimization server 2500 according to embodiments of the present disclosure. The embodiment of the massive MIMO network with network optimization server 2500 illustrated in FIG. 25A is for illustration only. FIG. 25A does not limit the scope of this disclosure to any particular implementation.

In one embodiment, during the online application stage, the network optimization server or the agent (decision maker) interacts with the cellular network environment for selecting the best beam parameters. The system architecture is illustrated in FIG. 25A. Different from FIG. 17, a network optimization server is added and connected to the IP network. The network optimization server or the server select the wide beam parameters for each MMU and send wide beam parameters as configuration commands to each MMU. The MMU or the DU may collect the UE measurements and send these measurements back to the server.

Figure 25B:
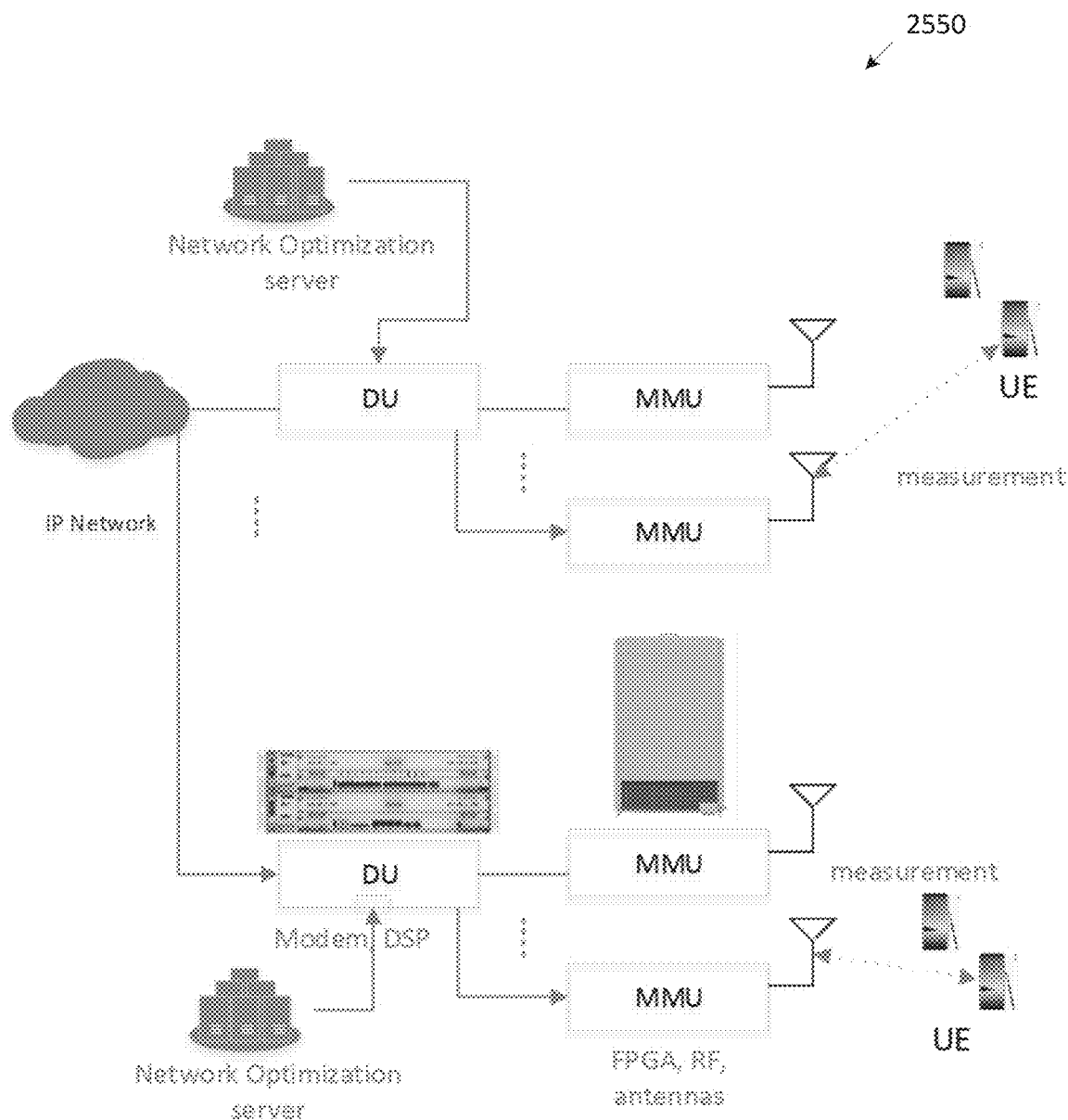
FIG. 25B illustrates another example massive MIMO network with network optimization server according to embodiments of the present disclosure.

FIG. 25B illustrates another example massive MIMO network with network optimization server 2550 according to embodiments of the present disclosure. The embodiment of the massive MIMO network with network optimization server 2550 illustrated in FIG. 25B is for illustration only. FIG. 25B does not limit the scope of this disclosure to any particular implementation.

In another embodiment as shown in FIG. 25B, the network optimization server could directly connect to the DU and each DU has a network optimization server. In yet another embodiment, the network optimization server could be inside the DU. In yet another method, the network optimization server could be insider the MMU.

In the reinforcement learning terminology, selecting the beam parameters (beam shape, tilt angles) can be regarded as the action. The measurements from the UEs in the network could be regarded as the observations. Based on the observations, one or several reward values could be calculated. The abstract diagram of the information flow could be shown in FIG. 26.

Figure 26:
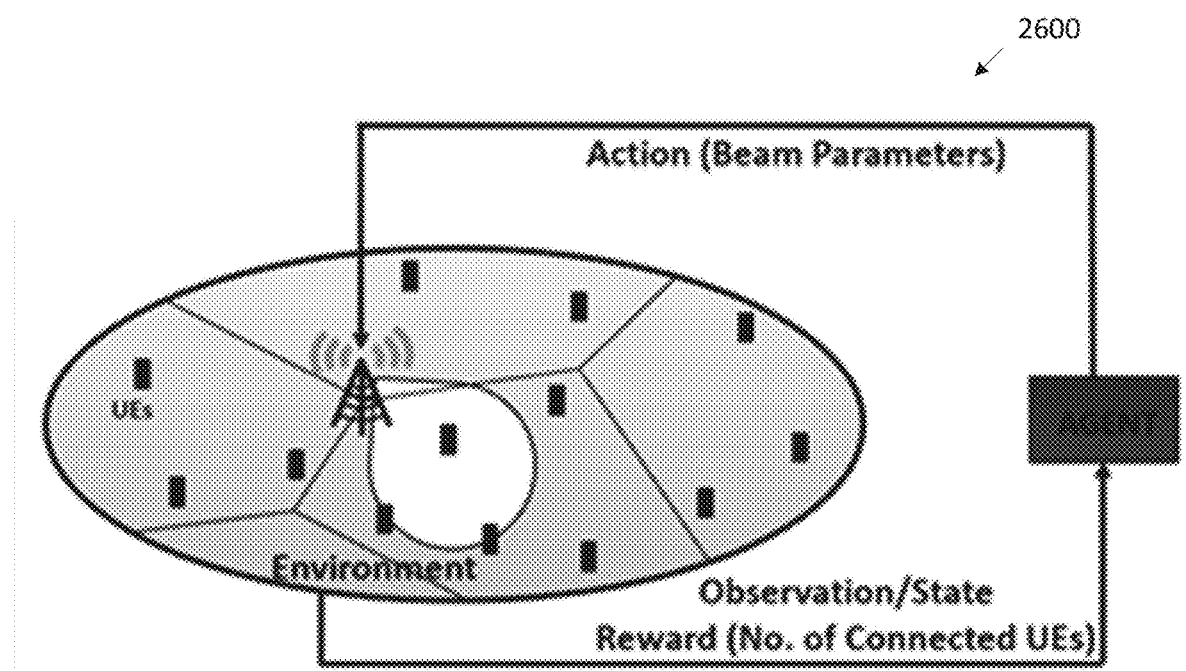
FIG. 26 illustrates an example information flow of the reinforcement learning framework according to embodiments of the present disclosure.

FIG. 26 illustrates an example information flow of the reinforcement learning framework 2600 according to embodiments of the present disclosure. The embodiment of the information flow of the reinforcement learning framework 2600 illustrated in FIG. 26 is for illustration only. FIG. 26 does not limit the scope of this disclosure to any particular implementation.

In one embodiment, different schemes could be applied to model the state/observation/reward in the reinforcement learning framework.

In one embodiment, state in the RL framework is designed as to reflect the network connection state. State could be obtained from UE measurements. For example, one method to design the state could be the connection indicators of UEs in the network (a vector of 1/0s). Each UE reports the UE's status to the base station. If the strength of the received signal from an UE falls below a predefined threshold, a zero is placed at the element of the vector corresponding to that UE. Otherwise, a one is placed. Accordingly, a "0" in the state vector may represent that the corresponding UE has poor connection, and a "1" may indicate that the UE has good connection. The indicator of each UE has a fixed specific location in the vector. In another embodiment, the state could be a vector of the RSSI, RSRQ, RSRP or SINR. The RL state representation adopted in this work is pictorially depicted in FIG. 27.

Figure 27:
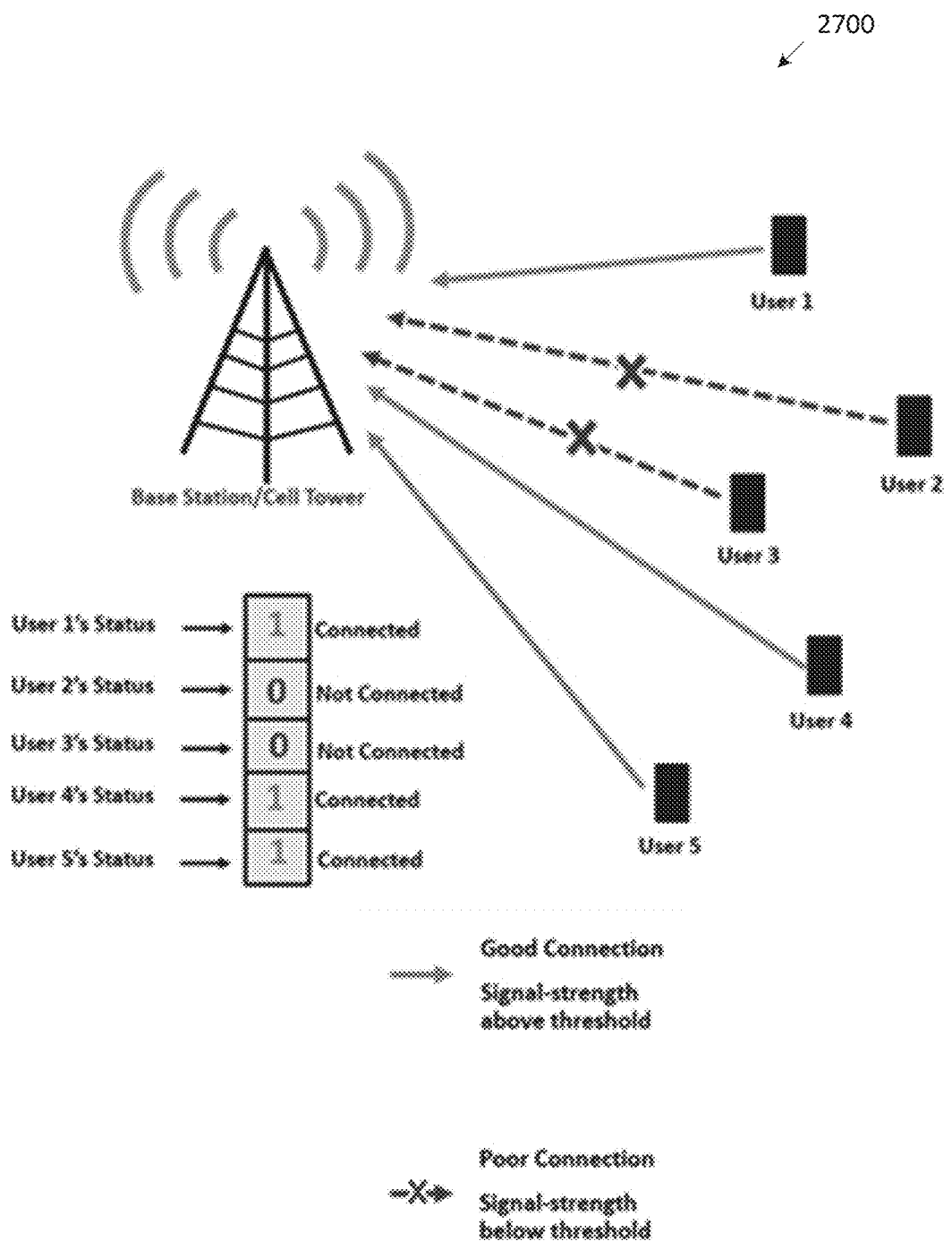
FIG. 27 illustrates an example RL state generation according to embodiments of the present disclosure.

FIG. 27 illustrates an example RL state generation 2700 according to embodiments of the present disclosure. The embodiment of the RL state generation 2700 illustrated in FIG. 27 is for illustration only. FIG. 27 does not limit the scope of this disclosure to any particular implementation.

In one embodiment, an action of the agent/server could be the selection of beam index from a pool of candidate beams. In another embodiment, the action could be to select among the following options: to increase the beam width by a certain degree, to decrease the beam width by a certain degree, keep the same beam width, to increase the tilt angle, to decrease the tilt angle, to keep the same tilt angle etc. Here the beam width could refer to both the azimuth beam width or the elevation beam width or both. The agent observes the states and rewards, and takes the best possible action that maximizes the accumulated future rewards.

In one embodiment, a reward in the present disclosure is the network performance metric. One embodiment to design the reward could be the total number of connected UEs in the network based on the state and action taken. Here the number of connected UE is defined as the number of UEs whose received RSRP is larger than a predefined threshold. Another method to design the reward could be the function of the measurement results, for example, a function of the SINR or RSRP vector or the X-percentile RSRP/SINR, where X could be any number from 0 to 100.

The agent and/or server's goal is to maximize the cumulative discounted future reward. The agent gathers experiences as a tuples, $e_t=(s_t, a_t, r_t, s_{t+1})$, where $s_t$ is the state, at is the action taken at state $s_t$, $r_t$ is the instantaneous reward obtained from state $s_t$ and by taking action $a_t$, and $s_{t+1}$ is the next state. The agent stores history of the agent's experiences in a storage called "replay memory." The deep RL agent randomly samples mini-batches of experience from the replay memory, and selects an action based on $\epsilon$-greedy policy, i.e., with probability $\epsilon$, and tries a random action, and with probability $(1-\epsilon)$ the agent selects the best known action. The optimum action in a particular state is selected based on maximum Q-values corresponding to that state.

In DQN-based reinforcement learning, the Q-values are predicted using deep neural network. Input to the neural network is the UEs' state of the RL environment, and output is the Q-values corresponding to the possible actions.

In one embodiment, N users are provided in the network. For the suitability of computing the Q-values using convolutional neural network, which is used for predicting the Q-values in this work, the (N×1) UE connection vector may be transformed into a two dimensional frame, for example the frame size could be $$\left(\frac{N}{100} \times 100\right).$$

A number of such frames are stacked together, and fed as the input to the neural network. For clarity, the state-vector transformation is shown in FIG. 28.

Figure 28:
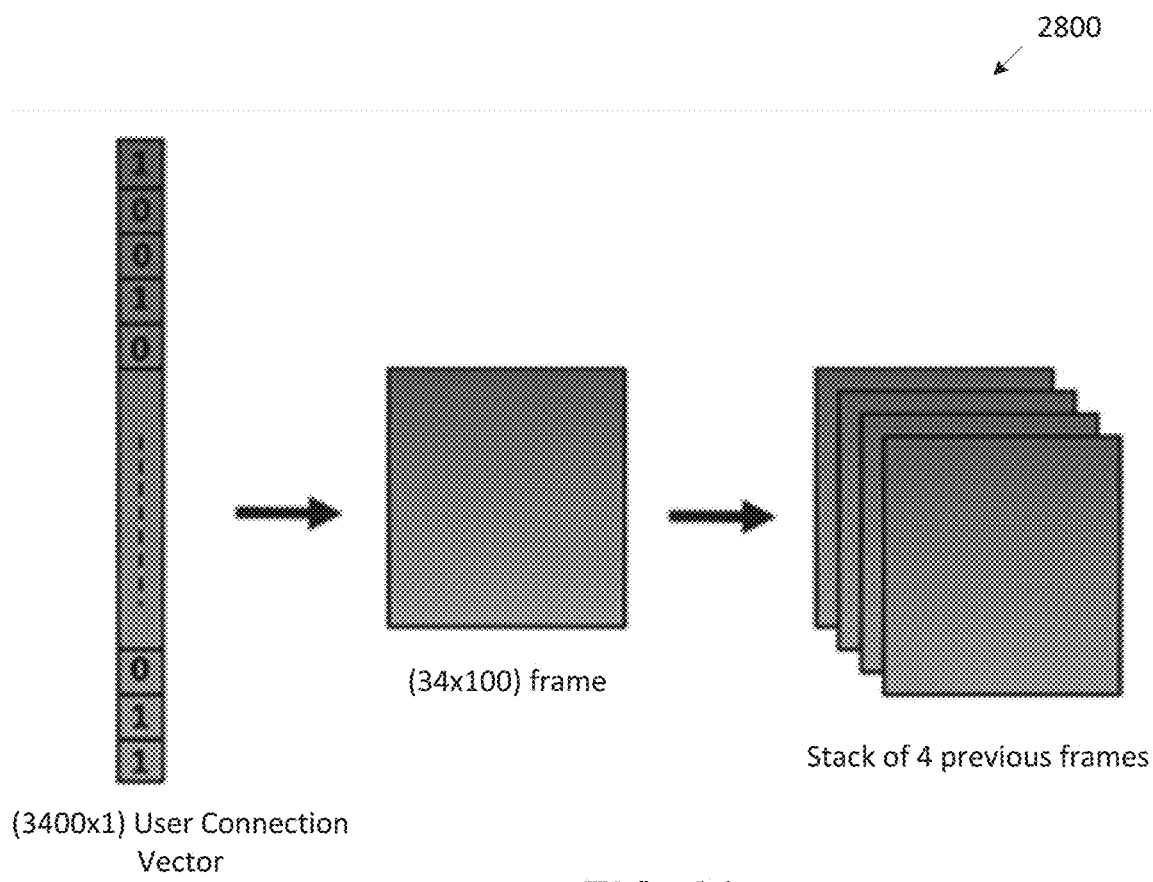
FIG. 28 illustrates an example state vector according to embodiments of the present disclosure.

FIG. 28 illustrates an example state vector 2800 according to embodiments of the present disclosure. The embodiment of the state vector 2800 illustrated in FIG. 28 is for illustration only. FIG. 28 does not limit the scope of this disclosure to any particular implementation.

In one embodiment, in the single sector case, the beam parameters corresponding to only one sector need to be optimized. This could serve as example where only one legacy LTE sector is replaced with one massive MIMO unit.

The goal is to maximize the network performance, for example, number of connected UEs, based on different dynamic user distribution. The agent keeps a single replay memory containing the agent's experience tuples(s, a, r, s'), and samples from the memory. The replay memory architecture for single sector case is shown in FIG. 29.

Figure 29:
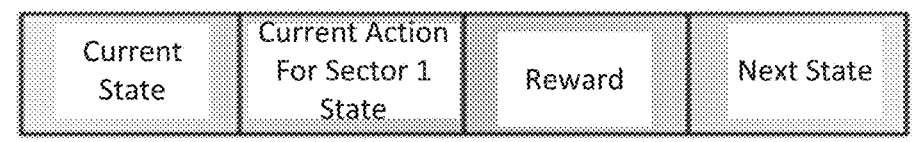
FIG. 29 illustrates an example replay memory for single sector according to embodiments of the present disclosure.

FIG. 29 illustrates an example replay memory for single sector 2900 according to embodiments of the present disclosure. The embodiment of the replay memory for single sector 2900 illustrated in FIG. 29 is for illustration only. FIG. 29 does not limit the scope of this disclosure to any particular implementation.

In one embodiment, for Q value prediction, a deep convolutional neural network is used inside the reinforcement learning framework. RL state information is used as the input of the neural network. For example, the input to the neural network could be the connection frame. The deep convolution neural network could be replaced with other neural network structures for example, a long short term memory (LSTM) and a recurrent neural network (RNN). In the following, an example of three convolutional neural networks—all with rectified linear unit (ReLU) activation is shown. In this example, first convolution layer has 32 (8×8) filters. Second and third convolution layers has 64 (4×4) filters and 64 (3×3) filters, respectively. Finally, a dense layer with linear activation function is used as the output layer. The neural network architecture is shown in FIG. 30.

Figure 30:
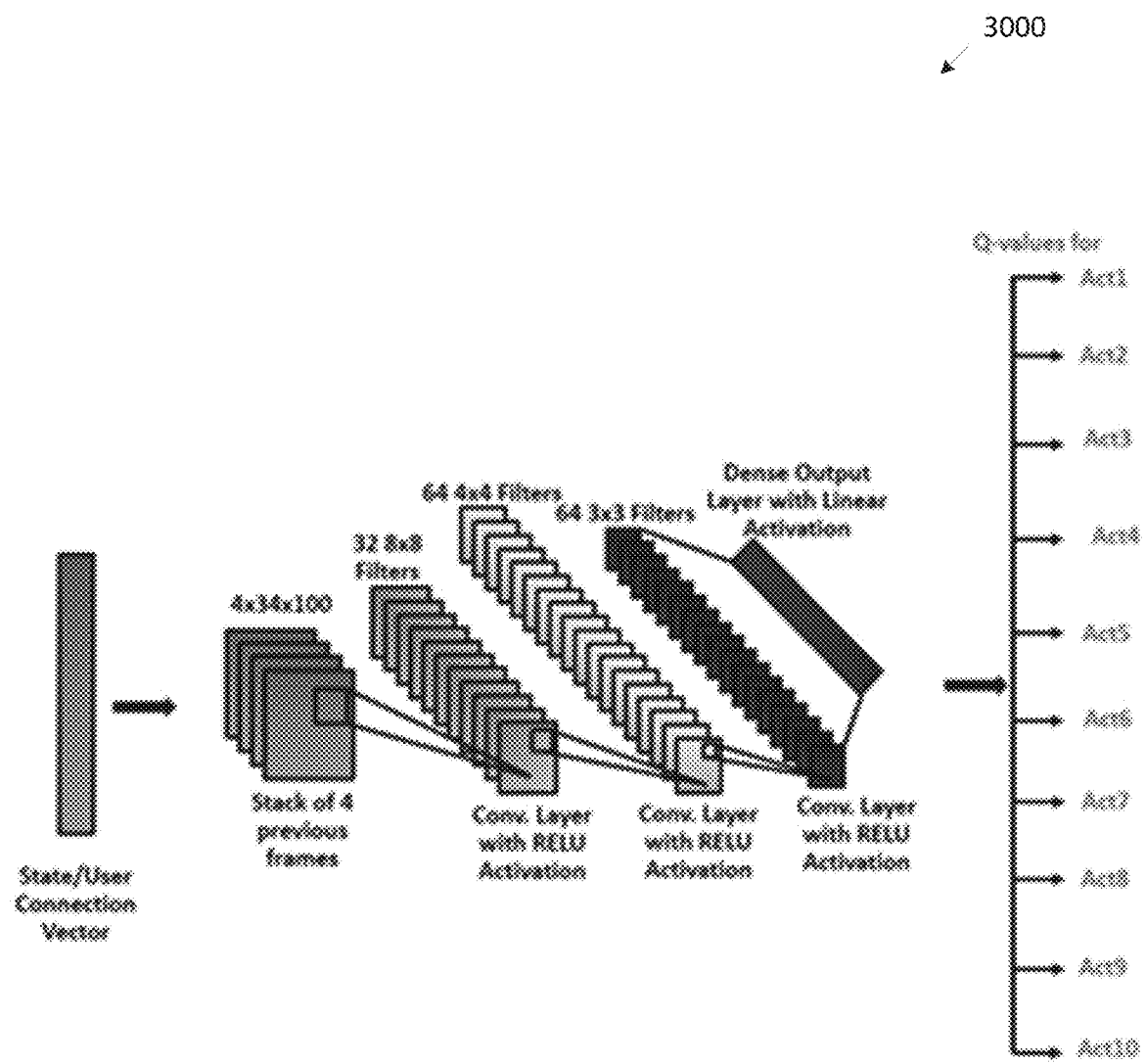
FIG. 30 illustrates an example neural network according to embodiments of the present disclosure.

FIG. 30 illustrates an example neural network 3000 according to embodiments of the present disclosure. The embodiment of the neural network 3000 illustrated in FIG. 30 is for illustration only. FIG. 30 does not limit the scope of this disclosure to any particular implementation.

Two such identical neural networks are used in predicting the Q-values. One is used for computing the running Q-values—this neural network is called the evaluation network. The other neural network, called the target neural network is held fixed for some training duration, say for M episodes, and every M episode the weights of the evaluation neural network is transferred to the target neural network. The weight transfer of the neural network is depicted in FIG. 31.

Figure 31:
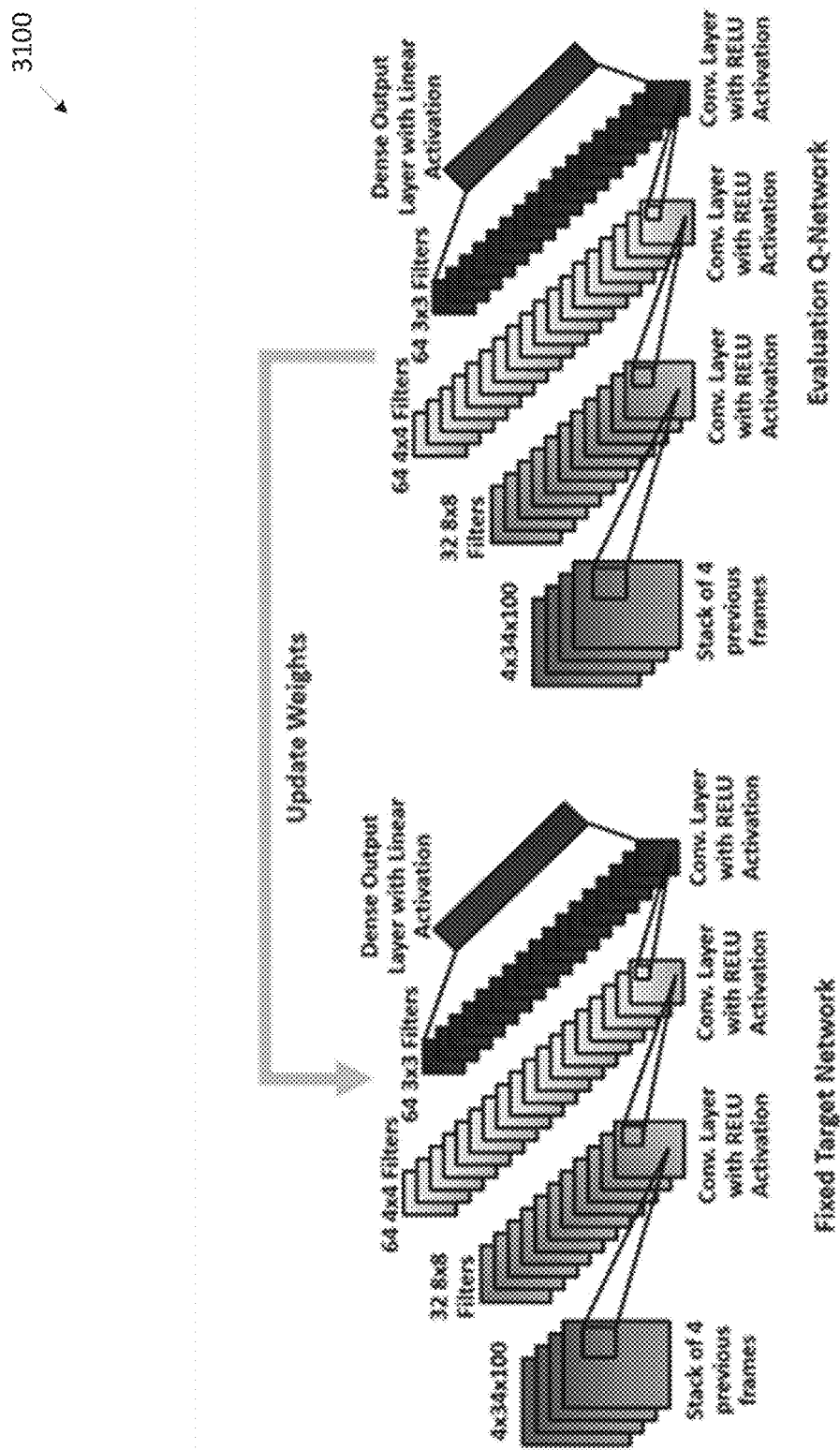
FIG. 31 illustrates an example DQN learning network according to embodiments of the present disclosure.

FIG. 31 illustrates an example DQN learning network 3100 according to embodiments of the present disclosure. The embodiment of the DQN learning network 3100 illustrated in FIG. 31 is for illustration only. FIG. 31 does not limit the scope of this disclosure to any particular implementation.

In one embodiment, a policy gradient scheme is used to train the neural network. In this case evaluation Q-network can be removed.

If the instantaneous reward, i.e., the number of connected UEs at time step t is denoted as $r_t$, then the total discounted future reward at time step, t, is defined as $R_t = \Sigma_{t'=t}^{T} \gamma^{t'-t} r_{t'}$ where $\gamma$ is the reward discount factor, and T denotes the episode duration. Optimum action value function is defined as the action which could give the maximum value of network performance. TABLE 3 shows the detailed algorithm of Algorithm 1.

TABLE 3

Wide beam synthesis for single sector

Algorithm 1: Wide beam synthesis for single sector
    INPUT: RSRP measurements from the UEs in the network.
    Output: Optimum antenna weights that maximizes the number of connected UEs.
    Step 1: Intialization
    Define the pool of candidate antenna-weight. Define the maximum exploration rate, $\epsilon_{max}$, minimum exploration rate, $\epsilon_{min}$, exploration decay rate, optimizer's learning rate, $\alpha$, and reward discount factor, $\gamma$. Initialize the replay memory.
    Step 2: Optimize the beam weights for the sectors.
    for episode =1,..., M, do:
      Initialize the state vector at time step 1, $s_1$
      for t=1, ...,T, do:
      Sample r from Uniform (0,1)
      if r ≤ $\epsilon$:
      Select an action (choose a beam index) randomly from the pool of action set (candidate beam indices)
      else
      Select an action $\alpha_t = \arg\max_a Q^*(s_t, a, \theta)$
      Apply the selected beam weights on the antenna array. MMU transmit cell-specific signals using the new antenna weights.
      MMU receive UE measurements and report the measurements to the agent/server.
      Observe the resulting RL state, $s_{t+1}$-- UE connection vector.
        Preprocess the state vector into frame for input to neural network
        Compute the reward, $r_t$—number of connected UEs
        Store the experience tuple, $e_t = (s_t, a_t, r_t, s_{t+1})$, in replay memory, D
        Sample random mini-batches of experiences, $(s_j, a_j, r_j, s_{j+1})$ from D
        if $s_{j+1}$ is terminal state:
          Set $y_j = r_j$
        else:
          Set $y_j = r_j + \gamma \max_{a'} Q'(s_t, a'; \theta)$
        Perform a gradient descent on $(y_j - Q(s_j, a_j; \theta))^2$
      end for
end for

TABLE 4

Wide beam synthesis in dynamic scenario for multiple sectors

Algorithm 2: Wide beam synthesis in dynamic scenario for multiple sectors
    INPUT: RSRP measurements from the UEs in the network.
    Output: Optimum antenna weights for the N sectors that maximizes the number of connected UEs in the network.
    Step 1: Initialization
    Define the pool of candidate antenna-weight sets for the BSs. Define the maximum exploration rate, $\epsilon_{max}$, minimum exploration rate, $\epsilon_{min}$, exploration decay rate, optimizer's learning rate, $\alpha$, and reward discount factor, $\gamma$. Initialize the replay memories for the BSs.
    Step 2: Optimize the beam weights for the cells.
    for episode =1, M, do:
      Initialize the state vector, $s_1$
      for t=1, T, do:
      Sample r from Uniform (0,1)
      if r ≤ $\epsilon$:
        Select an action (choose a beam index) for each of the sectors randomly from the corresponding pool of action sets
      else:
        for n=1:N, do:
        Select the action for n-th MMU, $a_t^n = \arg\max_a Q_n^*(s_t, a; \theta_n)$
        end for
      Apply the selected beam weights on the antenna arrays of the corresponding sectors
      Observe the resulting RL state, $s_{t+1}$-- UE connection vector
      Preprocess the state vector into frame for input to neural network
      Compute the reward, $r_t$—number of connected UEs
      for n=1:N, do:
        Store the experience tuple for n-th sector, $e_t^n = (s_t, a_t^n, r_t, s_{t+1})$, in n-th replay memory, $D^n$
        Sample random minibatches of experiences, $(s_j, a_j^n, r_j, s_{j+1})$, from $D^n$
        if $s_{j+1}$ minibatches is terminal:
          Set $y_j^n = r_j$
        else:
          Set $y_j^n = r_j + \gamma \max_{a'} Q_n(s_t, a'; \theta)$
        Perform a gradient descent on $(y_j^n - Q(s_j, a_j^n; \theta))^2$
        end for
      end for
    end for In one embodiment, wide beams are selected in dynamic scenarios for multiple sector case. For multiple sector case, the reinforcement agent has to control the beam parameters for multiple sectors at the same time. For this case, there need to be some significant updates on the reinforcement learning framework. In the multiple sector case, each sector has own pool of beams, i.e., action sets. Each sector can hence independently select own beam parameters. One of the goals could be to maximize the overall network coverage. One embodiment to solve this problem could be directly extending the single sector case as described in the previous section, i.e., optimize the beam in a cell-by-cell. However, in such case the action space for multiple sector case may grow exponentially with the number of sectors. To address this issue, in one embodiment of the disclosure, a novel low-complexity algorithm is provided for wide beam synthesis for multiple sectors where the action space grows only linearly.

It may be assumed that there are n sectors, and each sector has m possible actions (beam weight set) to choose from. The agent in this case preserves n different replay memories for the sectors and use n different neural networks. Each neural network is responsible to predict the optimum action for each sector. The details of the architectures of replay memory and neural networks are described below.

The replay memory architecture for multiple sector case is shown in FIG. 16 below. Multiple numbers of replay memories are allocated. Each sector may have own replay memory. The depiction in the figure is for 3 sector case as an example. The state, reward, and the next state are stored in different replay memory/buffers for different sectors. The replay memories differ in the actions taken (beam indices chosen) by the sectors. While the sectors observe the same current state, s, reward, r, and next state, s', the action stored are different—sector 1's action is stored in buffer 1, sector 2's action is stored in buffer 2, and so on.

Figure 32:
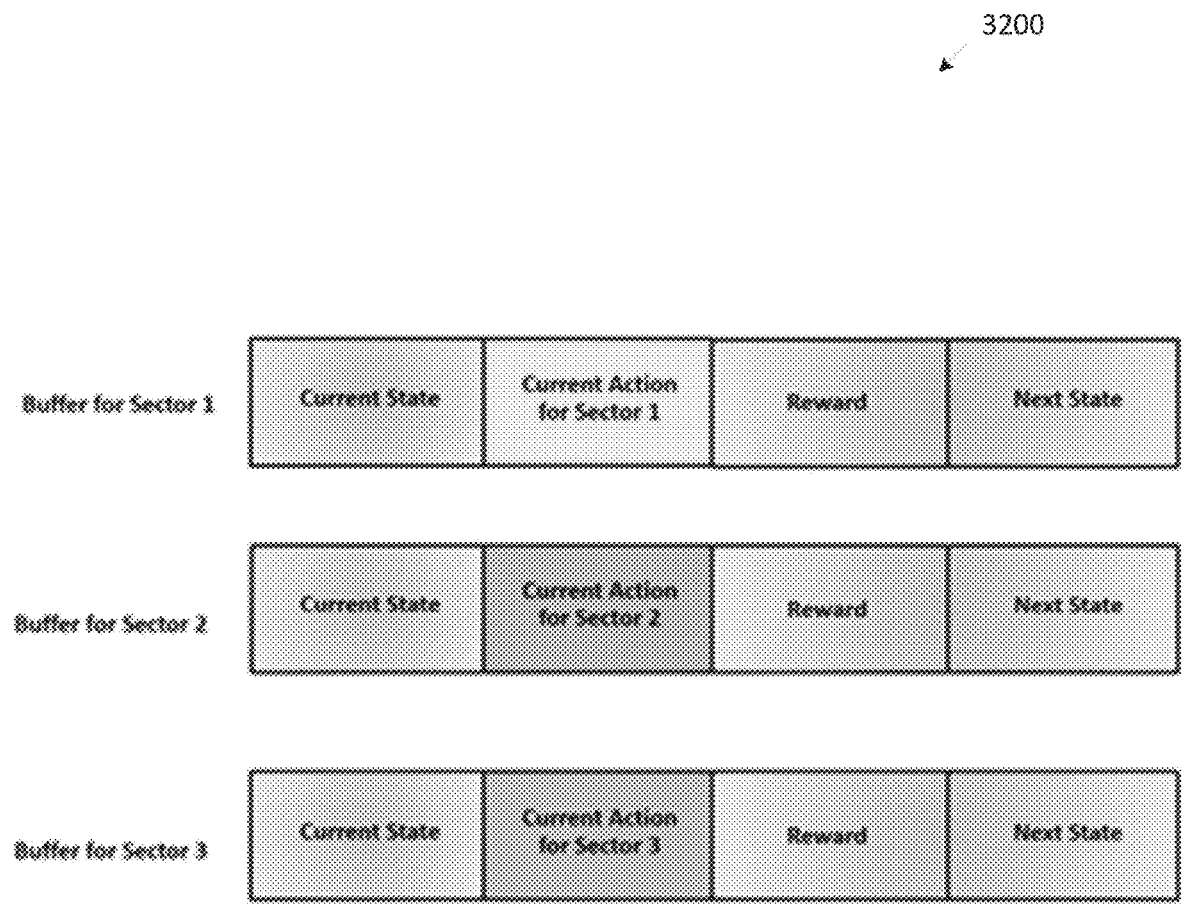
FIG. 32 illustrates an example replay memory structure according to embodiments of the present disclosure.

FIG. 32 illustrates an example replay memory structure 3200 according to embodiments of the present disclosure. The embodiment of the replay memory structure 3200 illustrated in FIG. 32 is for illustration only. FIG. 32 does not limit the scope of this disclosure to any particular implementation.

Figure 33A:
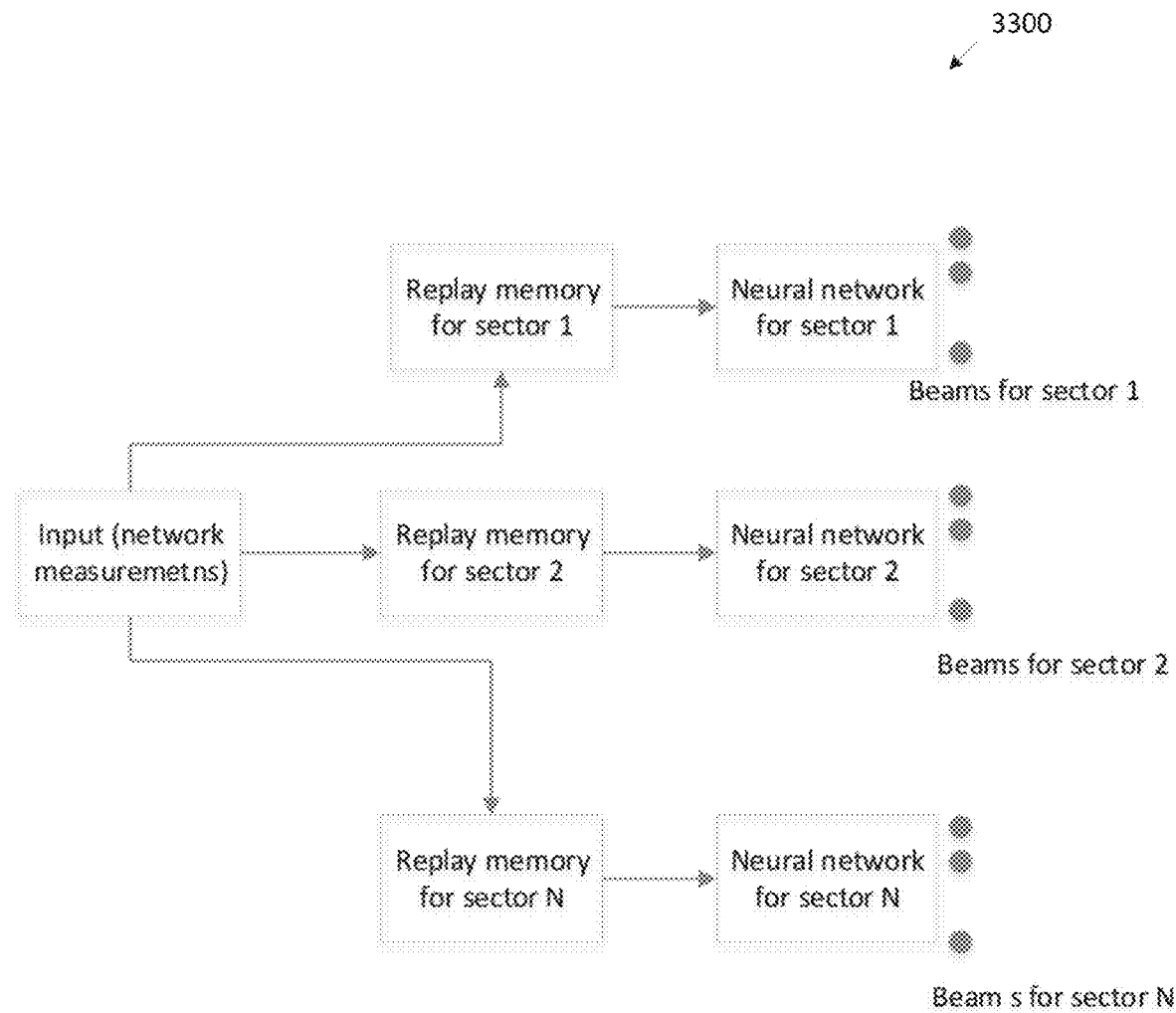
FIG. 33A illustrates an example DRL for multiple sector according to embodiments of the present disclosure.

FIG. 33A illustrates an example DRL for multiple sectors 3300 according to embodiments of the present disclosure. The embodiment of the DRL for multiple sectors 3300 illustrated in FIG. 33A is for illustration only. FIG. 33A does not limit the scope of this disclosure to any particular implementation.

The neural network architecture for predicting the Q-values for multiple sectors are shown in FIG. 33A below. The depiction is presented for 3 sector case as an example in FIG. 33B. For each sector, a specific neural network may be created to approximate the Q value. In the example figure, three separate neural networks are used for predicting the Q-values for three sectors. The input to the neural networks is the same state vectors.

Figure 33B:
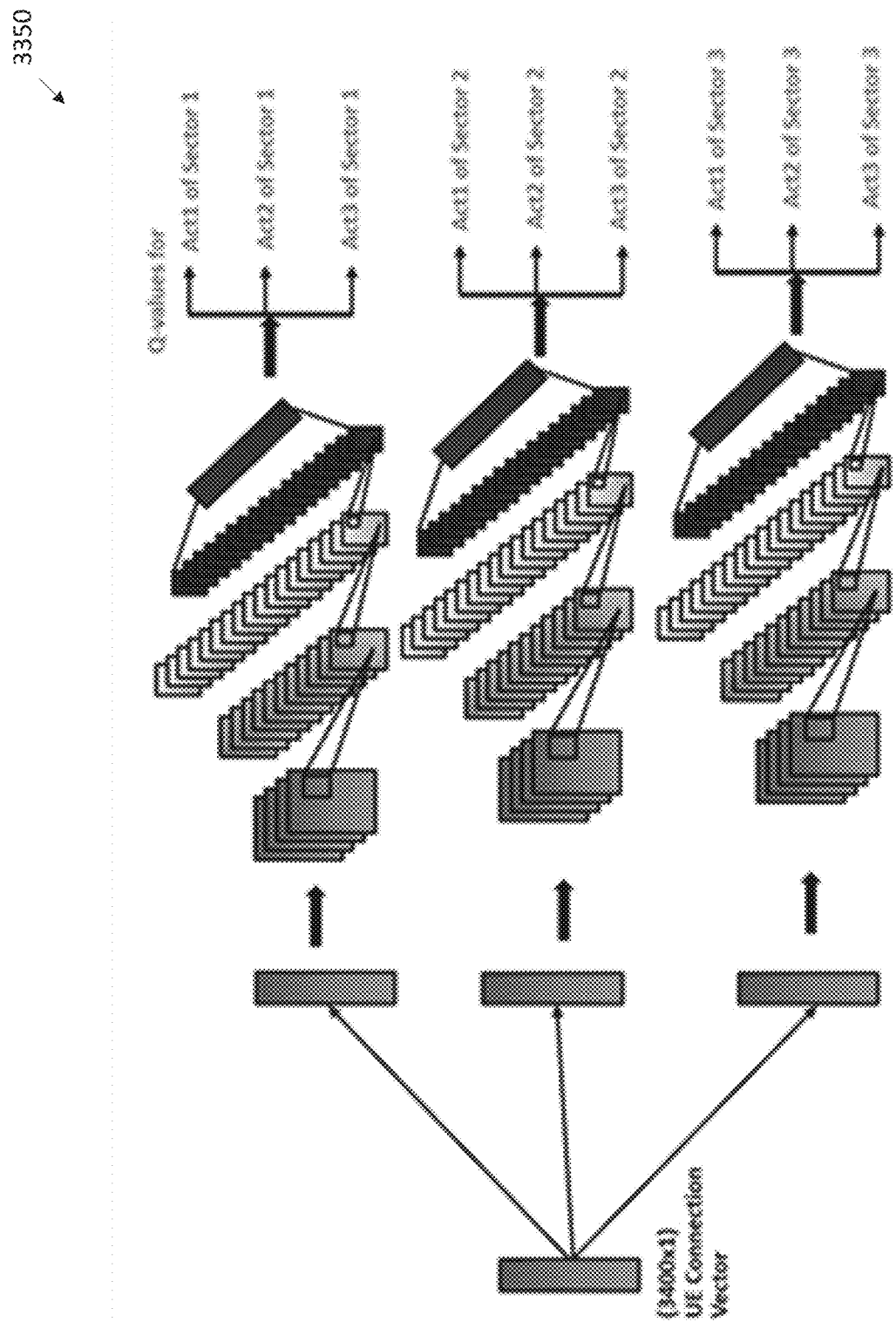
FIG. 33B illustrates an example neural network architecture for multiple cell according to embodiments of the present disclosure.

FIG. 33B illustrates an example neural network architecture for multiple cell 3350 according to embodiments of the present disclosure. The embodiment of the neural network architecture for multiple cell 3350 illustrated in FIG. 33B is for illustration only. FIG. 33B does not limit the scope of this disclosure to any particular implementation.

Neural networks could be identical or different in the structure, and the number of output for each neural network could be the number of available beams in the sector. Hence, size of action space, i.e., total number of actions grows only linearly instead of exponentially. The optimal action predicted by the Q-values of neural network 1 is stored in Buffer 1, which corresponds to sector 1. Similarly, the action predicted by the Q-values of neural network 2 is stored in Buffer 2, which corresponds to sector 2, and so on.

In one embodiment, using multi-armed bandit (MAB) to find the optimal beams for MMUs is provided. In the MAB framework, the arms could be the beams in the beam pool. Every time after a MMU select an arm or a beam, the MMU may collect the UE measurement. After getting the UE measurements, the control center may assign a reward value based on the measurement on the previous beam. The control center maintains a value table to maintain the accumulated values for each arm/beam. Every time, the control center may select a beam following a specific method. The overall process is shown in FIG. 34.

Figure 34:
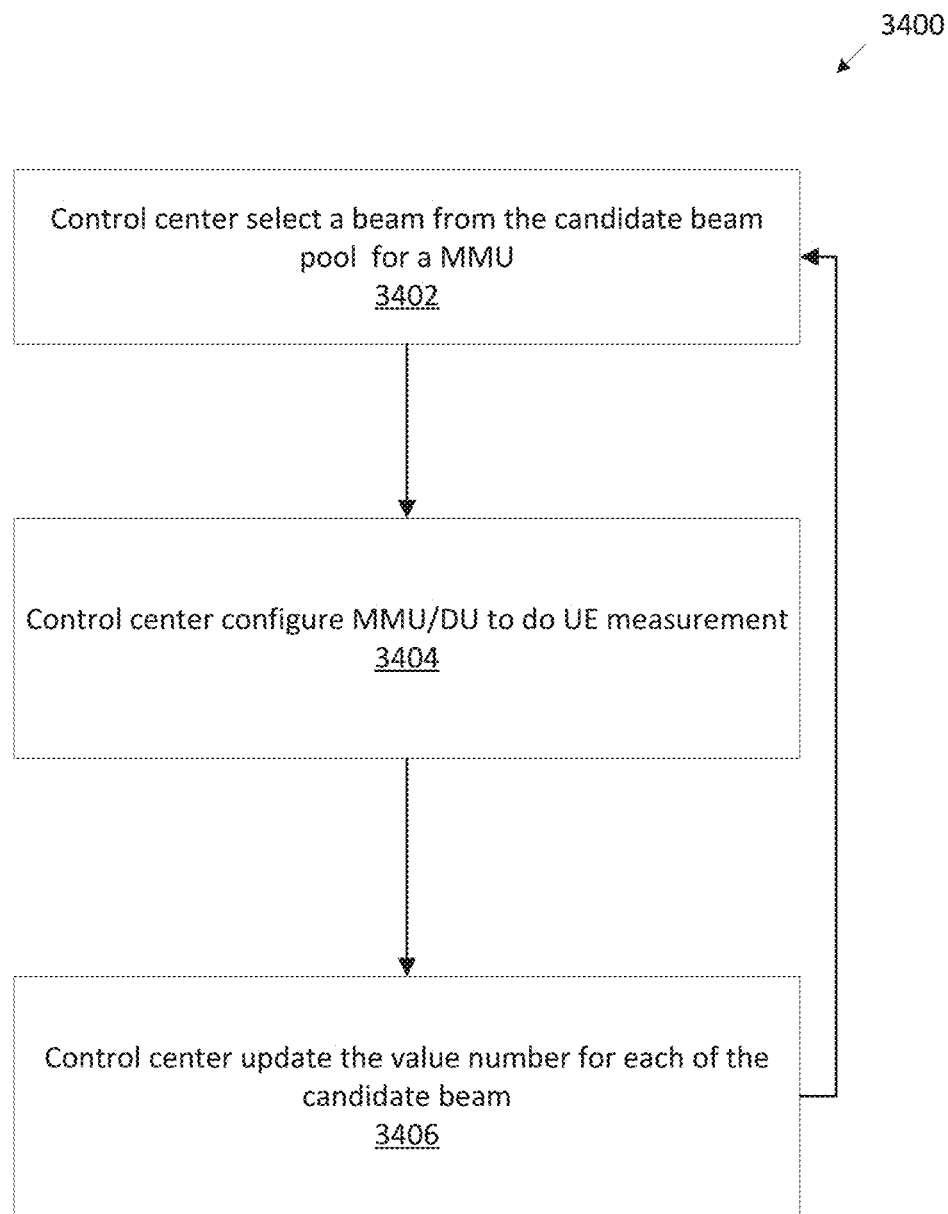
FIG. 34 illustrates a flow chart of a method for MAB according to embodiments of the present disclosure.

FIG. 34 illustrates a flow chart of a method for MAB 3400 according to embodiments of the present disclosure. The embodiment of the method for MAB 3400 illustrated in FIG. 34 is for illustration only. FIG. 34 does not limit the scope of this disclosure to any particular implementation.

As illustrated in FIG. 34, the method 3400 begins at step 3402. In step 3402, a control center selects a beam from the candidate beam pool for a MMU. In step 3404, the control center configures MMU/DU to perform UE measurement. Finally, in step 3406, the control center updates the value number for each of the candidate beam and then performs step 3402.

Figure 35:
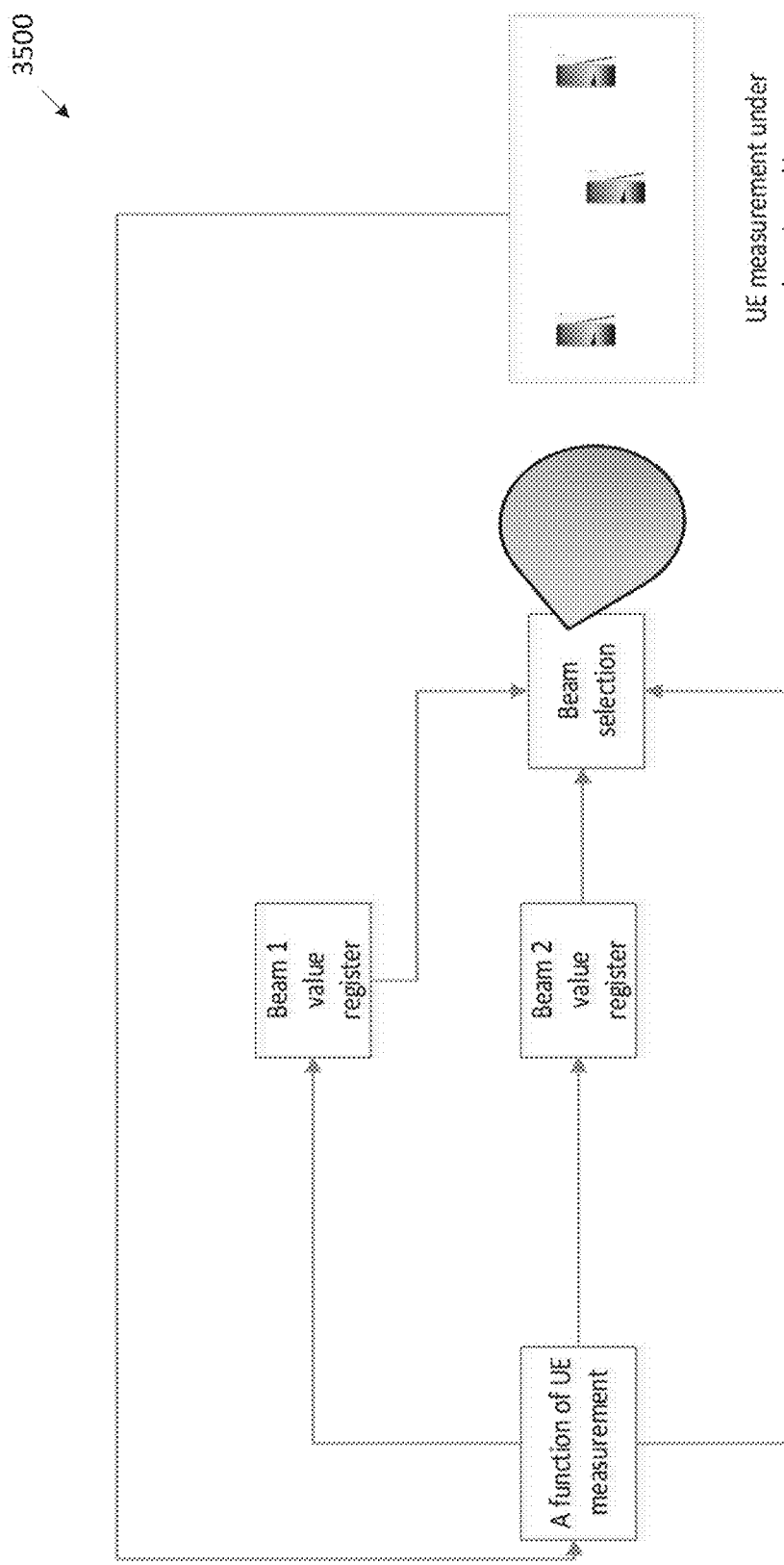
FIG. 35 illustrates an example control center structure for MAB framework according to embodiments of the present disclosure.

FIG. 35 illustrates an example control center structure for MAB framework 3500 according to embodiments of the present disclosure. The embodiment of the control center structure for MAB framework 3500 illustrated in FIG. 35 is for illustration only. FIG. 35 does not limit the scope of this disclosure to any particular implementation.

FIG. 35 shows the inside structure of the control center. The control center receives the measurements from the UE and maps the measurements to a value by a function. The measurement here could refer to RSRP, and/or RSRQ, and/or SINR, and/or SNR etc. On example of the function could be the number of UEs whose RSRP is larger than a threshold. After obtaining the value from the function, the control center may update the last selected beam value. One example to update the beam value j at time step t is to use the following equations:

$$V(j) = \frac{1}{n(j)} \sum_{t=1}^{n(j)} f(j, t) + \sqrt{\frac{2\log(T)}{n(j)}}$$

where n(j) stands for the number of beam j been selected, T stands for the total number of actions taken, $f(j, t)$ is the reward function output for action j at time stamp t.

One embodiment for the beam selection is to select the beam with the maximal value at probability of 1−ϵ, and select a beam randomly at probability of ϵ. The probability ϵ may be decreasing as the simulation steps increase.

In one embodiment, using Q learning to find the optimal beams for MMUs is provided. In the Q-learning framework, the action could be to select the beams in the beam pool. Every time after a control center select an action or a beam, the MMU may collect the UE measurement. After getting the UE measurements, the control center may assign a reward value based on the measurement on the previous beam. Furthermore, the control center may evaluate the current state of the network. The network could have different state definitions based on the design requirement. The state may reflect the network performance level. For example, one state could be defined as the number of connected UEs is larger than a value and another state could be the number of connected UEs is smaller than a value. The control center maintains a value table to maintain the accumulated values for each arm/beam and state. Every time, the control center may select a beam following a specific method. The overall process is shown in FIG. 34. The overall architecture is shown in FIG. 35.

Figure 36:
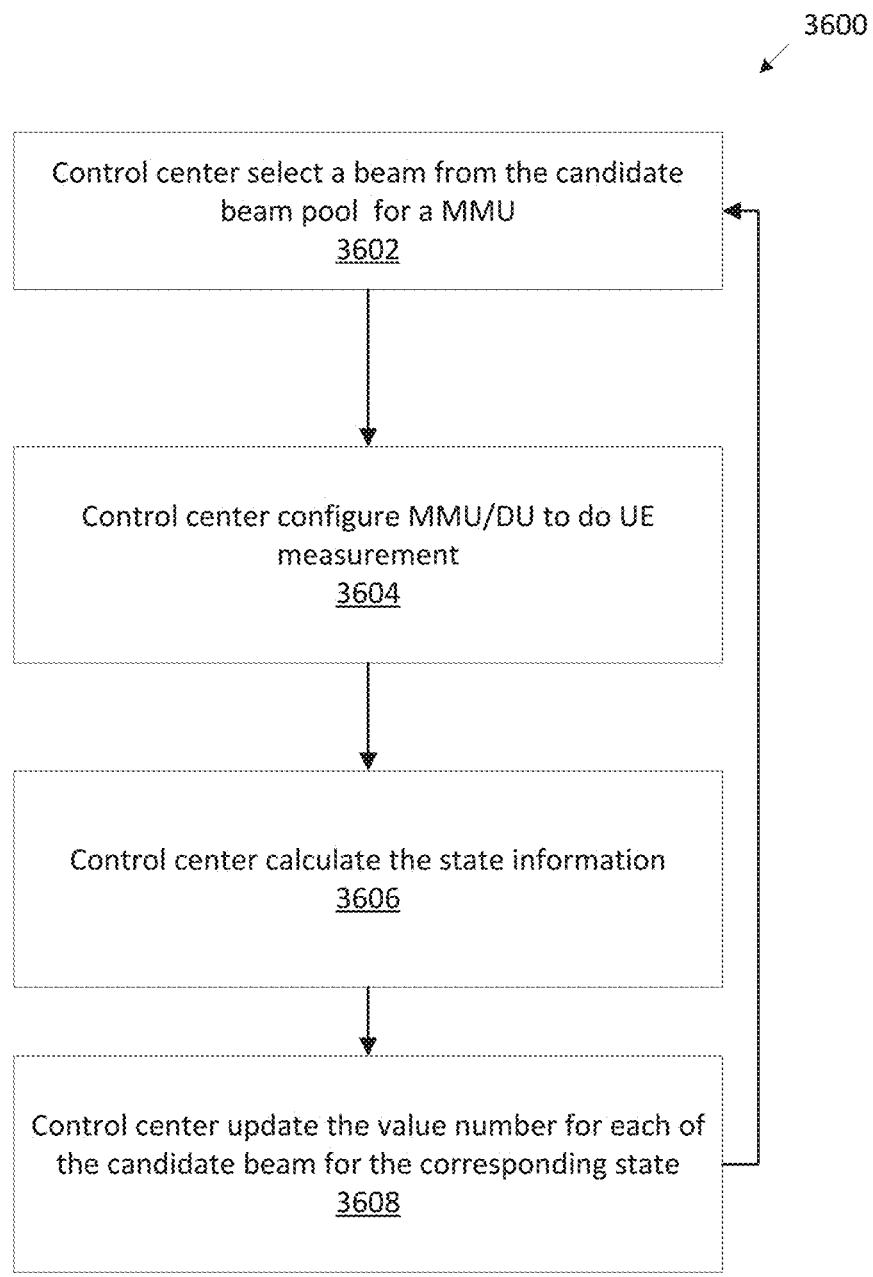
FIG. 36 illustrates a flow chart of a method for Q learning according to embodiments of the present disclosure.

FIG. 36 illustrates a flow chart of a method for Q learning 3600 according to embodiments of the present disclosure. The embodiment of the method for Q learning 3600 illustrated in FIG. 36 is for illustration only. FIG. 36 does not limit the scope of this disclosure to any particular implementation.

As illustrated in FIG. 36, the method 3600 begins at step 3602. In step 3602, a control center selects a beam from the candidate beam pool for a MMU. In step 3604, the control center configures MMU/DU to perform UE measurement. In step 3606, the control center calculates the state information. Finally, the control center in step 3608 updates the value number for each of the candidate beam for the corresponding state, and then repeat step 3602.

Figure 37:
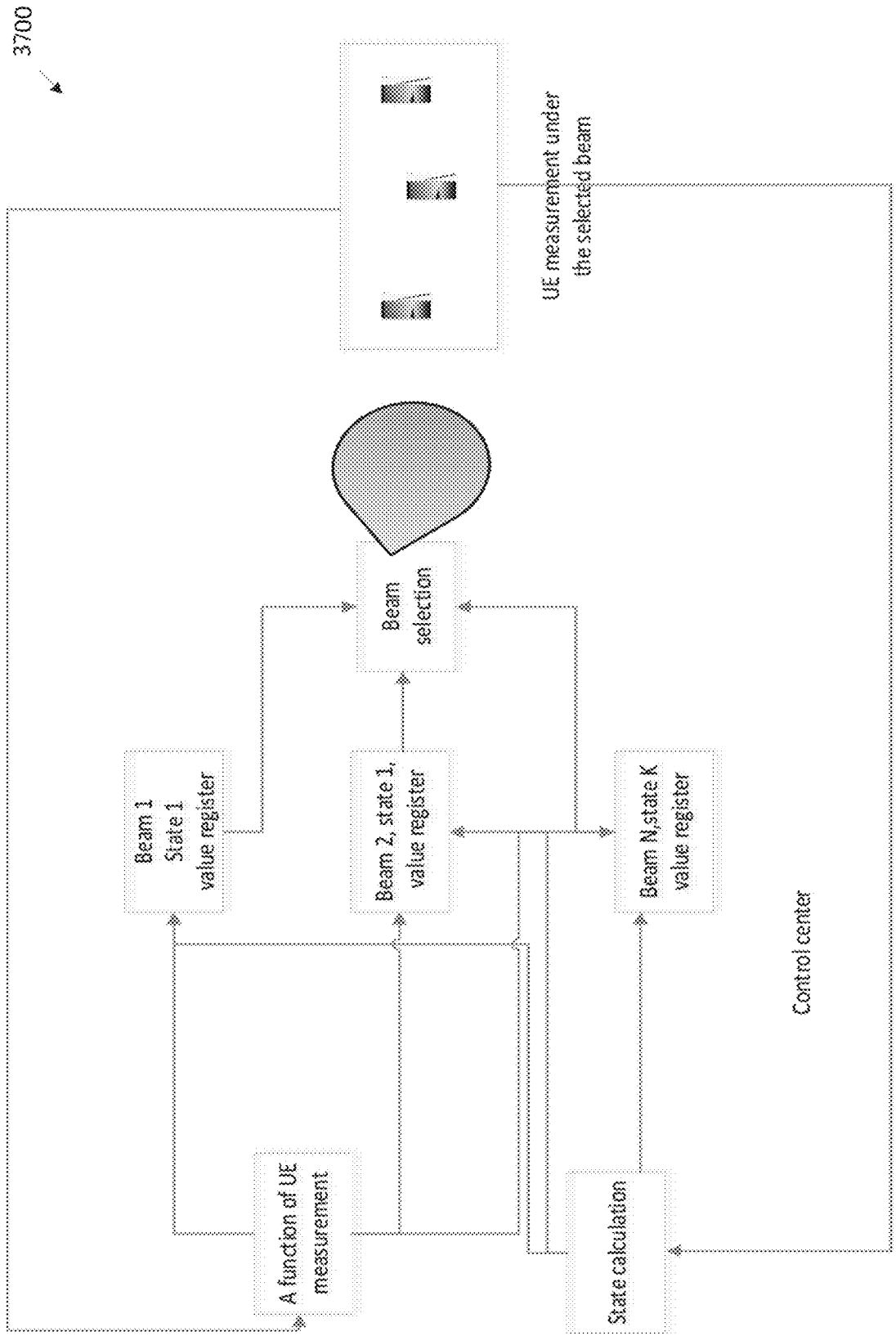
FIG. 37 illustrates an example Q learning architecture according to embodiments of the present disclosure.

FIG. 37 illustrates an example Q learning architecture 3700 according to embodiments of the present disclosure. The embodiment of the Q learning architecture 3700 illustrated in FIG. 37 is for illustration only. FIG. 37 does not limit the scope of this disclosure to any particular implementation.

FIG. 37 shows the inside structure of the control center. The control center receives the measurement results from the UE and maps the measurement results to a value by a function. The measurement here could refer to RSRP, and/or RSRQ, and/or SINR, and/or SNR etc. On example of the function could be the number of UEs whose RSRP is larger than a threshold. Furthermore, the control center may calculate the state information. The control center maintains a multi-dimensional value table. One dimension is the state and another dimension is the beam. The value is updated based on the current state information and the beam information.

After obtaining the value from the function and the state information, the control center may update the last selected beam value based on the current state. One example to update the beam value j at state s and time stamp t is to use the following equations: $V_{t+1}(j_t,s_t)=(1-\alpha)V_t(j_t,s_t)+\alpha(f(j_t,s_t)+\gamma \max V_t(j,s_{t+1}))$ where $\alpha$ stands for the learning rate, $\gamma$ stands for the discount factor, $j_t$, $s_t$ are the selected beam at time stamp t and state at time stamp t.

One embodiment for the beam selection is to select the beam with the maximal value at probability of $1-\epsilon$, and select a beam randomly at probability of $\epsilon$. The probability $\epsilon$ may be decreasing as the simulation steps increase.

In one embodiment, the performance evaluation is provided for the aforementioned algorithms for single sector dynamic environment. Each cell is equipped with a 4×4 antenna array. The horizontal distance between antenna elements is 0.5 wave length and the vertical distance between antenna elements is 1.48 wave length. The received power of each UE is calculated based on ray-tracing results.

Figure 38:
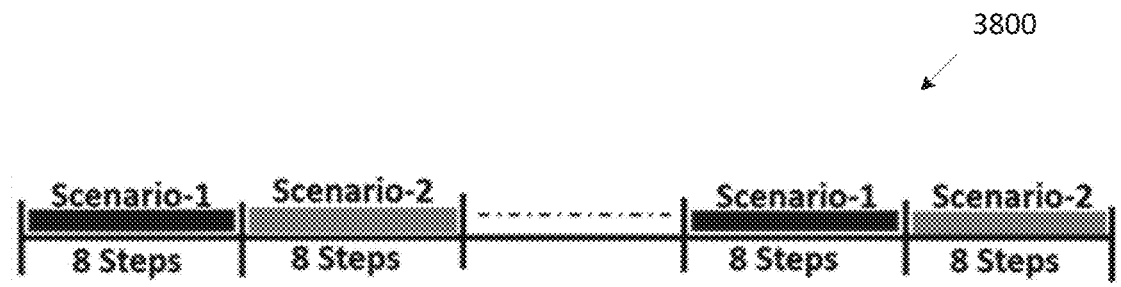
FIG. 38 illustrates an example scenario pattern according to embodiments of the present disclosure.

It may be assumed that user distribution changes every 8 hours (in simulation, every 8 time steps) as depicted in FIG. 38.

FIG. 38 illustrates an example scenario pattern 3800 according to embodiments of the present disclosure. The embodiment of the scenario pattern 3800 illustrated in FIG. 38 is for illustration only. FIG. 38 does not limit the scope of this disclosure to any particular implementation.

At each time step, the agent has 10 actions to choose from, i.e., there are 10 different beam weight set available for the agent, and based on the change in user distribution, the agent adaptively selects the beam that maximizes the total number of connected UEs.

Figure 39:
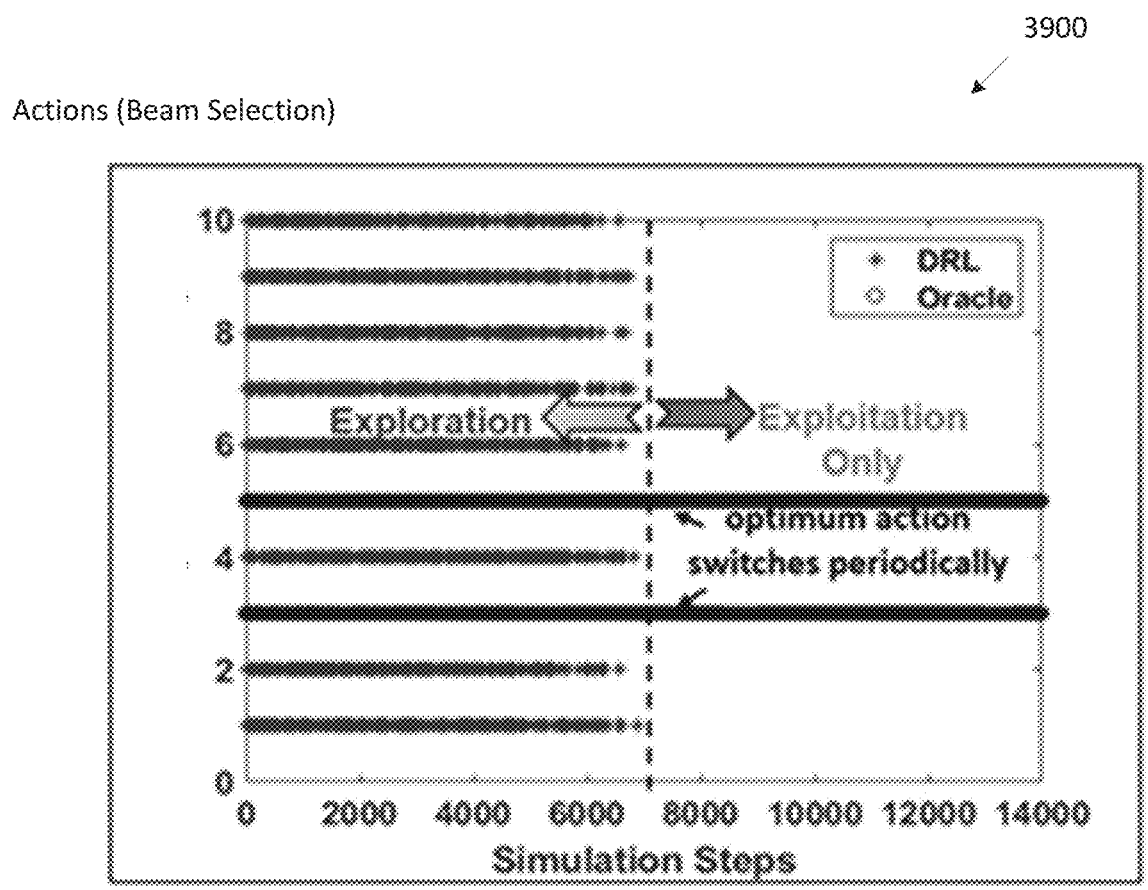
FIG. 39 illustrates an example simulation result according to embodiments of the present disclosure.

FIG. 39 illustrates an example simulation result 3900 according to embodiments of the present disclosure. The embodiment of the simulation result 3900 illustrated in FIG. 39 is for illustration only. FIG. 39 does not limit the scope of this disclosure to any particular implementation.

FIG. 39 below shows the results for the actions taken by our Deep RL (DRL) agent. Actions may be taken by the oracle. It may be observed that at the beginning of the training, during the exploration phase, the agent tries out the available actions, and attempts to learn the optimal beam weights for different user distributions. Once the exploration phase is over, the agent's actions converges completely with the oracle actions. It is to be noted here that there are two best actions in this figure corresponding to two user distributions-action 3 is the best action for scenario 1 while action 5 is the best action for scenario 2.

In one embodiment, the results for deep reinforcement learning is provided based wide beam synthesis for multiple sector dynamic environment. Each cell is equipped with a 4×4 antenna array. The horizontal distance between antenna elements is 0.5 wave length and the vertical distance between antenna elements is 1.48 wave length. The received power of each UE is calculated based on ray-tracing results.

Figure 40:
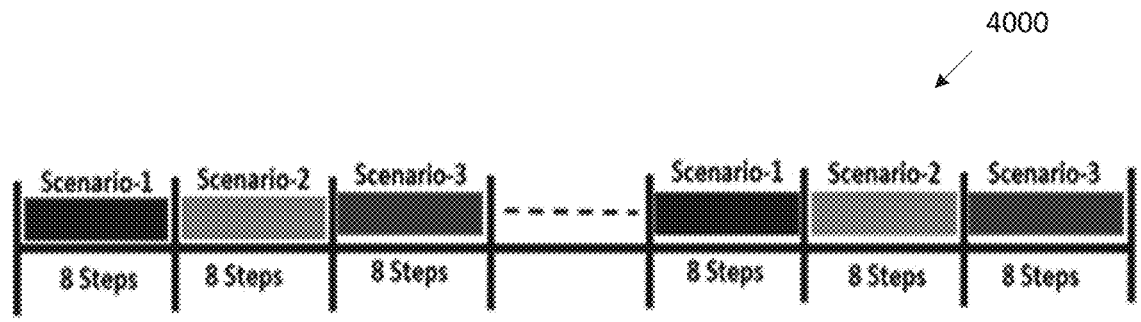
FIG. 40 illustrates another example scenario pattern according to embodiments of the present disclosure.

It may be assumed that there are three possible user distributions, and distributions changes from scenario 1 to scenario 2 to scenario 3 every 8 hours (and 8 time steps in simulation) as depicted in FIG. 40.

FIG. 40 illustrates another example scenario pattern 4000 according to embodiments of the present disclosure. The embodiment of the scenario pattern 4000 illustrated in FIG. 40 is for illustration only. FIG. 40 does not limit the scope of this disclosure to any particular implementation.

It may be assumed that there are 3 actions available for each sector, i.e., there are three possible beam weights available for each sector, and based on the change in user distributions, the agent needs to adaptively select the optimal beams for the sectors that maximizes the overall connected UEs in the network. The reward results are shown in FIG. 41A.

Figure 41A:
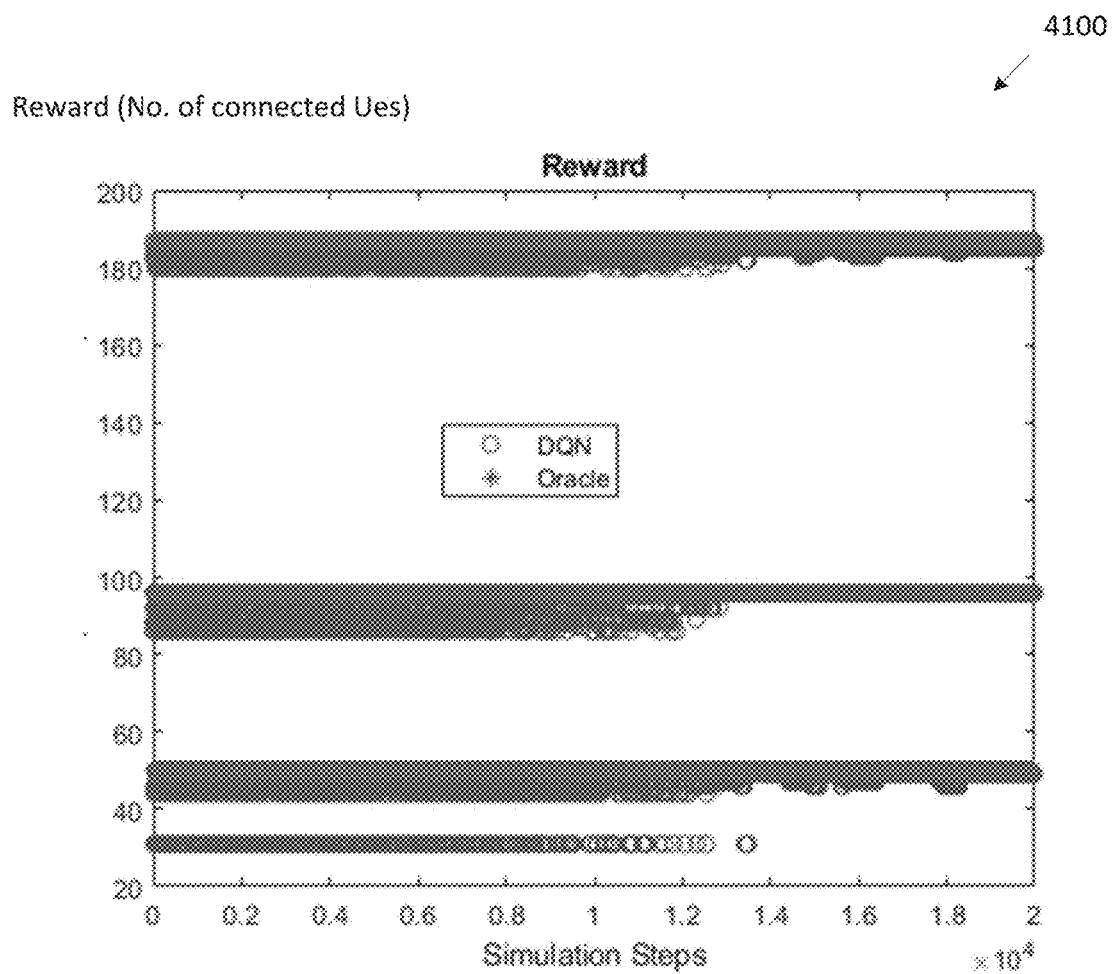
FIG. 41A illustrates an example simulation result according to embodiments of the present disclosure.

FIG. 41A illustrates an example simulation result 4100 according to embodiments of the present disclosure. The embodiment of the simulation result 4100 illustrated in FIG. 41A0 is for illustration only. FIG. 41A does not limit the scope of this disclosure to any particular implementation.

It may be assumed that the DQN agent performance is very close to oracle performance. For scenario 1, at steady state, the reward obtained by DQN agent is 185, while the optimal reward predicted by oracle is 187. Hence, the DQN agent performs 98.93% of the oracle performance. At scenario 2, the DQN agent performs exactly same as oracle, both results in a reward of 96, and finally, for scenario 3, the DQN agent achieves a reward of 49 while the oracle reward is 50. Hence, RL agent performs 98% of the oracle performance.

Figure 41B:
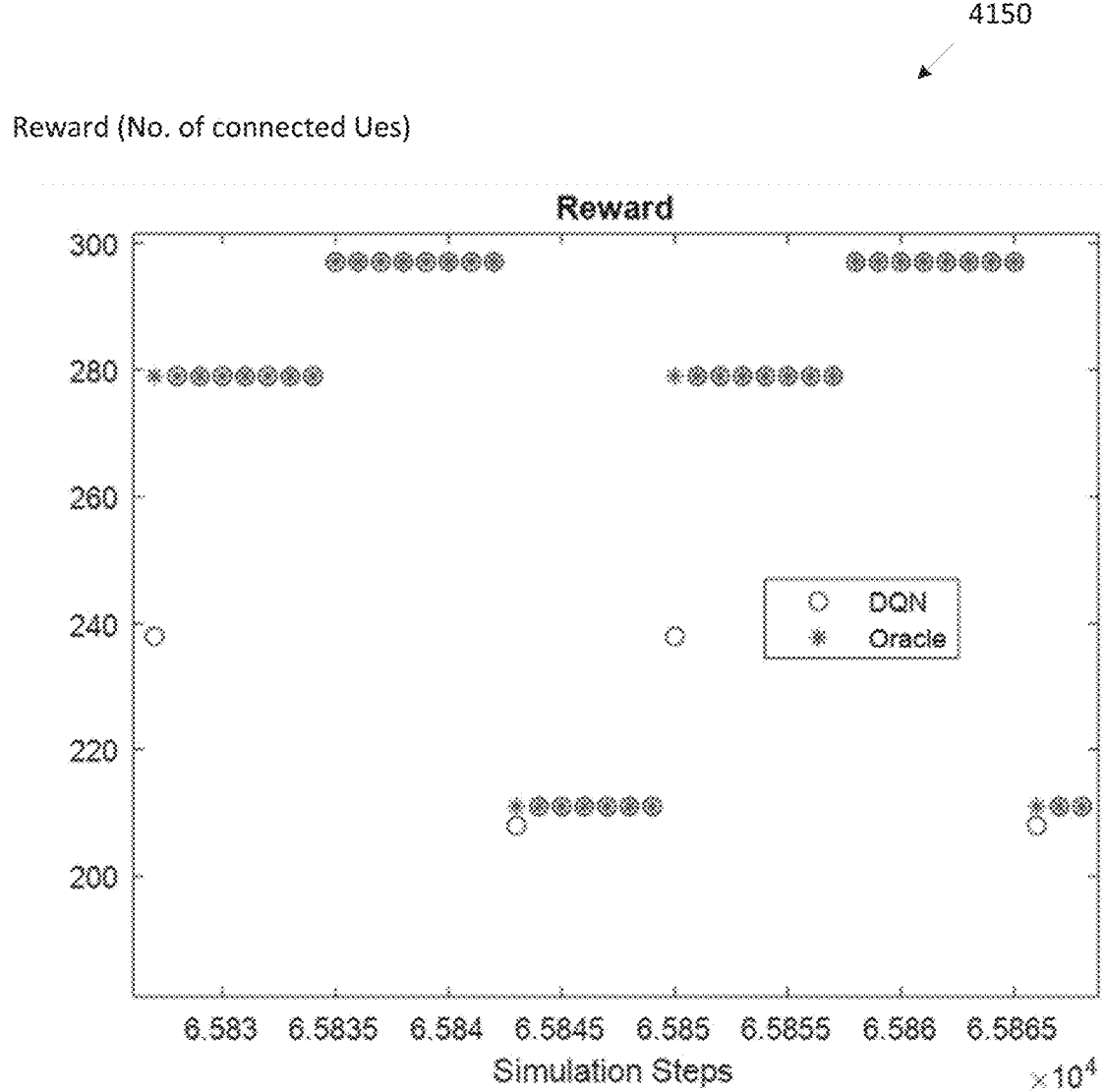
FIG. 41B illustrates an example rewards after coverage according to embodiments of the present disclosure.

In another experiment, the detailed convergence behavior is provided as illustrated in FIG. 41B.

FIG. 41B illustrates an example rewards after coverage 4150 according to embodiments of the present disclosure. The embodiment of the rewards after coverage 4150 illustrated in FIG. 41B is for illustration only. FIG. 41B does not limit the scope of this disclosure to any particular implementation.

Figure 41C:
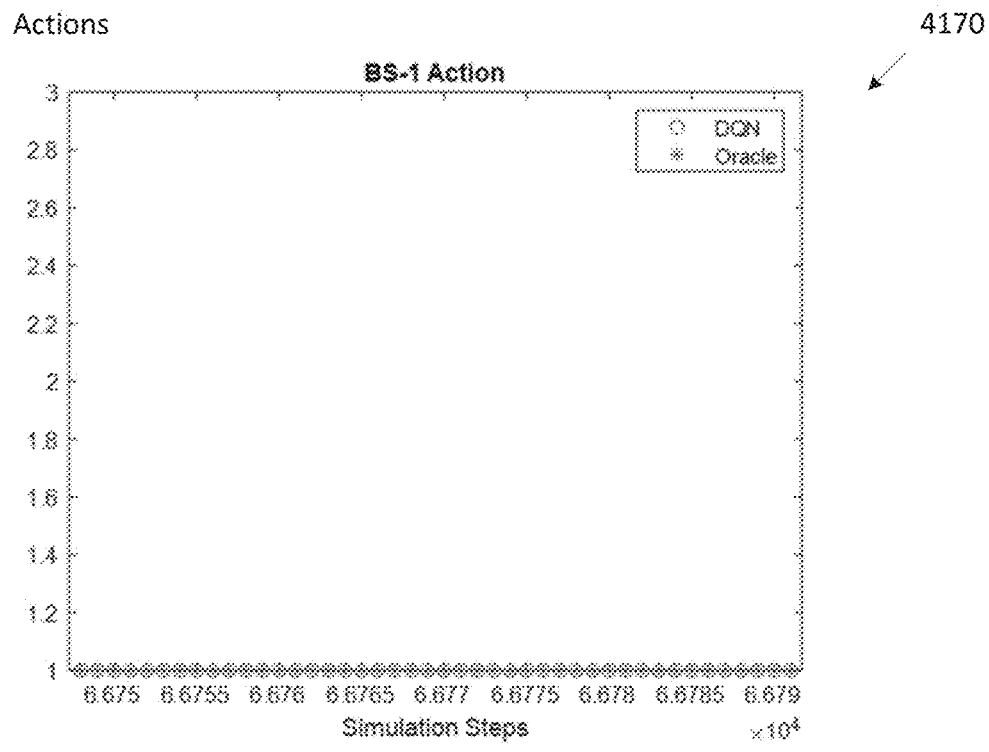
FIG. 41C illustrates an example action for each based stations after convergence according to embodiments of the present disclosure.

FIG. 41C illustrates an example action after convergence 4170 according to embodiments of the present disclosure. The embodiment of the action after convergence 4170 illustrated in FIG. 41C is for illustration only. FIG. 41C does not limit the scope of this disclosure to any particular implementation.

Figure 41D:
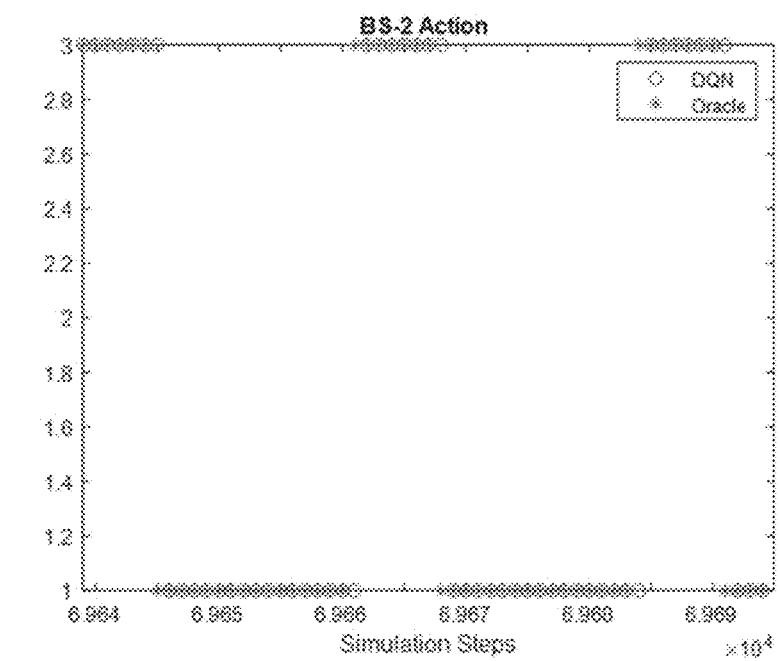
FIG. 41D illustrates another example action for each based stations after convergence according to embodiments of the present disclosure.

FIG. 41D illustrates another example action after convergence 4180 according to embodiments of the present disclosure. The embodiment of the action after convergence 4180 illustrated in FIG. 41D is for illustration only. FIG. 41D does not limit the scope of this disclosure to any particular implementation.

Figure 41E:
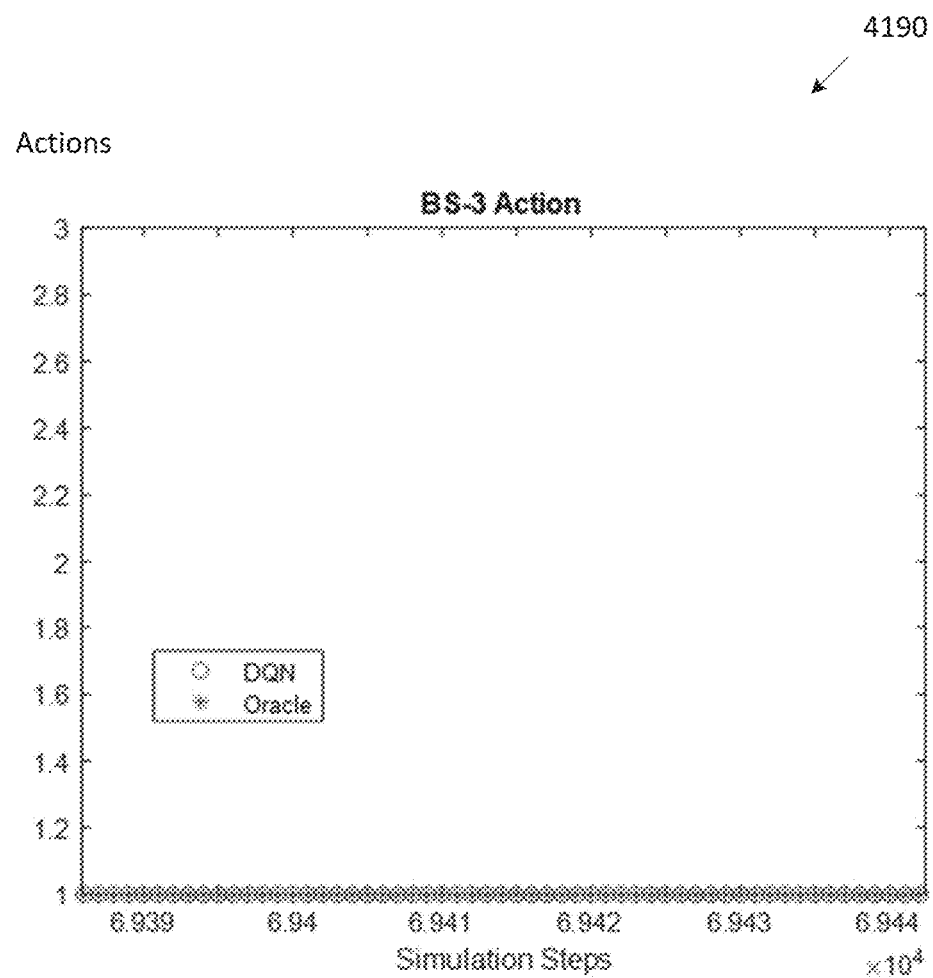
FIG. 41E illustrates yet another example action for each based stations after convergence according to embodiments of the present disclosure.

FIG. 41E illustrates yet another example action after convergence 4190 according to embodiments of the present disclosure. The embodiment of the action after convergence 4190 illustrated in FIG. 41E is for illustration only. FIG. 41E does not limit the scope of this disclosure to any particular implementation.

From FIGS. 41C, 42D, and 41E, it may be found that, with deep reinforcement learning, the aforementioned algorithm could dynamically select the almost the best beam for each dynamic scenario instantaneously.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
 a transceiver configured to:
  receive, from a central controller (CC) via a base station (BS), information of a first beam that is used in a measurement report; and
  transmit, to the CC via the BS, the measurement report including a measurement result of the first beam,
 wherein:
  the first beam for the BS is selected, by the CC, from a set of beams in a candidate beam pool including predetermined candidate beams, the set of beams being allocated to the BS;
  consecutive measurement results corresponding to the set of beams in the candidate beam pool along with the measurement result of the first beam are preprocessed by the CC;
  beam scores for the first beam based on the measurement result of the first beam are calculated by the CC; and
  a second beam based on the beam scores is selected by the CC, the second beam being determined as a beam including a highest score among the set of beams in the candidate beam pool.

2. The UE of claim 1, wherein the consecutive measurement results comprise at least one of a reference signal received power (RSRP), a reference signal received quality (RSRQ), a signal to interference and noise ratio (SINR), an identification (ID), or location information of the UEs.

3. The UE of claim 1, wherein:
 acceptability of the measurement result of the first beam is determined, by the CC, based on a threshold;
 a UE connection vector based on the measurement result and the threshold is determined by the CC;
 the UE connection vector to a two-dimensional connection (2D) map based on location information of the UEs is reshaped by the CC; and
 the beam scores based on previous beam scores and the consecutive measurement results is calculated by the CC.

4. The UE of claim 1, wherein:
 a deep neural network to select a best beam is configured by the CC;
 the best beam using the deep neural network is selected by the CC;
 the preprocessed consecutive measurement results within a time window from the each of the BSs is inputted, by the CC, to the deep neural network of the BSs;
 a one-hot output of the deep neural network is identified, by the CC, as an indicator for the best beam; and
 weights of the deep neural network are updated, by the CC, based on the preprocessed consecutive measurement results.

5. The UE of claim 1, wherein:
 UE distribution patterns are obtained, by the CC, based on a history of measurement results from a UE;
 ray-tracing data with the UE distribution patterns is combined, by the CC, to obtain scenario-specific ray-tracing data; and
 a best beam based on the scenario-specific ray-tracing data is searched, by the CC, for each of the UE distribution patterns.

6. The UE of claim 5, where:
 the measurement results are classified, by the CC, into the UE distribution patterns; and
 the best beam for the UE distribution patterns is selected, by the CC, based on the scenario-specific ray-tracing data.

7. The UE of claim 1, wherein each of the BSs comprises a data unit/multi-input-multi-out (DU/MMU).

8. A central controller (CC) in a wireless communication system, the CC comprising:
 a processor configured to:
  select, from a set of beams in a candidate beam pool including predetermined candidate beams, a first beam for each of base stations (BSs), wherein the set of beams is allocated to the BSs; and
  instruct each of the BSs to transmit, to user equipments (UEs) belonging to each of the BSs, signals with the first beam that is used in a measurement report by the UEs; and
 a transceiver operably connected to the processor, the transceiver configured to:
  transmit, to each of the BSs, information of the first beam;
  receive, from the UEs via the BSs, the measurement report including a measurement result of the first beam,
 wherein the processor is further configured to:
  preprocess, for each of the BSs, consecutive measurement results that correspond to the set of beams in the candidate beam pool along with the measurement result of the first beam;

calculate, for each of the BSs, beam scores for the first beam based on the consecutive measurement results of the first beam; and select, for each of the BSs, a second beam based on the beam scores, wherein, for each of the BSs, the second beam is determined as a beam including a highest score among the set of beams in the candidate beam pool.

9. The CC of claim 8, wherein the consecutive measurement results comprise at least one of a reference signal received power (RSRP), a reference signal received quality (RSRQ), a signal to interference and noise ratio (SINR), an identification (ID), or location information of the UEs.

10. The CC of claim 8, wherein the processor is further configured to:

determine whether the measurement result of the first beam is acceptable based on a threshold;

identify a UE connection vector based on the determined measurement result and the threshold;

reshape the UE connection vector to a two-dimensional connection (2D) map based on location information of the UEs; and calculate, for each of the BSs, the beam scores based on previous beam scores and the consecutive measurement results.

11. The CC of claim 8, wherein the processor is further configured to:

configure, for each of the BSs, a deep neural network to generate a score on each beam for each cell and to select a best beam;

select, for each of the BSs, the best beam using the deep neural network;

input, to the deep neural network of the BSs, the preprocessed consecutive measurement results within a time window from the each of the BSs;

identify a one-hot output of the deep neural network as an indicator for the best beam; and update, for each of the BSs, weights of the deep neural network based on the preprocessed consecutive measurement results.

12. The CC of claim 8, wherein the processor is further configured to:

obtain, for each of the BSs, UE distribution patterns based on a history of measurement results from a UE;

combine, for each of the BSs, ray-tracing data with the UE distribution patterns to obtain scenario-specific ray-tracing data; and search a best beam based on the scenario-specific ray-tracing data for each of the UE distribution patterns.

13. The CC of claim 12, where the processor is further configured to:

classify the measurement results into the UE distribution patterns; and select the best beam for the UE distribution patterns based on the scenario-specific ray-tracing data.

14. The CC of claim 8, wherein each of the BSs comprises a data unit/multi-input-multi-out (DU/MMU).

15. A method of a central controller (CC) in a wireless communication system, the method comprising:

selecting, from a set of beams in a candidate beam pool including predetermined candidate beams, a first beam for each of base stations (BSs), wherein the set of beams is allocated to the BSs;

instructing each of the BSs to transmit, to user equipments (UEs) belonging to each of the BSs, signals with the first beam that is used in a measurement report by the UEs;

transmitting, to each of the BSs, information of the first beam;

receiving, from the UEs via the BSs, the measurement report including a measurement result of the first beam;

preprocessing, for each of the BSs, consecutive measurement results that correspond to the set of beams in the candidate beam pool along with the measurement result of the first beam;

calculating, for each of the BSs, beam scores for the first beam based on the consecutive measurement results of the first beam; and selecting, for each of the BSs, a second beam based on the beam scores, wherein, for each of the BSs, the second beam is determined as a beam including a highest score among the set of beams in the candidate beam pool.

16. The method of claim 15, wherein the consecutive measurement results comprise at least one of a reference signal received power (RSRP), a reference signal received quality (RSRQ), a signal to interference and noise ratio (SINR), an identification (ID), or location information of the UEs.

17. The method of claim 15, further comprising:

determining whether the measurement result of the first beam is acceptable based on a threshold;

identifying a UE connection vector based on the determined measurement result and the threshold;

reshaping the UE connection vector to a two-dimensional connection (2D) map based on location information of the UEs; and calculating, for each of the BSs, the beam scores based on previous beam scores and the consecutive measurement results.

18. The method of claim 15, wherein:

configuring, for each of the BSs, a deep neural network to select a best beam;

generating, for each of the BSs, a score on each beam for each cell;

selecting, for each of the BSs, the best beam using the deep neural network;

inputting, to the deep neural network of the BSs, the preprocessed consecutive measurement results within a time window from the each of the BSs;

identifying a one-hot output of the deep neural network as an indicator for the best beam; and updating for each of the BSs, weights of the deep neural network based on the preprocessed consecutive measurement results.

19. The method of claim 15, further comprising:

obtaining, for each of the BSs, UE distribution patterns based on a history of measurement results from a UE;

combining, for each of the BSs, ray-tracing data with the UE distribution patterns to obtain scenario-specific ray-tracing data; and searching a best beam based on the scenario-specific ray-tracing data for each of the UE distribution patterns.

20. The method of claim 19, further comprising:

classifying the measurement results into the UE distribution patterns; and selecting the best beam for the UE distribution patterns based on the scenario-specific ray-tracing data.

* * * * *